US010131575B2

(12) United States Patent
Guynn

(10) Patent No.: US 10,131,575 B2
(45) Date of Patent: Nov. 20, 2018

(54) USE OF QUARRY FINES AND/OR LIMESTONE POWDER TO REDUCE CLINKER CONTENT OF CEMENTITIOUS COMPOSITIONS

(71) Applicant: ROMAN CEMENT, LLC, Salt Lake City, UT (US)

(72) Inventor: John M. Guynn, Salt Lake City, UT (US)

(73) Assignee: Roman Cement, LLC, Salt Lake City, UT (US)

( * ) Notice: Subject to any disclaimer, the term of this patent is extended or adjusted under 35 U.S.C. 154(b) by 0 days.

(21) Appl. No.: 15/866,455

(22) Filed: Jan. 9, 2018

(65) Prior Publication Data

US 2018/0194679 A1    Jul. 12, 2018

Related U.S. Application Data

(60) Provisional application No. 62/522,274, filed on Jun. 20, 2017, provisional application No. 62/451,533, filed on Jan. 27, 2017, provisional application No. 62/451,484, filed on Jan. 27, 2017, provisional application No. 62/444,736, filed on Jan. 10, 2017.

(51) Int. Cl.
| | | |
|---|---|---|
| *C04B 7/02* | (2006.01) | |
| *C04B 2/02* | (2006.01) | |
| *C04B 14/28* | (2006.01) | |
| *C04B 18/14* | (2006.01) | |
| *C04B 18/08* | (2006.01) | |
| *C04B 18/12* | (2006.01) | |
| *C04B 18/02* | (2006.01) | |
| *C04B 103/10* | (2006.01) | |

(52) U.S. Cl.
CPC ............. *C04B 7/02* (2013.01); *C04B 2/02* (2013.01); *C04B 14/28* (2013.01); *C04B 18/02* (2013.01); *C04B 18/08* (2013.01); *C04B 18/12* (2013.01); *C04B 18/141* (2013.01); *C04B 2103/10* (2013.01)

(58) Field of Classification Search
CPC .. C04B 2/02; C04B 7/02; C04B 14/28; C04B 18/141; C04B 18/08; C04B 18/12; C04B 18/02; C04B 2103/10
See application file for complete search history.

(56) References Cited

U.S. PATENT DOCUMENTS

| | | |
|---|---|---|
| 3,447,937 A | 6/1969 | Hersey et al. |
| 3,615,787 A | 10/1971 | Teramoto et al. |
| 3,689,295 A | 9/1972 | Hersey et al. |
| 4,160,674 A | 7/1979 | Sawyer |
| 4,509,985 A | 4/1985 | Davidovits et al. |
| 4,640,715 A | 2/1987 | Heitzmann et al. |
| 4,642,137 A | 2/1987 | Heitzmann et al. |
| 4,842,649 A | 6/1989 | Heitzmann et al. |
| 4,997,484 A | 3/1991 | Gravitt et al. |
| 5,346,012 A | 9/1994 | Heathman et al. |
| 5,375,776 A | 12/1994 | Kupper et al. |
| 5,383,521 A | 1/1995 | Oman et al. |
| 5,417,760 A | 5/1995 | Folsberg |
| 5,525,155 A | 6/1996 | Allen |
| 5,527,387 A | 6/1996 | Andersen et al. |
| 5,531,823 A | 7/1996 | Breton |
| 5,650,004 A | 7/1997 | Yon |
| 5,651,505 A | 7/1997 | Lidstrom |
| 5,718,759 A | 2/1998 | Stav et al. |
| 5,804,175 A | 9/1998 | Ronin et al. |
| 5,908,502 A | 6/1999 | Cangiano et al. |
| 5,951,279 A | 9/1999 | Hunold et al. |
| 5,968,257 A | 10/1999 | Ahrens |

(Continued)

FOREIGN PATENT DOCUMENTS

| | | |
|---|---|---|
| CA | 2085219 | 10/2004 |
| CN | 101278245 | 10/2008 |

(Continued)

OTHER PUBLICATIONS

Andersen, P., "Control and Monitoring of Concrete Production . . . A Study of Particle Packing and Rheology", The Danish Academy of Technical Sciences, 1990.

Barger, GS, "Production and Use of Calcined Natural Pozzolans in Concrete," Journal of Cement, Concrete and Aggregates, vol. 23, Issue 2, Dec. 2001.

Bentz, D., "Calorimetric Studies of Powder Additions to Mitigate Excessive Retardation in High Volume Fly Ash Mixtures", ACI Materials Journal pp. 1-20, Sep. 9, 2009.

Bentz, D., "Computer modeling of the replacement of 'coarse' cement particles by inert fillers in low w/c ratio concretes Hydration and strength", Cement and Concrete Research 31, pp. 503-506, Jan. 5, 2001.

(Continued)

*Primary Examiner* — Anthony J Green
(74) *Attorney, Agent, or Firm* — Workman Nydegger

(57) ABSTRACT

Quarry fines and/or limestone powder are used to reduce clinker content in concrete, mortar and other cementitious compositions, typically in combination with one or more pozzolanically active SCMs. Quarry fines and/or limestone powder can replace and/or augment a portion of hydraulic cement binder and/or fine aggregate. Quarry fines and/or limestone powder can advantageously replace a portion of cement binder and fine aggregate, acting as an intermediate that fills a particle size void between the largest cement particles and smallest fine aggregate particles. Supplemental lime can advantageously maintain or enhance balance of calcium ions in the mix water and/or pore solution. Supplemental sulfate can advantageously address sulfate deficiencies caused by high clinker reduction, use of water reducers and/or superplasticers, and SCMs containing aluminates. Such systematic approach to beneficially using quarry fines, limestone powder, SCMs, lime, and sulfate addresses many issues and permits high clinker reduction with similar or increased strength.

20 Claims, 10 Drawing Sheets

(56) References Cited

U.S. PATENT DOCUMENTS

| | | | |
|---|---|---|---|
| 6,027,561 A | 2/2000 | Gruber et al. |
| 6,030,447 A | 2/2000 | Naji et al. |
| 6,277,189 B1 | 8/2001 | Chugh |
| 6,444,026 B1 | 9/2002 | Steffler et al. |
| 6,451,105 B1 | 9/2002 | Turpin, Jr. |
| 6,641,658 B1 | 11/2003 | Dubey |
| 6,691,628 B2 | 2/2004 | Meyer et al. |
| 6,695,911 B2 | 2/2004 | Ramesohl et al. |
| 6,936,098 B2 | 8/2005 | Ronin |
| 7,172,814 B2 | 2/2007 | Hodson |
| 7,214,414 B2 | 5/2007 | Khemani et al. |
| 7,240,867 B2 | 7/2007 | Ronin |
| 7,296,994 B2 | 11/2007 | Meyer et al. |
| 7,347,896 B2 | 3/2008 | Harrison |
| 7,419,544 B2 | 9/2008 | Naji et al. |
| 7,442,248 B2 | 10/2008 | Timmons |
| 7,445,668 B2 | 11/2008 | Sommain |
| 7,799,128 B2 | 9/2010 | Guynn et al. |
| 7,972,432 B2 | 7/2011 | Guynn et al. |
| 8,043,425 B2 | 10/2011 | Garcia |
| 8,246,739 B2 | 8/2012 | Schwartzentruber et al. |
| 8,323,399 B2 | 12/2012 | Guynn et al. |
| 8,377,201 B2 | 2/2013 | Guynn et al. |
| 8,414,700 B2 | 4/2013 | Guynn et al. |
| 8,551,245 B2 | 10/2013 | Guynn et al. |
| 8,912,255 B2 | 12/2014 | Wells et al. |
| 8,974,593 B2 | 3/2015 | Guynn et al. |
| 9,238,591 B2 | 1/2016 | Guynn et al. |
| 9,272,953 B2 | 3/2016 | Wilson |
| 9,957,196 B1* | 5/2018 | Guynn ............ C04B 18/141 |
| 2001/0013302 A1 | 8/2001 | Mathur et al. |
| 2001/0020654 A1 | 9/2001 | Strasser et al. |
| 2003/0056935 A1 | 3/2003 | Meyer et al. |
| 2004/0035330 A1 | 2/2004 | Oates et al. |
| 2004/0089202 A1 | 5/2004 | Ronin |
| 2004/0089203 A1 | 5/2004 | Ronin |
| 2004/0112255 A1 | 6/2004 | Bruno et al. |
| 2005/0000393 A1 | 1/2005 | Virtanen |
| 2005/0132933 A1 | 6/2005 | Blum |
| 2005/0204962 A1 | 9/2005 | Luke et al. |
| 2005/0252421 A1 | 11/2005 | Ronin |
| 2006/0201395 A1 | 9/2006 | Barger et al. |
| 2007/0095255 A1 | 5/2007 | Abbate et al. |
| 2007/0265783 A1 | 11/2007 | Mound |
| 2007/0266906 A1 | 11/2007 | Garcia |
| 2008/0178770 A1 | 7/2008 | Schumacher et al. |
| 2009/0020044 A1 | 1/2009 | Constantz et al. |
| 2009/0121052 A1 | 5/2009 | Ronin et al. |
| 2009/0305019 A1 | 12/2009 | Chanvillard et al. |
| 2009/0312460 A1 | 12/2009 | Lorenz et al. |
| 2010/0043673 A1 | 2/2010 | Batoz et al. |
| 2010/0294171 A1 | 11/2010 | Schwartzentruber et al. |
| 2010/0326326 A1 | 12/2010 | Rigaud et al. |
| 2011/0067601 A1 | 3/2011 | Fried |
| 2011/0259246 A1* | 10/2011 | Guynn ............ C04B 28/02 106/707 |
| 2012/0012034 A1* | 1/2012 | Guynn ............ B02C 21/00 106/709 |
| 2012/0024198 A1 | 2/2012 | Schwartzentruber et al. |
| 2012/0037045 A1 | 2/2012 | Fonollosa et al. |
| 2012/0145046 A1 | 6/2012 | Hansen et al. |
| 2013/0036948 A1 | 2/2013 | Fernandez et al. |
| 2013/0192493 A1 | 8/2013 | Guynn et al. |
| 2015/0069647 A1 | 3/2015 | Cuiperca |

FOREIGN PATENT DOCUMENTS

| | | |
|---|---|---|
| EP | 0088587 | 9/1983 |
| EP | 0263723 | 4/1988 |
| EP | 0611081 | 8/1994 |
| EP | 1413563 | 4/2004 |
| FR | 2943663 | 10/2010 |
| JP | 2002/068806 | 3/2002 |
| JP | 2008184353 | 8/2008 |
| KR | 1019840001611 | 9/1984 |
| KR | 10-0183536 | 5/1999 |
| WO | WO199217415 | 10/1992 |
| WO | WO199746717 | 12/1997 |
| WO | WO200050362 | 8/2000 |
| WO | WO2001023317 | 4/2001 |
| WO | WO2000216281 | 2/2002 |
| WO | WO2007053398 | 5/2007 |
| WO | WO2008069115 | 6/2008 |
| WO | WO20100109095 | 9/2010 |
| WO | WO2011103371 | 8/2011 |
| WO | 2014/015289 | 1/2014 |

OTHER PUBLICATIONS

Bentz, "Considerations of Designing High Volume Fly Ash Mixtures," ACI 2009 Spring Convention, Research in Progress, Powerpoint Presentation, pp. 1-5, presented Mar. 16, 2009.

Bentz et al., "Effects of cement particle size distribution on performance properties of Portland cement-based materials", Cement and Concrete Research 29, pp. 1663-1671, Jul. 14, 1999.

Bentz, et al., "Influence of Particle Size Distributions on Yield Stress and Viscosity of Cement-Fly Ash Pastes," (Accepted for Publication in Cement & Concrete Composites Nov. 2011).

Bentz, D., "Limestone Fillers Conserve Cement, Part 1: An analysis based on Powders' model", Concrete International, pp. 41-46, Nov. 2009.

Bentz et al., "Mixture Proportioning Options for Improving High Voume Fly Ash Concretes", at least as early as Feb. 19, 2010 at http://concrete.nist.gov/bentz.

Bentz et al. "Optimization of cement and fly ash particle sizes to produce sustainable concretes," Cement & Concrete Composites 33 (2011) 824-831 (Available online May 7, 2011).

Bentz et al., "Optimization of Particle Sizes in High Volume Fly Ash Blended Cements," NISTIR (Feb. 2011).

Bentz, D., "Replacement of "coarse" cement particles by inert fillers in low w/c ratio concretes II. Experimental validation", Cement and Concrete Research 35, pp. 185-188, Sep. 3, 2004.

Celik, I.B., "The effects of particle size distribution and surface area upon cement strength development," Powder Technology 188 (2009) 272-276, Available online Aug. 8, 2008.

Cros et al., "Image Analysis of Fly Ash in the Characterization of the Shape of the Grains", 1995, [Retrieved May 15, 2012] Retrieved from http://journals.cambridge.org/download.

Cross et al., "Evaluation of the Durability of 100 Percent Fly Ash Concrete," Western Transportation Institute, Final Report Nov. 2006 through Jun. 2008, 45 pages.

De Weerdt et al., Hydration mechanisms of ternary Portland cements containing limestone powder and fly ash, Cement & Concrete Research (Accepted Nov. 19, 2010).

De Weerdt et al., Synergy between fly ash and limestone powder in ternary cements, Cement & Concrete Composites (Accepted Sep. 7, 2010).

Durán-Herrera et al., "Evaluation of Sustainable High-Volume Fly-Ash Concretes", National Institute of Standards and Technology, (2009).

Durán-Herrera et al., "Synergetic effect of a Polycarboxylate Superplasticizer and a Fly Ash in the Production of a Concrete with conventional water/binder ratios"; Ninth ACI International Conference on Superplasticizers and Other Chemical Admixture Program, American Concrete Institute, Oct. 12, 2009.

Fennis, et al., "The use of particle packing models to design ecological concrete," HERON vol. 54, No. 2/3 (2009).

Gibbons, P., Pozzolans for Lime Mortars, The Building Conservation Directory 1997, http://www.buildingconvservation.com/articles/lime/pozzo.htm, pp. 1-5, Sep. 5, 2008

Grzeszcyk et al, "Effect of Content and Particle Size Distribution of High-Calcium Fly Ash on the Rheological Properties of Cement Pastes", Cement and Concrete Research, vol. 27, No. 6, pp. 907-916, 1997.

Gurney et al., Using Limestone to Reduce Set Retardation in High Volume Fly Ash Mixtures: Improving Constructability for Sustainability, National Institute of Standards and Technology (Submission Date: Aug. 1, 2011).

(56) References Cited

OTHER PUBLICATIONS

Harbour et al., Characterization of Slag, Fly Ash and Portland Cement for Saltstone (Feb. 2006).
Hasler, et al., "Particle Size Distribution of the Fly Ash From Biomass Combustion," Biomass for Energy and Industry, 10th European Conference and Technology Exhibition, Würzburg (Germany), Jun. 8-11, 1998.
Horst, Scot, "Some Basics About Substituting Pozzolans for Portland Cement in Concrete," as taken from presentation handout with author's permission, USGBC Member Summit, Tucson, AZ, pp. 1-7, Aug. 2001.
Hwang et al., "Rheological behavior of a slag cement paste prepared by adjusting the particle size distribution", Journal of Ceramic Processing Research, vol. 10, No. 4, pp. 409-413, (2009).
International Preliminary Report on Patentability dated Apr. 21, 2011 from PCT Application Serial No. PCT/US2009/060194.
International Search Report and Opinion dated May 6, 2010 from PCT Application Serial No. PCT/US2009/060194.
Lan et al., The Application and Development of Fly Ash in China, 2007 World of Coal Ash (WOCA), May 7-10, 2007, Northern Kentucky, USA.
Lee et al., "Effect of Particle Size Distribution of High Calcium Fly Ash on the Rheological Properties of fly ash-cement system on the fluidity of cement pastes," Cement and Concrete Research, 33 (2003), 763-768.
Malvern, "Inform-Reducing the Cost of Cement Production Benefits to Vulcan Materials Decision to Upgrade its Finishing Circuit from Manual to Automated Process Monitoring and Control," World Cement, Jul. 2009.
Mehta, K., "High-Performance, High-Volume Fly Ash Concrete for Sustainable Development," Proceedings of the International Workshop on Sustainable Development & Concrete Technology, pp. 3-14; May 2004.
Mejeoumov, "Improved Cement Quality and Grinding Efficiency by Means of Closed Mill Circuit Modeling," A Dissertation by Gleb Gennadievich Mejeoumov, Submitted to the Office of Graduate Studies of Texas A&M University in partial fulfillment of the requirements for the degree of Doctor of Philosophy, Dec. 2007.
Middendorf et al., "Lime Pozzolan Binders: An Alternative to OPC?*", International Building Lime Symposium 2005, Orlando, Florida, pp. 1-13, Mar. 9-11, 2005.
Moore, D., "The Riddle of Ancient Roman Concrete", www.romanconcrete.com/docs/spillway/'spillway.htm., Feb. 1993.
OK Vertical Roller Mill, Product brochure published by FLSmidth (2010).
Osbaeck, B. and Johansen, V., "Particle Size Distribution and Rate of Strength Development of Portland Cement," J. Am. Ceram. Soc., 72 (2) pp. 197-201, Feb. 1989.
Sato et al., Effect of nano-$CaCO_3$ on hydration of cement containing supplementary cementitious materials, Advances in Cement Research, 23, (1), pp. 1-29, Oct. 2010.
Shah, Surendra P. and Wang, Kejin, "Development of "Green" Cement for Sustainable Concrete Using Cement Kiln Dust and Fly Ash," Dept. of Civil Engineering, Northwestern University, Evanston, IL USA and Dept. of Civil Engineering Iowa State University, Ames IA USA, pp. 15-23 (at least as early as Feb. 2009).
Stutzman et al., "Compositional Analysis of Beneficiated Fly Ashes", NISTIR 5598, May 1995.
Thomas et al., "Use of ternary cementitious systems containing silica fume and fly ash concrete," Elsevier Science Ltd. Sep. 21, 1999.
Uzal et al., "High Volume Natural Pozzolan Concrete for Structural Applications", Business Publications, ACI Materials Journal, Sep./Oct. 2007.
Van Oss, Background Facts and Issues Concerning Cement and Cement Data, USGS (2005).
Vogt, Carsten, "Ultrafine particles in concrete: Influence of ultrafine particles on concrete properties and application to concrete mix design," Doctoral Thesis, School of Architecture and the Build Environment Division of Concrete Structures, Royal Institute of Technology, Sweden, TRITA-BKN. Bullentin 103, 2010.
Wang, et al., "Comparison of Coal Ash Particle Size Distributions from Berner and Dekati Low Pressure Impactors," Armand Science & Technology, 41:1049-1062, 2007.
Yilmaz, A., "Relationship Between Compressive and Chemical Compositions of Portland and Pozzolanic Cements", BAÜ Fen Bil. Enst. Dergisi, 5.2, pp. 4-13, 2003.
Zhang et al., A new gap-graded particle size distribution and resulting consequences on properties of blended cement (Accepted Manuscript) (Accepted Date: Feb. 24, 2011).
Zhang et al., "Effects of size fraction on Composition and fundamental properties of Portland cement" Construction and Building Materials 25 (2011), pp. 3038-3043.
Zhang et al., "Efficient utilization of cementitious materials to produce sustainable blended cement", Cement & Concrete Composites 34 (2012) pp. 692-699.
Zhang et al., "A gap-graded particle size distribution for blended cements: Analytical approach and experimental validation", Powder Technology 214 (2011) pp. 259-268.
Zhang et al., "Influence of preparation method on the performance of ternary blended cements", Cement & Concrete Composites 52 (2014) pp. 18-26.
Zhang et al., "Investigation on mechanical properties, durability and micro-structural development of steel slag blended cements", J. Therm. Anal. Calorim., DOI 10.1007/s 10973-011-1853-6.
Zhang et al., "A new gap-graded particle size distribution and resulting consequences on properties of blended cement," Cement & Concrete Composites 33 (2011) 543-550 (Available online Mar. 1, 2011).
Zhang et al., "Study on optimization of hydration process of blended cement," J. Therm. Anal. Calorim. DOI 10.1007/s10973-011-1531-8 (Published online: Apr. 8, 2011).
Zhou et al., "Research on Powder Degree Distribution on Influencing the Physical Characteristics of Compound Cement".
"About Pozzolans, Pozzolans General Description," Vitro Minerals, http://www.vitrominerals.com/printable%20pages/tech-infor.htm, Dec. 17, 2008.
Basalite Concrete Products, "Microcem-Microfine Cement," (at least as early as Jun. 2006).
"Blender dedusts fly ash with minimal moisture to cut transport costs," Case History, Powder and Bulk Engineering, www.powderbulk.com, Jul. 2001.
"Cement Substitutes, By-Products from other manufacturing or electric generating processes can be substituted for cement", Toolbase Services, NAHB Research Center (At least as early as Jul. 14, 2009).
"Cement Types," Ceratech, www.ceratechinc.com/cement.asp, Sep. 5, 2008.
"Cement", Wikipedia, http://en.wikipedia.org/wiki/Hydraulic_cement, Sep. 5, 2008.
Chinese Office Action for Chinese App. No. 201280063750.2 dated Jun. 2, 2015.
Columbian Office Action for Columbian App. No. 14-72033 dated Jul. 28, 2015.
"Composition of cement", www.engr.psu.edu/ce/courses/ce584/concrete/library/construction/curing/Composition_of_cement, Feb. 18, 2014.
Concrete Batching, EPA, Jun. 2006, 11.12-1-11.12-14.
"CT-Microcem Ultra Fine Cement", Finland CT (at least as early as Jan. 2009).
"Effect of Cement Characteristics on Concrete Properties," Portland Cement Association, Oct. 26, 2007, http://web.archive.org/web/20071026182145/http://www.cement.org/tech/cct_cement_characteristics.asp.
"Engineering news, opinion and product reports for engineers in process, design, electronics, energy and chemical engineering", Particle Size Analysis Reduces Cement Manufacturing Costs—Engineer Live, for Engine . . . http://www.engineerlive.com/Process-Engineer/Materials_Handling/Particle_size_analysis . . . , pp. 1-7, Oct. 25, 2009.
European Search Report for European App. No. EP12841852 dated Aug. 4, 2015.

(56) References Cited

OTHER PUBLICATIONS

"Florida Rock slashes production costs using advanced process control and real-time particle size analysis", Real-time Particle Size Analysis—Forums, http://www.bulk-online.com/Forum/showthread.php?threadid=18052, (At least as early as Oct. 25, 2009).
"Fly Ash, Slag, Silica Fume, and Natural Pozzolans", Design and Control of Concrete Mixtures, EB001, Chapter 3, pp. 57-72.
"Fly Ash Increases Resistance to Sulphate Attack", QCL Group Technical Note, Aug. 1995, pp. 1-2.
"Fly Ash," U.S. Department of Transportation, Infrastructure Materials Group, http://fhwa.dot.gov/infrastructure/materialsgrp/flyash.htm, Jan. 10, 2009.
"Fly ash", Wikipedia, http://en.wikipedia.org/wiki/Fly_ash, Jan. 10, 2009.
IPRP dated Nov. 30, 2009 from PCT App. Serial No. PCT/GB2008/003739.
"Pozzolan," Wikipedia, http://en.wikipedia.org/wiki/Pozzolan, Jan. 10, 2009.
"Pozzolete, a natural resource," Natural Pozzolan of Nevada, http://www.naturalpozzolan.com/pozzolete/index.html, Dec. 17, 2008.
Pure Natural Pozzolan Cement, Azmar International, Inc., pp. 1-11 (at least as early as Jul. 2008).
"Roman Concrete", Wikipedia, http://en.wikipedia.org/wiki/Roman_cement, Jan. 10, 2009.
SImetric, Retrieved May 15, 2012, Retrieved from http://www.simetric.co.uk/si_materials.htm.
Technical Evaluation of Energetically Modified Cement, ISG Resources Inc., pp. 1-4, Aug. 2001.
"The Cement Sustainability Initiative—Climate Actions", World Business Council for Sustainable Development ("WBCSD"), Nov. 2008.
"Understanding Cement, Cement science made easier, Variability of cement", http://www.understanding-cement.com/history.html, Jan. 10, 2009.
"Understanding Cement, Cement science made easier, Variability of cement", http://www.understanding-cement.com/variability.html, Jan. 10, 2009.
WiseGeek, "What is a Cement Silo?", http://www.wisegeek.com/what-is-a-cement-silo.htm.
U.S. Appl. No. 12/576,117, filed Oct. 8, 2009, Notice of Allowance dated Jul. 22, 2010.
U.S. Appl. No. 12/848,945, filed Aug. 2, 2010, Office Action dated Oct. 15, 2010.
U.S. Appl. No. 12/848,945, filed Aug. 2, 2010, Office Action dated Dec. 28, 2010.
U.S. Appl. No. 12/848,945, filed Aug. 2, 2010, Notice of Allowance dated Mar. 3, 2011.
U.S. Appl. No. 13/183,205, filed Jul. 14, 2011, Restriction Requirement dated Mar. 19, 2012.
U.S. Appl. No. 13/175,636, filed Jul. 1, 2011, Office Action dated Apr. 30, 2012.
U.S. Appl. No. 13/183,205, filed Jul. 14, 2011, Office Action dated May 3, 2012.
U.S. Appl. No. 13/315,089, filed Dec. 8, 2011, Office Action dated May 3, 2012.
U.S. Appl. No. 13/175,636, filed Jul. 1, 2011, Notice of Allowance dated Aug. 1, 2012.
U.S. Appl. No. 13/183,205, filed Jul. 14, 2011, Final Office Action dated Oct. 2, 2012.
U.S. Appl. No. 13/315,089, filed Dec. 8, 2011, Final Office Action dated Oct. 2, 2012.
U.S. Appl. No. 13/315,089, filed Dec. 8, 2011, Notice of Allowance dated Nov. 6, 2012.
U.S. Appl. No. 13/183,205, filed Jul. 14, 2011, Notice of Allowance dated Dec. 6, 2012.
U.S. Appl. No. 13/308,535, filed Nov. 30, 2011, Office Action dated Jan. 11, 2013.
U.S. Appl. No. 13/030,123, filed Feb. 17, 2011, Office Action dated Mar. 26, 2013.
U.S. Appl. No. 13/798,756, filed Mar. 13, 2013, Notice of Allowance dated Jun. 4, 2013.
U.S. Appl. No. 13/030,123, filed Feb. 17, 2011, Final Office Action dated Sep. 12, 2013.
U.S. Appl. No. 13/030,123, filed Feb. 17, 2011, Advisory Action dated Dec. 5, 2013.
U.S. Appl. No. 13/030,123, filed Feb. 17, 2011, Office Action dated Feb. 24, 2014.
U.S. Appl. No. 13/357,121, filed Jan. 24, 2012, Office Action dated Apr. 14, 2014.
U.S. Appl. No. 13/906,201, filed May 30, 2013, Office Action dated Jun. 12, 2014.
U.S. Appl. No. 14/343,136, filed Mar. 6, 2014, Office Action dated Jun. 25, 2014.
U.S. Appl. No. 13/030,123, filed Feb. 17, 2011, Final Office Action dated Aug. 27, 2014.
U.S. Appl. No. 13/357,121, filed Jan. 24, 2012, Final Office Action dated Sep. 22, 2014.
U.S. Appl. No. 14/343,136, filed Mar. 6, 2014, Notice of Allowance dated Oct. 20, 2014.
U.S. Appl. No. 13/357,121, filed Jan. 24, 2012, Advisory Action dated Nov. 6, 2014.
U.S. Appl. No. 13/030,123, filed Feb. 17, 2011, Advisory Action dated Nov. 19, 2014.
U.S. Appl. No. 13/906,201, filed May 30, 2013, Final Office Action dated Jan. 2, 2015.
U.S. Appl. No. 13/030,123, filed Feb. 17, 2011, Notice of Allowance dated Feb. 26, 2015.
U.S. Appl. No. 13/357,121, filed Jan. 24, 2012, Office Action dated Feb. 26, 2015.
U.S. Appl. No. 13/906,201, filed May 30, 2013, Notice of Allowance dated Mar. 30, 2015.
U.S. Appl. No. 14/602,869, filed Jan. 22, 2015, Office Action dated May 28, 2015.
U.S. Appl. No. 14/305,954, filed Jun. 16, 2014, Notice of Allowance dated Jul. 22, 2015.
U.S. Appl. No. 14/602,869, filed Jan. 22, 2015, Notice of Allowance dated Sep. 22, 2015.
International Search Report and Written Opinion cited in PCT/US2018/013097, dated May 10, 2018. (12 pages).
Magistri, Mario et al., "Investigation on the reactivity of cement additives in blended cements" R&D Cement Additives Division & Analytical Lab, Mapei SpA, Milan, Italy, 10 pages.
De Weerdt, Klaartje et al. "Fly ash-limestone ternary composite cements: synergetic effect at 28 days." 20 pages.
Bentz D. P. et al., "Minimizing paste content in concrete using limestone powders—demonstration mixtures" National Institute of Standards and Technology, U.S. Department of Commerce, Jan. 2016, 49 pages.
Phung, Quoc Tri et al., "Effect of limestone fillers on microstructure and permeability due to carbonization of cement pastes under controlled CO2 pressure conditions" Construction and Building Materials, 2015, 15 pages.
Naik, Tarun R. et al., "Use of fly ash and limestone quarry by-products for developing economical self-compacting concrete" International Congress on Fly Ash Utilization, Dec. 4-7, 2005, New Delhi, India, 18 pages.
Hooton, R.D. et al. "Portland-Limestone Cement: State-of-the-Art Report and Gap Analysis for CSA A 3000" Cement Associate of Canada, University of Toronto, 2007, 59 pages.
Mumacooglu, T. Kuxnetsov et al. "Development of sustainable mortar and concrete made of limestone blended cement—influence of particle size" $9^{th}$ International Conference on Fracture Mechanics of Concrete and Concrete Fractures, May 2016, 7 pages.
Mikhailova, Olesia et al., "Effect of dolomite limestone powder on the compressive strength of concrete" $11^{th}$ International Conference on Modern Building Materials, Structures and Techniques, MBMST 2013, 6 pages.
Shrivastava, Anil Kumar et al., "Effect of quarry fines in concrete" IJSRD—International Journal for Scientific Research & Development, vol. 3, Issue 01, 2015, ISSN: 2321-0613; 4 pages.

(56) References Cited

OTHER PUBLICATIONS

Bentz, D.P. et al., "Fine limestone additions to regulate setting in high volume fly ash mixtures" Cement and Concrete Composites, Oct. 2011, 16 pages.

Preethi G. et al., "Effect of replacement of cement with dolomite powder on the mechanical properties of concrete" IJISET—International Journal of Innovative Science, Engineering & Technology, Vo. 2, Issue 4, Apr. 2015, 6 pages.

Jeknavorian, Ara et al., "Use of chemical admixtures to modify the rheological behavior of cementitious systems containing manufactured aggregates" 2010 Concrete Sustainability Conference, National Ready Mixed Concrete Association, 14 pages.

Kankam, Charles K. et al., "Stress-strain characteristics of concrete containing quarry rock dust as partial replacement of sand" Case Studies in Construction Materials 7 (2017), 7 pages.

Kumar, Doraiswamy Sentil et al., "Use of quarry fines for engineering and environmental applications" Special research report for the National Stone Association, Oct. 1992, 139 pages.

Phung, Quoc Tri et al., "Effect of Limestone Fillers on Ca-Leaching and Carbonization of Cement Pastes" Key Engineering Materials, Sep. 2016, 9 pages.

Zhang, Zhong et al., "Effect of Limestone Powder on Microstructure of Ternary Cementitious System" Second International Conference on Sustainable Construction Materials: Design Performance, and Application, Oct. 18-22, 2012, 10 pages.

Matschei, Thomas et al. "The Role of Calcium Carbonate in Cement Hydration" Cement and Concrete Research 37 (2007), Feb. 23, 2006, 9 pages.

Muhit, Imrose B. et al."Determination of mortar strength using stone dust as a partially replaced material for cement and sand" Advances in Concrete Construction, vol. 2, No. 4 (2014) pp. 249-259.

Phung, Quoc Tri et al., "Effects of W/P Ratio and Limestone Filler on Permeability of Cement Pastes" Proceeding of the International RILEM Conference, Materials, Systems and Structures in Civil Engineering Aug. 22-24, 2016, 14 pages.

Zipf, Carl "Portland-Limestone Blended Cement" PowerPoint presentation, Portland Cement Association, DeIDOT—2014, 21 slides.

Author Unknown, "User Guidelines for Waste and Byproduct Materials in Pavement Construction" Publication No. FHWA-RD-97-148, Federal Highway Administration Research and Technology, U.S. Department of Transportation, Last Updated Mar. 8, 2016, 9 pages.

N. Kavibala, "Experimental Study on Partial Replacement of Cement with Marble Powder and Fine Aggregate with Quarry Dust and with Addition of Polypropylene Fiber" International Conference on Current Research in Engineering Science and Technology (ICCREST-2016) E-ISSN: 2348-8352, 4 pages.

Safiuddin, Md et al., "Utilization of Quarry Waste Fine Aggregate in Concrete Mixtures" Journal of Applied Sciences Research, 3(3): 202-208, 2007, 8 pages.

* cited by examiner

USE OF QUARRY FINES AND/OR LIMESTONE POWDER TO REDUCE CLINKER CONTENT OF CEMENTITIOUS COMPOSITIONS

CROSS-REFERENCE TO RELATED APPLICATION

This Application claims the benefit of U.S. Provisional Application No. 62/522,274, filed Jun. 20, 2017, U.S. Provisional Application No. 62/451,533, filed Jan. 27, 2017, U.S. Provisional Application No. 62/451,484, filed Jan. 27, 2017, and U.S. Provisional Application No. 62/444,736, filed Jan. 10, 2017, the disclosures of which are incorporated herein by reference in their entirety.

BACKGROUND OF THE INVENTION

1. Field of the Invention

The invention is generally in the field of cementitious compositions, hydraulic cements, blended cements, supplementary cementitious materials, quarry fines, limestone powder, performance-enhancing particulate pre-mixes, and methods of manufacture.

2. Relevant Technology

The cement and concrete industry continuously searches for new ways to substitute Ordinary Portland Cement (OPC) with alternative materials that are cost-effective and have lower carbon footprint. The manufacture of OPC generates enormous quantities of $CO_2$, representing an estimated 5-7% of manmade $CO_2$. In general, manufacturing a ton of OPC releases almost a ton of $CO_2$ into the atmosphere. With worldwide cement production being about 4.2 billion tons per year, the manufacture of cement creates approximately 4 billion tons of $CO_2$ per year. Cement is also the most costly component in concrete (based on unit cost and quantity added). Reducing clinker content and other cementitious binders is desirable because it reduces production of $CO_2$ and cost.

Ground granulated blast furnace slag (GGBFS), fly ash, natural pozzolans, silica fume, and other mineral substitutes ("supplementary cementitious materials" or "SCMs") have been used as components of blended cement and/or as partial cement substitutes in concrete. When used in blended cement, SCMs are often interground with clinker. To offset strength loss, interground blended cements are typically ground more finely than OPC, which makes them more reactive but can detrimentally increase water demand and concrete durability. There is also an upper limit to how much clinker can be substituted with SCMs before there is serious loss in strength, especially early strength. While SCMs are widely used, a substantial portion of known SCMs, including much of the fly ash produced, are not used but discarded into the environment or otherwise remain undeveloped. In spite of known environmental and economic benefits in reducing clinker content through increased use of SCM, SCM utilization remains suboptimal because of substantial technical hurdles.

Limestone has been interground with cement clinker to make Portland-limestone cement. Limestone is softer and more easily ground than cement clinker and forms predominantly in the ultrafine fraction. Because limestone has no cementitious or pozzolanic properties, only limited quantities of limestone can be interground with cement without seriously affecting strength, durability and other performance criteria. Until recently, ASTM C-150 did not permit any limestone addition to Types I-V cement. In 2003, Hawkins et al. of the Portland Cement Association published a paper entitled "The Use of Limestone in Portland Cement: A State-of-the-Art Review", which advocated a change in ASTM C-150 to permit up to 5% limestone addition in OPC. In 2004, ASTM C-150 was amended to permit limestone additions of up to 5% in Types I-V cement. In 2012, ASTM approved a proposal to amend ASTM C-595 (blended cements) to permit inclusion of 5-15% limestone. These standards indicate that the use of limestone as a substitute for cement clinker is limited compared to SCMs such as GGBFS and fly ash, which are commonly used in amounts greater than 15% and which can contribute to long-term strength development (although they commonly reduce early strength). Because interground Portland-limestone cement must be ground more finely to avoid serious strength loss, there is little or no economic benefit compared to OPC. The main benefit appears to be to cement companies, which have an abundant supply of limestone and can use it as a filler to stretch clinker and increase production capacity. Little or no cost benefit is passed on to customers. Blended cements typically can cost the same or more than OPC, making them less attractive than OPC because of performance loss. For example, intergrinding clinker, natural pozzolan, and limestone in Mexico yields blend cement with pour performance. From a technical standpoint, a major drawback is the inability to control the respective particle size distributions (PSDs) of the cement and limestone particles when interground. This creates variability and uncertainty in performance.

Researchers have used separately processed fine or ultrafine limestone (sometimes called "nano-limestone") to replace cement clinker, including to augment strength in high volume fly ash (HVFA) mortars. Ultrafine limestone has also been used in ultra-high performance concrete (UHPC) as an ultrafine mineral filler similar to silica fume to decrease pore size and increase paste density. In ultrafine limestone, most or all of the particles are less than about 8 µm in size). Though found to enhance strength, ultrafine limestone is typically as expensive or more expensive than OPC and is therefore not economically feasible for general purpose cements and concrete.

A promising source of low cost limestone or other mineral powder is leftover quarry fines (sometimes called "rock dust" or "quarry by-products") from aggregate manufacture. By way of background, processing of crushed stone for use as construction aggregate consists of blasting, primary and secondary crushing, washing, screening, and stockpiling operations.

Quarry by-products are produced during crushing and washing operations. According to a publication by the Federal Highway Association (FHWA-RD-97-1480) (last modified Mar. 8, 2016), there are generally three types of quarry by-products resulting from these operations: screenings, pond fines, and baghouse fines.

"Screenings" refers to the finer fraction of crushed stone that accumulates after primary and secondary crushing and separation on a 4.75 mm (No. 4) sieve. The size distribution, particle shape, and other physical properties can be somewhat different from one quarry location to another, depending on the geological source of the rock quarried, the crushing equipment used, and the method used for coarse aggregate separation. Screenings contain freshly fractured faces, have a fairly uniform gradation, and do not usually contain large quantities of plastic fines. Screenings are a uniformly sized, fine, sandy material with some silt particles. Screenings commonly range in particle size from 3.2 mm (⅛ inch) down to finer than 75 µm (No. 200 sieve). Normally, the percentage of particle sizes finer than 75 µm is 10% or less by weight. Stockpiles of screenings may contain some particles up to 4.75 mm (No. 4 sieve) in size, which is usually the screen size used for separation. Some weathered rock or overburden material may be present in the screenings from certain processing operations "Settling pond fines" refers to the fines obtained from washing crushed stone aggregate. During production, the coarser size range (greater than No. 30 sieve) from washing may be recovered by means of a sand screw classifier. The remainder of the fines in the overflow is discharged to a series of sequential settling ponds or basins, where they settle by gravity, sometimes with the help of flocculating polymers. "Pond clay" is usually used to describe waste fines derived from the washing of natural sands and gravels. Pond fines, when initially recovered from the pond, consist of low solids content, fine-grained slurry, usually with 90-95% of the particles finer than 150 µm (No. 100 sieve) and 80% or more finer than 75 µm.

"Baghouse fines" are produced in quarries that operate as dry plants because of dry climatic conditions or a lack of market for washed aggregate products. Dry plant operation requires the use of dust collection systems, such as cyclones and baghouses, to capture dusts generated during crushing operations. These dusts are referred to as baghouse fines. Although particle sizing may vary somewhat with fines from different types of stone, the range in particle size is from 75 µm (No. 200 sieve) down to 1 µm or finer. Baghouse fines can be a source of "nano-limestone" when milled or classified to average particle size of about 1-8 µm.

It is estimated that in the U.S. alone at least 159 million metric tons (175 million tons) of quarry by-products are generated each year, mostly from crushed stone production operations. As much as 3.6 billion metric tons (4 billion tons) of quarry by-products may have accumulated in the U.S. According to FHWA-RD-97-1480, it is assumed that very little of the 159 million metric tons (175 million tons) produced annually are used, especially pond fines. In a recent survey, three states (Arizona, Illinois, and Missouri) indicated that quarry by-products have been used as an embankment material, and three other states (Florida, Georgia, and Vermont) indicated some use of quarry by-products in base or subbase applications. Use has been made of limestone screenings as agricultural limestone, and baghouse fines from quarry sources have been used as mineral filler in asphalt paving. Limited quantities of baghouse fines have been provided and/or milled and/or classified to provide nano-limestone for laboratory testing; however, there has been no consistent use of these or other quarry fines in concrete.

Quarry fines can be used in coal mines as "mine safety dust". Combustible coal dust that is emitted into the air and settles on objects in a coal mine creates a dangerous risk of mine explosions. Coal dust also causes "black lung" in miners. Dusting of coal mines with rock dust reduces the danger of explosions by diluting the combustible dust in the mine with a noncombustible dust, sometimes by misting with water to wash particulates out of the air. The fineness desired for the non-combustible dust is 100% passing a No. 20 sieve and at least 50% passing No. 200 sieve. Because silica-based dust is harmful if inhaled, limestone-based quarry fines (limestone rock dust) are considered to be a safer option for mine safety dust because they have low silica content. An example of limestone-based mine safety dust is a product produced and sold as coal mine rock dust by Staker Parson, headquartered in Ogden, Utah ("Staker"), a division of Oldcastle. Staker owns and operates an aggregate quarry that produces limestone and dolomitic limestone aggregates for many of Staker's ready-mix concrete facilities in Utah. Leftover quarry fines are collected, further milled, and sold to coal mine operators. Similar products are manufactured by other companies, such as Graymont, Blue Mountain Minerals, E. Dillon & Company, Carmeuse, and Omya. Quarry fines are not commonly used by concrete companies in the manufacture of concrete notwithstanding this material is made by concrete companies or aggregate producers, are readily available in the same locations as aggregates used in concrete, are a low cost by-product (e.g., retailing at about $2 to $8 per ton in bulk), and are produced in great abundance.

The reported reason that the cement and concrete industries have tried but failed to effectively use quarry fines in concrete is that they negatively and unpredictably increase water demand and negatively and unpredictably affect rheology (flow and workability properties). Jeknavorian et al., of W.R. Grace, published a paper in 2010 entitled "Use of Chemical Admixtures to Modify the Rheological Behavior of Cementitious Systems Containing Manufactured Aggregates," 2010 Concrete Sustainability Conference, National Ready Mixed Concrete Association ("Grace Article"). The Grace Article detailed the negative and unpredictable effects of quarry fines on rheology and other properties of concrete and noted that the most effective way to offset the negative effects of using manufactured sand containing large amounts of quarry fines is by increasing cement and/or SCM content. The Grace Article also stated that the main reason for using quarry fines is to produce sustainable concrete with locally produced materials notwithstanding the negative effects of quarry fines on concrete. However, using more cement makes concrete less sustainable. The Grace Article also explored the undesired interaction between polycarboxylate-based superplasticizers and clay-bearing aggregates containing high quantities of quarry fines. To address this issue, the Grace Article evaluated the interaction of both natural and manufactured sands with a bio-polymer type viscosity-modifying agent (VMA), a class of admixture used with angular-shaped fine aggregates. An admixture company attempting to find an admixture for quarry fines reportedly abandoned the project due to failure or lack of interest from the concrete industry.

Another reason why quarry fines are difficult to use is they do not fit into any specified category of materials used in concrete. The only two options explored by concrete companies and researchers has been to treat quarry fines as either an SCM used to replace or augment OPC or an aggregate. Because quarry fines do not behave like typical SCMs and are even finer than fine aggregates, their effect on strength and rheology are unpredictable and usually negative. The following question was asked at an academic cement conference in November 2017: "What is limestone powder? Cementitious binder or aggregate?" A noted expert in the field replied: "Neither." To which the follow-on question was asked: "Ok, then what ASTM standard specifies how limestone powder is to be used in concrete?" The noted expert replied: "There isn't one." This blind spot in ASTM standards, common practice, and among experts in the field highlights why it has heretofore been difficult, if not impossible, to intelligently utilize quarry fines and/or limestone powder to manufacture concrete having predictable strength and rheology.

The inability of the concrete industry to effectively utilize quarry fines is not surprising since anything that creates unpredictability, increased water demand, and/or performance loss is rejected by the concrete industry, which requires predictable and reproducible results when producing concrete guaranteed to satisfy prescribed standards set by building codes and engineers. Accordingly, there exists a long-felt but unsatisfied need to find a way to beneficially utilize quarry fines in concrete, with predictable strength and rheology, in order to produce more sustainable concrete. The failure of cement, concrete, and admixture companies to develop a systematic, reliable, and easily followed approach to utilize quarry fines/limestone powder in concrete, notwithstanding their great abundance, low cost, and the tremendous push over the past two decades to make more sustainable concrete, highlights the problem, the lack of any viable solution to the problem, and the acuteness of the long-felt but unsatisfied need.

SUMMARY

Disclosed herein are compositions and methods for manufacturing cementitious compositions that contain quarry fines and/or limestone powder with predictable water demand, predictable rheology, predictable strength, predictable admixture requirements, and other performance benefits. An example method comprises mixing together hydraulic cement, quarry fines and/or limestone powder, an aggregate fraction, and water so that the cementitious composition has a "defined water-to-cementitious binder ratio" ("defined w/cm"), and wherein a first portion of the quarry fines and/or limestone powder is defined as forming part of the cementitious binder so as to contribute to the defined w/cm and a second portion of the quarry fines and/or limestone powder is defined as forming part of the aggregate fraction so as to not contribute to the defined w/cm. Replacing both a portion of cementitious binder and aggregate with quarry fines and/or limestone powder can significantly reduce both clinker content and cost while maintaining desired and predictable strength, water demand, rheology, durability, admixture requirement, and other performance properties.

An example cementitious composition comprises hydraulic cement, quarry fines and/or limestone powder (e.g., having a d90 between about 50 μm and about 150 μm), an aggregate fraction, and water so that the cementitious composition has a defined w/cm, and wherein a first portion of the quarry fines and/or limestone powder is defined as forming to part of the cementitious binder so as to contribute to the defined w/cm and a second portion of the quarry fines and/or limestone powder is defined as forming part of the aggregate fraction so as to not contribute to the defined w/cm. Attributing a portion of the quarry fines and/or limestone powder as "cementitious binder" can reduce clinker content and account for the effect of the quarry fines and/or limestone powder on water demand without overstating it. Attributing a portion of the quarry fines and/or limestone powder to the aggregate fraction (e.g., as an "ultrafine aggregate" that is dispersed within the cement paste itself) provides a strength-enhancing filler effect by increasing total powder in the cement paste fraction without overstating its effect on strength. The quarry fines and/or limestone powder can beneficially increase particle packing density of the cement binder particles and yield a denser cement paste. They can also reduce autogenous, plastic, and drying shrinkage.

There is test showing suggesting that cement paste made with quarry fines can bind more strongly to coarse aggregates, leading to the hypothesis that proper use of quarry fines can densify cement paste in the interfacial transition zone (ITZ) between the bulk paste and coarse aggregate surfaces where paste strength is usually at a minimum due to a gradient of increasing w/cm in the direction from the bulk paste toward the coarse aggregate surface. It is further hypothesized that cement particles shrink when hydrating, causing higher plastic shrinkage of paste in the ITZ, which can forms microfissures that can decrease paste-aggregate bond strength and/or create pores that provide a pathway for ion transport, which can negatively affect durability and increase the chance of chemical attack of the cement paste and/or alkali-silica reaction (ASR) at the aggregate surface. Quarry fines and/or limestone particles are non-shrinking and are believed to provide nucleation sites for cement crystal growth. This may substantially increase paste density and reduce paste shrinkage in the ITZ, yielding higher paste-aggregate bond strength and/or improved resistance to chemical attack.

In some embodiments, it can be advantageous to identify a cutoff particle size between fine and coarse quarry fines and/or limestone powder particles, which can be used to define the particles as either "cement" (or "cementitious binder") or "aggregate" (or "non-cementitious filler") depending on whether they are smaller or larger than the cutoff particle size. By way of example and not limitation, if the cutoff particle size were defined as 45 μm, quarry fines and/or limestone particles at or smaller than 45 μm can be apportioned or designated as "cement" or "cementitious binder" that contribute to the defined w/cm, and particles larger than 45 μm can be apportioned or designated as "aggregate" that does not contribute to the defined w/cm, for purposes of designing concrete or other cementitious compositions having predictable water demand, rheology, and/or strength. The cutoff particle size can be empirically determined or it may be arbitrarily set or approximated based on experience. In general, the cutoff particle size can be any reasonable value that works in accordance with the disclosed methods. For example, it can be between about 15 μm and about 75 μm, or between about 20 μm and about 65 μm, or between about 25 μm and about 55 μm, or between about 30 μm and about 50 μm.

Defining or attributing a portion of quarry fines and/or limestone powder as "cementitious binder" that contribute to the "defined w/cm" during design and manufacture of concrete can perhaps be understood as fictitious or arbitrary because they are not ordinarily considered to be "cementitious binders." The term "defined w/cm" as used herein for purposes of designing and manufacturing concrete (which can also be called a "design w/cm") may be different than the "actual w/cm" as defined by ASTM, AASHTO, EN, engineers, concrete companies, or other established standards. Using conventional design methods or definitions, the actual w/cm will either consider all or none of the quarry fines and/or limestone powder to be "cementitious binder." As such, the defined w/cm used to design concrete having predictable strength and rheology will typically lie between a "higher actual w/cm" when none of the quarry fines and/or limestone powder are counted as forming part of the cementitious binder and a "lower actual w/cm" when all of the quarry fines and/or limestone powder are counted as forming part of the cementitious binder. Though perhaps fictitious or arbitrary, it has now been found that using a defined w/cm by defining one portion of quarry fines and/or limestone powder as "cementitious binder" and another portion as "aggregate" is much more accurate and predictive of the rheology and strength of the concrete. When none of the quarry fines and/or limestone powder are defined as cementitious binder, a higher actual w/cm is assumed, which underestimates both water demand and strength. Conversely, when all of the quarry fines and/or limestone powder are defined as cementitious binder, a lower actual w/cm is assumed, which overestimates both water demand and strength. Using a design w/cm through proper apportionment of quarry fines and/or limestone powder between cementitious binder and aggregate is a powerful tool because it more accurately and reproducibly predicts actual water demand and strength of the concrete mix. This, in turn, reduces or substantially eliminates uncertainty and lack of reproducibility, which are typically encountered when assuming either a higher or lower w/cm than the design w/cm as used herein.

The hydraulic cement binder may comprise ordinary Portland cement (OPC) as defined by ASTM C-150 or blended cement under ASTM 595. Alternatively, it may comprises a narrow PSD cement having a lower d90 and higher d10 compared to OPC, which reduces the amount of coarse particles not able to fully hydrate and the number of ultrafine particles that increase water demand without providing a corresponding strength benefit. Supplementary cementitious materials (SCMs) having pozzolanic and/or cementitious activity can be used and beneficially provide a substantial portion of fine and/or ultrafine particles of the overall cementitious binder system. Substituting at least a portion of the ultrafine cement particles (e.g., below about 3 µm) with ultrafine SCM particles substantially reduces water demand because ultrafine SCM particles do not significantly react with and consume water in the early stages during mixing and placement of concrete. SCMs are also less likely to flocculate like ultrafine cement particles during early stages of mixing and placement. Ultrafine SCMs are much more pozzolanically reactive than less fine SCM particles, greatly enhancing their strength contribution to the cementitious binder system. Quarry fines and/or limestone powder can provide a substantial portion of coarse particles in the cement paste. A coarse SCM may be included to provide particles that are coarser than the cement particles. In a well-optimized cementitious binder system, a substantial portion (e.g., majority) of the ultrafine particles less than 3 µm may comprise SCM particles, a substantial portion (e.g., majority) of medium sized particles (e.g., majority) between 3-30 µm may comprise hydraulic cement particles, and a substantial portion (e.g., majority) of coarse particles between 30-150 µm may comprise quarry fines and/or limestone powder, optionally in combination with coarse SCM particles between 30-150 µm. Strength and durability can be increased by increasing the overall powder content in the cement paste through the use of coarse quarry fines and/or limestone powder that provide a majority of particles between 30-150 µm. It will be appreciated that quarry fines and/or limestone powder are not required to have particles as large as 150 µm or be devoid of particles larger than 150 µm.

It has also been found that using a relatively small quantity of supplemental lime (e.g., 0.2-4.8% of hydrated lime by weight of cementitious binder) can improve rheology and enhance both early and late age strengths. It is believed that supplemental lime accelerates and is consumed in the pozzolanic reaction when a pozzolanic SCM is used. Hydrated lime adds calcium ions to the system while only adding hydroxyl ions. This feature helps restore proper ion balance in the event that the SCM consumes excessive calcium ions required for proper hydration of hydraulic cement. It also raises the pH of the system and may increase the rate of the pozzolanic reaction. It has been found that a relatively small quantity of supplemental lime works better than a large quantity. Using more supplemental lime than can be consumed in the pozzolanic reaction decreases strength by forming weak voids or pockets of soft filler particles. The ability of supplemental lime to react pozzolanically is limited by its low water solubility such the proper amount of supplemental lime is more closely related to the amount of water in the system than the stoichiometric amount that might theoretically react with the pozzolan.

It has also been found that using a relatively small quantity of supplemental sulfate (e.g., 0.2-2.5% of plaster of Paris by weight of the cementitious binder) to help maintain proper sulfate balance can help maintain normal set time, which can extend workability, and enhance early and late age strengths. A sulfate deficiency may occur when a substantial quantity of sulfate-carrying OPC is reduced and replaced with SCMs containing aluminates, which can compete for sulfate provided by the OPC. The tendency of quarry fines and/or limestone powder to accelerate cement hydration may also cause sulfate deficiency. The use of superplasticizers and other admixtures to deflocculate fine cement particles can increase the surface area of cement particles exposed to water, which can cause sulfate deficiency. Where a large amount of cement is replaced with other materials so that the water-to-cement ratio (w/c) is substantially higher than the water-to-cementitious binder ratio (w/cm), the excess water bathing the cement particles can increase cement hydration and cause sulfate deficiency.

In another aspect of the disclosed technology, a cementitious composition comprises ground Portland cement clinker and sulfate to control setting, a supplementary cementitious material (SCM) having pozzolanic properties, quarry fines and/or limestone powder comprising particles less than 50 µm in size, and at least one accelerator selected from the group consisting of lime, quicklime, hydrated lime, and Type S lime and that is included in an amount in a range of 0.1% to 4.8% by combined weight of hydraulic cement, SCM, and quarry fines and/or limestone powder having a particle size less than 50 µm. Such composition may or may not include quarry fines and/or limestone powder having a particle size greater than 50 µm. Such composition may optionally include supplemental sulfate.

Quarry fines and/or limestone powder can be blended with one or more performance-enhancing additives to yield a performance-enhancing particulate pre-mix that can be added to concrete or other cementitious mixture to substitute for a portion of the cement and/or aggregate components normally used in accordance with a given mix design. Performance-enhancing additives may include one or more of supplemental lime, supplemental sulfate, alkanolamines, water-reducing admixtures, superplasticizers, accelerators, retardants, and the like. Because quarry fines and/or limestone powder are non-reactive, additives containing water (e.g., calcium sulfate slurry or paste scrubber biproducts) can be blended with quarry fines and/or limestone powder without premature hydration, as would occur if added to a hydraulic cement binder prior to being used to make a fresh cementitious mixture.

The performance-enhancing particulate premix can be used to replace a portion of cementitious binder, including OPC, but especially blended cements comprising OPC and at least one SCM selected from slag, fly ash, bottom ash, natural pozzolan, ground glass, metakaolin, silica fume, and the like. Because of its low cost, which is less than, similar to, or only marginally more than the cost of aggregate, the premix may also be used to replace a portion of sand or other aggregate. Because water demand of the performance-enhancing particulate premix is typically less than cement, but more than aggregate, using it to replace both a portion of the cementitious binder and aggregate portions strikes an optimal balance that enhances performance without significantly increasing, and in some cases reducing, water demand. Quarry fines and/or limestone powder reduce bleeding and segregation, thereby reducing the need for expensive viscosity modifying agents (VMAs) in the case of high strength concrete that includes substantial quantities of superplasticizers. Reducing or eliminating VMAs can yield high strength concrete that is less sticky and less thixotropic.

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
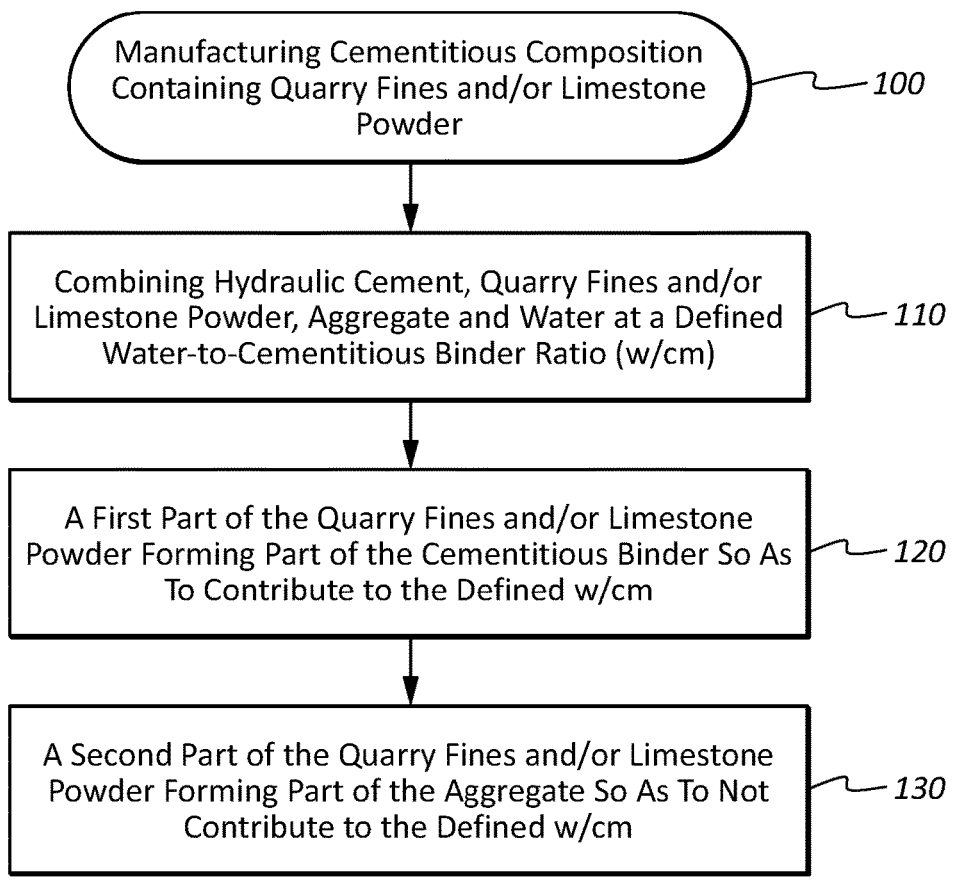
FIG. 1 is a flow chart illustrating an example method for manufacturing a cementitious composition containing quarry fines and/or limestone powder.

Disclosed herein are compositions and methods for effectively using quarry fines and/or limestone powder in concrete with predictable performance, such as predictable water demand, rheology, and admixture requirement, similar or higher strength and durability, and reduced shrinkage. The compositions and methods disclosed herein can be used to reduce clinker content in concrete. They can enhance effectiveness of SCMs used to replace a portion of Portland cement clinker.

In some embodiments, a method of designing and manufacturing concrete to beneficially utilize quarry fines and/or limestone powder involves selecting materials having both fine and coarse particles and apportioning them between cementitious binder and aggregate portions. For example, it can be beneficial to define a first portion of quarry fines and/or limestone powder as "cementitious binder" for purposes of designing and manufacturing concrete having a defined water-to-cementitious binder ratio (w/cm) and define a second portion as "aggregate" (e.g., "ultrafine aggregate") that does not factor into the defined w/cm.

In some embodiments, a concrete composition includes quarry fines and/or limestone powder apportioned between cementitious binder and aggregate. A first portion of quarry fines and/or limestone powder is defined as "cementitious binder" for purposes of defining the w/cm of the concrete, and a second portion is defined as "aggregate" (e.g., "ultra-fine aggregate") that does not factor into the defined w/cm. Surprisingly and unexpectedly, when a first portion of quarry fines (e.g., mine safety dust) and/or limestone powder is apportioned or defined as forming part of the "cementitious binder" so as to contribute or factor in to the defined w/cm and a second portion is apportioned or defined as forming part of the "aggregate" so as to not contribute or factor in to the defined w/cm, concrete can be designed and manufactured with predictable properties, including predictable water demand, rheology, strength, and other performance criteria.

Without being bound to theory, and by way of example and not limitation, it has been found that quarry fines having a d90 in a range of about 50 µm to about 150 µm and a d10 in a range of about 1 µm to about 30 µm, and which contain particles that are both larger and smaller than the largest cement particles found in OPC (e.g., which are typically between about 35-50 µm), include a first fraction of particles that can be defined as forming part of the cementitious binder and a second fraction of particles that can be defined as forming part of the aggregate fraction. To be certain, quarry fines, such as coarse limestone, dolomitic limestone, or granite powder, are non-cementitious and non-pozzolanic and are not actually a "cementitious binder". They do not chemically consume water, are essentially a non-reactive filler, and generally have lower water demand compared to similarly sized cement particles. Nevertheless, quarry fines and/or limestone powder have a surface area with particle surfaces that must be wetted and therefore "consume" some amount of water by adsorption. In general, quarry fines and/or limestone powder consume or absorb less water than cement but more water than sand or other fine aggregate. Designing and manufacturing concrete so that a first portion of quarry fines and/or limestone powder is defined as forming part of the cementitious binder that contributes or factors into the defined w/cm and a second portion is defined as forming part of the aggregate that does not contribute or factor into the defined w/cm, provides the ability to reliably and predictably design and manufacture concrete having desired rheology, strength, admixture requirements, and other performance criteria.

By way of illustration, one can envision that the portion of quarry fines and/or limestone powder smaller than a specified particle size (e.g., below 20 µm, 25 µm, 30 µm, 35 µm, 40 µm, or 45 µm) are "cement" or "cementitious binder" and that the portion of particles above the specified particle size are "aggregate." In practice, this distinction may be arbitrary but is a good way to envision how or why quarry fines and/or limestone powder can be apportioned between cementitious binder and aggregate when designing and manufacturing concrete and other cementitious compositions. It may also be useful in determining what percentage of quarry fines and/or limestone powder is defined as "cementitious binder" and what percentage is defined as "aggregate." In addition, while quarry fines and/or limestone powder particles that are coarser than cement particles are hardly "ultrafine" from the standpoint of cement particle size, they can be thought of as providing or comprising an "ultrafine aggregate" when compared to larger particles in typical fine aggregate (or sand) in concrete or mortar.

In practical terms, concrete designed and manufactured using the foregoing criteria of apportioning or defining quarry fines and/or limestone powder between cementitious binder and aggregate can have both reduced clinker content and reduced fine aggregate content. The quarry fines and/or limestone powder can in essence straddle the line between the cement and fine aggregate fractions, replacing a portion of each. Because quarry fines and/or limestone powder usually cost substantially less than OPC, they reduce cost by reducing clinker content. Even if quarry fines and/or limestone powder are more expensive than fine aggregate, as long as the cost of quarry fines is less than the combined cost of the hydraulic cement and aggregate they replace, the net result is reduced cost.

Moreover, the design and manufacture of concrete using quarry fines and/or limestone powder in the foregoing manner permits further reductions in clinker content when used together with one or more supplementary cementitious materials (SCMs) having pozzolanic properties. SCMs such as fly ash, GGBFS, and natural pozzolans are slow reacting and typically reduce early strength and/or retard setting. On the other hand, at least some quarry fines (e.g., containing limestone and/or dolomitic limestone) can act as an accelerator to offset early strength reduction and/or set retardation when using SCMs. Because SCMs and quarry fines and/or limestone powder typically have lower water demand than OPC, overall cementitious binder content can be increased and/or the w/cm can be reduced, both of which increase concrete strength and durability. In addition, when quarry fines are apportioned between cementitious binder and aggregate, the effective water-to-powder ratio (w/p) is lower than the defined w/cm, which can further increase strength due to the "filler effect." In summary, the defined w/cm arrived at by apportioning quarry fines and/or limestone powder between "cementitious binder" and "aggregate" has been found to be a powerful new tool for designing and manufacturing concrete having predictable rheology, admixture requirements, and strength. All three of the water-to-cement ratio (w/c), w/cm, and w/p can be useful when designing and manufacturing concrete having a desired strength (e.g., compressive strength) and rheology (e.g., slump). The w/c is useful in understanding and predicting the nature and extent of hydration of Portland cement. The w/cm and w/p are useful in understanding and predicting the combined strength and rheological attributes provided by the Portland cement, SCM, and quarry fines and/or limestone powder fractions.

The foregoing design and manufacturing criteria were initially discovered when designing concrete and mortar using limestone powder (e.g., having a d90 in a range of about 50 µm to about 200 µm and a d10 in a range of about 1 to about 30 µm). It was determined that limestone powder (e.g., Marble White 80 of Specialty Minerals), which is used as a fine white aggregate in precast concrete and glass fiber reinforced concrete (GFRC), can be apportioned between the cementitious binder and aggregate portions when designing precast concrete and GFRC having reduced clinker content. In example embodiments, the amount of Portland cement (e.g., white cement) was reduced by about 50-60%, with a portion of the "removed" white cement being "replaced" with a white-colored GGBFS and another portion being "replaced" by simply increasing the amount of Marble White 80 previously used only as "aggregate." In such mixes, a portion of limestone powder was deemed "cement" for purposes of defining the cementitious binder content and another portion was deemed "aggregate" to arrive at proper volume. The resulting compositions had similar or higher strength than commercial compositions made using only white cement as cementitious binder. Examples of cementitious compositions made using a ternary blend of white cement, white-colored GGBFS, and limestone powder are disclosed in U.S. Provisional Patent Application No. 62/451,533, filed Jan. 27, 2017, the disclosure of which is incorporated herein in its entirety.

In particle size optimized compositions, the cement, SCM, and quarry fines and/or limestone powder fractions can have complementary PSDs that yield a cementitious binder system having a broadened PSD compared to the individual particulate components. The quarry fines and/or limestone powder are generally coarser than and have a particle size distribution (PSD) that complements rather than entirely matches and overlaps the PSD of the hydraulic cement. Using a fine or ultrafine SCM that is finer than hydraulic cement can also complement rather than match the PSD of the hydraulic cement. An example is ultrafine fly ash (UFFA) formed by grinding or classifying fly ash to remove or comminute coarse particles so as to have a d90 of less than about 25 µm, 20 µm, 17.5 µm, 15 µm, 12.5 µm, 10 µm, or 8 µm. Another example is fine GGBFS having a d90 of less than about 30 µm, 25 µm, 22.5 µm, or 20 µm. Another is ultrafine natural pozzolan (e.g., ultrafine pumice or volcanic ash formed by ultragrinding). Together, fine or ultrafine SCM, medium size hydraulic cement (e.g., OPC or narrow PSD cement), and relatively "coarse" quarry fines and/or limestone powder yield a ternary blend with an overall PSD that is substantially broader than the respective PSDs of the individual components. This approach reduces water demand, increases particle packing density of cementitious and SCM particles, increases paste density, increases SCM reactivity, and permits quarry fines and/or limestone power to provide a powerful filler effect. In this way, quarry fines and/or limestone powder can increase strength due to the filler effect without providing too many fine or ultrafine particles (as occurs when using ultrafine or nano-limestone) that would otherwise compete with the cement and SCM particles when filling the fine and ultrafine regions of the overall PSD.

Fine SCMs are highly reactive and can impart substantially higher early and/or late strength compared to SCMs of normal PSD. Fine and ultrafine SCMs typically begin reacting after the cement fraction initially sets to form a rigid or semi-rigid structure. Nonetheless, during initial mixing and placement, fine SCMs, even ultrafine fly ash (UFFA), are at least temporarily "unreactive," do not consume water other than by surface wetting, and therefore can greatly reduce water demand. Using less water to achieve the same rheology can substantially increase both short and long-term strengths. Therefore, using a fine or ultrafine SCM in place of at least some of the fine or ultrafine cement particles can substantially improve flow and strength. It may also be beneficial in some cases to include a coarse SCM, such as dedusted fly ash having a d90 in a range of about 75 μm to about 125 μm and a d10 in a range of about 10 μm to about 30 μm, to augment the coarse particles provided by quarry fines and/or limestone powder. The coarse SCM can provide additional strength by additional filler effect, later age pozzolanic reactions, and/or denser paste.

It was also determined that replacing a portion of hydraulic cement with quarry fines and/or limestone powder and one or more SCMs having pozzolanic properties can alter the balance of calcium, silicate, aluminate, and sulfate ions in the mixture, which can have a moderate to profound effect on the hydration mechanism. Substantially altering the ion balance in the aqueous solution during initial mixing and/or in the pore solution after setting, can create problems, such as reduced early strength, reduced late-age strength, and loss of workability. It was determined that such problems can be addressed and at least partially offset by adding minor quantities of one or more common and relatively inexpensive additives.

For example, it was discovered that adding a relatively small amount of lime, such as quicklime or hydrated lime (e.g., Type S lime used in mortar), can significantly increase early and late age strengths. Without being bound to theory, it is hypothesized that using SCMs having pozzolanic activity consumes calcium ions pozzolanically and lowers the pH to below what is required for proper setting, early strength development, and/or late age strength development. Adding a small but significant amount of quicklime or hydrated lime, which is only slightly soluble in water, up to and somewhat exceeding the amount required to form a saturated calcium hydroxide solution, may increase the pH and restore proper calcium ion concentration during early hydration and setting and also provide calcium ions and higher pH to increase later pozzolanic reactions. However, using too much lime can be detrimental because amounts that cannot ultimately dissolve or otherwise be consumed in the pozzolanic reaction may decrease mortar strength (e.g., because hydrated lime particles that form part of the cement paste are very soft and can act as a weak filler). Quicklime, if not fully hydrated to form hydrated lime in situ before final set, can be deleteriously expansive. It may be preferable to use hydrated lime, which is already hydrated and therefore not expansive, when it is desired to add more lime than what can readily dissolve. Nevertheless, quicklime can be desirable due to its higher solubility than hydrated lime if added in amounts that can quickly dissolve or otherwise be consumed during early stages of mixing, setting, and hardening.

In addition, the use of SCMs having pozzolanic activity and quarry fines and/or limestone powder may negatively affect sulfate balance, leading to loss of workability, set retardation, delayed strength development, and lower ultimate strength. For example, when SCMs and quarry fines replace Portland cement, the quantity of sulfate carried by the Portland cement is reduced by the same percentage as the percent reduction in Portland cement. However, the increased w/c resulting when maintaining the same or even lower w/cm can change how Portland cement hydrates and alter proper sulfate balance. In theory, a higher w/c may mean faster consumption of sulfate and hydration of the aluminate and aluminoferrite minerals in cement clinker. For example, it was observed by researchers at Calmetrix, Inc. that using a superplasticizer to deflocculate cement particles exposes more of the cement particle surfaces to hydration, resulting in faster consumption of sulfate and higher sulfate requirement. A similar phenomenon may occur when the w/c is increased by replacing OPC with SCMs and quarry fines, which do not react with and consume significant water apart from adsorption during initial mixing. That means more water is available to wet the cement particles and a greater surface area of the cement grains may be exposed to water, resulting in faster consumption of sulfate and higher sulfate requirement.

Another cause of sulfate deficiency is the presence of aluminates in SCMs such as fly ash, GGBFS, and natural pozzolans, which can consume sulfate ions required for proper hydration of Portland cement. This can result in loss of workability, set retardation, delayed strength development, and long-term strength reduction. While limestone may theoretically partially offset the effects of insufficient sulfate through formation of calcium carboaluminates, this reaction and its interplay with ettringite formation and later depletion of ettringite (AFt) to form monosulfoaluminates (AFm) are not well understood. It may be safer to assume that limestone cannot completely offset the negative effects of insufficient sulfate, particularly because limestone has very low solubility, while uncontrolled hydration of aluminates can occur in minutes. Limestone may provide positive effects later on, but during early stages of hydration and set control it is better to ensure there is sufficient sulfate to control hydration of aluminates in the cement and SCM fractions. In addition, there is some evidence that added sulfate helps SCMs to more quickly and completely react pozzolanically over time, which increases ultimate strength.

Whether or not there is a sulfate deficiency can be determined using calorimetry, such as calorimeters provided or operated by Calmetrix, and measuring heat release as a function of time when a cement blend is subjected to hydration conditions. A properly sulfate-balanced cement binder system will usually have a signature heat release curve. Too little sulfate results in insufficient formation of ettringite and/or premature depletion of ettringite to monosulfate, which permit aluminates to hydrate uncontrollably with water to form calcium aluminate hydrates. Rapid formation of calcium aluminate hydrates causes loss of workability and delayed setting (e.g., by coating tricalcium silicate crystals and inhibiting their proper hydration). It has been found that adding supplemental sulfate, such as plaster of Paris, gypsum, anhydrite, or alkali metal sulfate, can improve rheology, avoid loss of workability, reduce or eliminate delayed setting, and provide higher early and ultimate strengths. As with supplemental lime, the amount of supplemental plaster of Paris, gypsum, or anhydrite should not substantially exceed the ability of it or its hydration products to dissolve and be consumed by aluminates since calcium sulfate dihydrate has low solubility and will act as a weak filler if it remains unreacted within cement paste over time. In addition, unhydrated plaster of Paris that persists after setting can also be expansive like unhydrated lime and/or cause delayed ettringite formation and deleterious long-term expansion.

In summary, use of the disclosed design criteria for using quarry fines and/or limestone powder, coupled with use of one or more SCMs, sometimes with addition of supplemental lime and/or sulfate, has yielded mortar and concrete of acceptable or superior strength at greatly reduced clinker content. In some cases, mortar and concrete with low clinker content have the same or higher strength compared to control mixes made with high clinker content.

II. Definitions

Information regarding hydraulic cement, supplementary cementitious materials (SCMs), binary, ternary, and quaternary cement-SCM blends, and cementitious compositions that can be made using such materials are disclosed in U.S. Pat. Nos. 7,799,128, 7,972,432, 8,323,399, 8,974,593, 9,067,824, 8,414,700, 8,377,201, 8,551,245, and 9,102,567, the disclosures of which are incorporated herein in their entirety.

The term "Dx", where x is a numeric value between 0 and 100 and Dx is a designated particle size, means the percentage of particles in a distribution of particles that is at or below the designated particle size. For example, a particulate material with a "d90" of 75 µm means that 90% of the particles are 75 µm or smaller and 10% of the particles are larger than 75 µm. Similarly, a particulate material with a d10 of 20 µm means that 10% of the particles are 20 µm or smaller and 90% of the particles are larger than 20 µm. A particulate material with a d50 of 45 µm means that 50% of the particles are 45 µm or smaller and 50% of the particles are larger than 45 µm.

The terms "water-to-cement ratio" and "w/c refer to the ratio of water to hydraulic cement and is typically expressed as a weight ratio. For example, a cementitious composition comprising 300 pounds of water and 400 pounds of hydraulic cement would have a water-to-cement ratio (w/c) of 0.75. The term "w/c" as used herein disregards and does not consider supplementary cementitious materials (SCMs) and quarry fines and/or limestone powder. The w/c does consider sulfate added to control setting of hydraulic cement and may also consider the amount of additives, such as supplemental lime and supplemental sulfate, that provide calcium and sulfate ions and which augment the calcium and sulfate ions provided by the hydraulic cement.

The terms "water-to-cementitious binder ratio" and "w/cm" refer to the ratio of water to total cementitious binder, including hydraulic cement, supplementary cementitious material(s) (SCM), and the portion of quarry fines and/or limestone powder, if any, that has been defined as cementitious binder, and is typically expressed as a weight ratio. For example, a cementitious composition comprising 300 pounds of water and 600 pounds of combined hydraulic cement, SCM, and apportioned quarry fines and/or limestone powder would have a water-to-cementitious binder ratio (w/cm) of 0.5. The w/cm as used is different than the w/c because it accounts for the amount of SCM and also the portion of quarry fines and/or limestone powder that may be apportioned to the cementitious binder. However, the w/cm typically disregards and does not consider the portion of quarry fines and/or limestone powder apportioned to the aggregate fraction, which can be thought of as simply a filler or ultrafine aggregate within or that augments the cement paste.

The terms "water-to-powder ratio" and "w/p" refer to the ratio of water to total cementitious binder and powder, including hydraulic cement, supplementary cementitious materials (SCMs), and some or the entirety of quarry fines and/or limestone powder. The "w/p" is typically expressed as a weight ratio. For example, a cementitious composition comprising 300 pounds of water and 750 pounds of combined hydraulic cement, SCM, and total quarry fines and/or limestone powder that are not true aggregate has a water-to-powder ratio (w/p) of 0.4. The w/p as used is different than the w/cm because it also accounts for the portion of quarry fines and/or limestone powder apportioned to the aggregate fraction.

The "cement factor" relates to the amount of cementitious binder and/or cement paste relative to the amount of aggregate. In general and within limits, increasing the cement factor typically increases strength at a given w/cm. An increased cement factor can reduce the tendency of the cementitious composition to experience bleeding or segregation, improving workability, cohesiveness, finishability, and overall performance. However, it can also increase the propensity for plastic shrinkage, drying shrinkage, and/or autogenous shrinkage. One skilled in the art can select an appropriate cement factor in combination with a defined w/cm to yield concrete having desired performance attributes.

The terms "hydraulic cement" and "cement" include Portland cement, cements defined by ASTM C150 (Types I-V), and similar materials that contain one or more of the four clinker minerals: $C_3S$ (tricalcium silicate), $C_2S$ (dicalcium silicate), $C_3A$ (tricalcium aluminate), and $C_4AF$ (tetracalcium aluminoferrite). Other examples of hydraulic cement include white cement, calcium aluminate cement, high-alumina cement, magnesium silicate cement, magnesium oxychloride cement, oil well cements (e.g., Type VI, VII and VIII), magnesite cements, and combinations of these. Ground granulated blast-furnace slag (GGBFS) and other slags that include one or more clinker minerals may also function as hydraulic cement. They also qualify as SCMs. Some highly reactive class C fly ashes have self-cementing properties and can be defined, if desired, to provide a portion of the "hydraulic cement."

Consistent with defining GGBFS, slags, and reactive fly ashes as "hydraulic cement," alkali-activated cements, sometimes known as "geopolymer cements," are also examples of "hydraulic cements."

The terms "supplementary cementitious material" and "SCM" include materials commonly used in the industry as partial replacements for Portland cement in concrete, mortar, and other cementitious materials, either in blended cements or by self-blending by the end user. Examples include moderate to highly reactive materials with both cementitious and pozzolanic properties (e.g., GGBFS, Class C fly ash, and steel slag), moderate to highly reactive pozzolanic materials (e.g., silica fume and activated metakaolin), and low to moderately reactive pozzolanic materials (e.g., Class F fly ash, volcanic ash, natural pozzolans, trass, calcined shale, calcined clay, and ground glass). Through alkali activation, it is possible for some SCMs to become hydraulically reactive. In a sense, the pozzolanic reaction is a form of alkali activation, albeit by less basic and/or lower soluble calcium ions as compared to more basic and/or higher soluble sodium or potassium ions as in typical geopolymer cements.

The term "quarry fines" refers to waste particles that are produced during the manufacture of crushed rock, such as the manufacture of aggregates used in concrete. Crushed rock and sand is typically graded using wire meshes or screens with holes or passages of a specified size. Coarse aggregates are typically separated from finer materials by collecting the larger rock pieces that are retained on a screen having a given mesh size. Medium aggregates (e.g., pea gravel) and fine aggregates (e.g., sand) are similarly those materials retained on a screen having an appropriate mesh size. Sand is commonly screened using a 100 mesh screen, which retains particles of about 150 µm and larger. Particles that fall through the screen are quarry fines. In addition, coarse, medium and fine aggregates can be washed to remove fines adhered to the surface. This material is also quarry fines. In some cases quarry fines are discarded in the state in which they are made. In other cases they are put through a mill to generate a finer particulate material (i.e., mine or agricultural rock dust). For example, rock dust can be milled to 100 mesh (approximately 150 µm) and smaller, such as 200 mesh (approximately 75 µm) and smaller. Quarry fines are advantageously sized so as to have a d90 in a range of about 50-150 µm, or about 55-125 µm, or about 60-100 µm, or about 70-90 µm.

While the term "quarry fines" may refer to rock fines of any mineral, quarry fines are advantageously produced as a byproduct of limestone aggregates and will comprise primarily limestone (e.g., calcite and/or dolomite). Calcite is a mineral having the chemical formula $CaCO_3$. Dolomite contains a mixture of $CaCO_3$ and $MgCO_3$ and may thought of as having the chemical formula $CaMg(CO_3)_2$. Dolomite found in nature does not necessarily have a 1:1 ratio of $CaCO_3$ and $MgCO_3$. Quarry fines many also contain basaltic and other siliceous minerals but advantageously contains at least 50%, 60%, 70%, 80%, 85%, 90%, 95% or 98% calcite and/or dolomite. Some amount of aluminosilicate clay or mica are permissible so long as they are not unduly expansive and/or do not adversely affect rheology to an impermissible degree.

The term "limestone powder" refers to ground minerals containing mostly calcite and/or dolomite. Limestone powder is typically manufactured for use as limestone and will generally be a more pure form of the mineral with less contaminants than quarry fines or rock dust. Nevertheless, many limestone powders are produced by aggregate manufacturers that also produce quarry fines and may even be quarry fines, albeit a more pure form. Thus, limestone powder, quarry fines, and/or rock dust may be synonymous in some cases. In some cases, limestone powders are made from white limestone powders that have high brightness so that they can be used in decorative precast concrete compositions. In other cases, they can be off-white or grey. Limestone powders that are particularly advantageous for use in the disclosed compositions and methods can have a d90 in a range of about 50-150 µm, or 55-125 µm, or 60-100 µm, or 70-90 µm.

Quarry fines may also comprise a wider range of particles and have a more gritty or sandy consistency. In such cases, a smaller proportion of quarry fines may be defined as "cementitious binder" and larger proportion defined as "aggregate." Quarry fines of any size range can be analyzed to determine particle size distribution and apportioned between cementitious binder and aggregate using the principles disclosed herein. In general, quarry fines that are coarser and less processed are lower cost and can substitute for a relatively larger portion of aggregate to further reduce cost of the cementitious composition. Depending on the effect of coarse quarry fines on rheology and/or strength, the cutoff particle size between "cementitious binder" and "aggregate" can be higher or lower to account for such rheological and/or strength differences.

III. Particle Size Distributions

According to one embodiment, the PSD of the hydraulic cement, quarry fines and/or limestone, and SCM can be defined by its d10, d50 and d90, with the d10 approximating the lower PSD endpoint ("LEP"), the d90 approximating the upper PSD endpoint ("UEP"), and the d50 approximating the mean particle size ("MPS") of the PSD. In other embodiments, the d1, d5, d15, d20 or intermediate value can be used as the approximate LEP, the d80, d85, d95, d99, or intermediate value as the approximate UEP, and the d40, d45, d55, d60 or intermediate value as the approximate MPS.

It can be useful to select cementitious binder materials having complementary rather than completely overlapping PSDs as defined by their respective d90s, d50s and d10s. This includes, for example, selecting a hydraulic cement of intermediate fineness, an SCM finer than the hydraulic cement, and quarry fines and/or limestone powder coarser than the cement.

The PSD of a particulate material or blend of particles can be determined according to accepted methods for determining particle sizes of ground or otherwise non spherical materials. Particle size can be measured using any acceptable method and/or methods yet to be developed. Examples include sieving, optical or electron microscope analysis, laser diffraction, x-ray diffraction, sedimentation, hydrometer analysis, elutriation, microscope counting, Coulter counter, and Dynamic Light Scattering.

A. Hydraulic Cement

A common and useful hydraulic cement that can advantageously be used in the disclosed compositions and methods is ordinary Portland cement (OPC), as defined by ASTM C-150 and which include Types I-V cement and their variants. Types I, II, and V cements typically have a Blaine fineness between about 350-450 $m^2/kg$ (3500-4500 $cm^2/g$). Type III cement typically has a Blaine fineness between about 450-600 $m^2/kg$ (4500-6000 $cm^2/g$). Type 1L, 1P, and C-595 cements can also be used.

Alternatively, narrow PSD cements can be used, which have different PSDs than Types I-V cement. Narrow PSD cements are characterized as having a spread (e.g., UEP-LEP) and endpoint ratio (e.g., UEP/LEP) that are lower than the spread and endpoint ratio, respectively, of ordinary Portland cement (OPC), often substantially lower. Lowering the UEP may advantageously reduce the volume of unhydrated cement, which increases hydration efficiency. Raising the LEP reduces water demand. In one embodiment, a narrow PSD cement fraction can have a LEP that is substantially higher, and a UEP that is substantially lower, than the respective LEP and UEP of OPC (e.g., for both Fuller and Tsivilis distributions).

Nevertheless, OPC can be used in connection with the compositions and methods disclosed herein and may be a primary source of hydraulic cement to the extent it is readily available and less expensive than narrow PSD cement. However, implementing the present invention using OPC may in time open the door for the use of narrow PSD cements once manufacturers realize the power and predictability of using carefully selected particle sizes for the various cement binder components. The same is true for fine and ultrafine SCMs, which may become more valuable and widely used in making ternary blends once the power and simplicity of the disclosed methodologies are better understood by cement, concrete, and admixture companies.

The upper endpoint (UEP) of hydraulic cement can be selected to provide desired reactivity and/or fineness in conjunction with or independent of the lower endpoint (LEP) and/or a desired particle packing density in conjunction with coarser quarry fines and/or limestone powder. The UEP (e.g., d85, d90, d95 or d99) can be equal to or less than about 45 µm, 42.5 µm, 40 µm, 37.5 µm, 35 µm, 32.5 µm, 30 µm, 27.5 µm, 25 µm, 22.5 µm, 20 µm, 18 µm, 16.5 µm, 15

µm, 13.5 µm, 12 µm, or 11 µm. The lower UEP range limit can be about 8 µm, 9 µm, 10 µm, 11 µm, 12 µm, 13 µm, 14 µm or 15 µm.

The lower endpoint (LEP) can be selected to provide desired water demand and/or fineness in conjunction with or independent of the upper endpoint (UEP) and/or desired particle packing density in conjunction with one or more finer SCMs. The LEP (e.g., d1, d5, d10 or d15) can be equal to or greater than about 0.8 µm, 1.0 µm, 1.25 µm, 1.5 µm, 1.75 µm, 2 µm, 2.5 µm, 3 µm, 4 µm, 5 µm, 6 µm, 7 µm, or 8 µm. The upper LEP limit can be about 6 µm, 8 µm, 10 µm, 12 µm or 15 µm.

The UEP and LEP can also define the spread (UPE-LEP) of the hydraulic cement. For example, and depending on the UEP and LEP of the cement and ability or limitations of processing equipment to produce narrow PDS cements, the spread can be less than about 40 µm, 35 µm, 30 µm, 25 µm, 22.5 µm, 20 µm, 17.5 µm, 15 µm, 13 µm, 11.5 µm, 10 µm, 9 µm, 8 µm, 7 µm, 6 µm, 5 µm, or 4 µm.

In some cases, the ratio UEP/LEP can define a narrow PSD cement having desired reactivity, fineness and/or particle packing density in conjunction with quarry fines and/or limestone and one or more SCMs. The UEP/LEP (e.g., d90/d10) of narrow PSD cements can be less than the ratio of Types I-V cements as defined by ASTM C-150. According to several embodiments, the UEP/LEP can be less than or equal to about 30, 27.5, 25, 22.5, 20, 17.5, 15, 12.5, 10, 8, 6, 5, 4.5, 4, 3.5, 3, 2.5 or 2.

It will be appreciated that defining the PSD of a narrow PSD cement by ratio UEP/LEP is not limited by a particular UEP or LEP or range of particle sizes. For example, a first hypothetical narrow PSD cement having a d90 of 15 µm and a d10 of 3 µm has a UEP/LEP (i.e., d90/d10) of 5 and spread (d90–d10) of 12 µm. By comparison, a second hypothetical narrow PSD cement having a d90 of 28 µm and a d10 of 7 µm has a UEP/LEP (i.e., d90/d10) of 4 and a spread (d90–d10) of 21 µm. While the spread of the second hypothetical narrow PSD cement is greater the UEP/LEP (i.e., d90/d10) is smaller than those of the first hypothetical narrow PSD cement. Thus, the second hypothetical cement has a narrower PSD compared to the first hypothetical cement as defined by UEP/LEP (i.e., d90/d10) even though the spread is greater.

B. Quarry Fines and/or Limestone Powder

Quarry fines and/or limestone powder (e.g., rock dust) can be blended with hydraulic cement, such as OPC or narrow PSD cement, to provide particles that are larger than the coarsest cement particles. Quarry fines and/or limestone powder can replace some of the cement particles, optionally some of the SCM particles, provide a "paste aggregate" or filler to augment the total quantity of cementitious binder particles in the cement paste, increase particle packing density and paste density, provide a filler effect using a less expensive component, lower the w/p and/or w/cm, increase fluidity, increase strength, and reduce shrinkage and creep.

When defining quarry fines and/or limestone powder as "powder" for purposes of determining the w/p, the UEP (e.g., d85, d90, d95 or d99) of quarry fines and/or limestone powder can be less than about 300 µm, 250 µm, 200 µm, 175 µm, 150 µm, 125 µm, 110 µm, 100 µm, 90 µm, 85 µm, 80 µm, 75 µm, 70 µm, 65 µm, or 60 µm, with a lower UEP range limit of about 30 µm, 40 µm, 50 µm, or 60 µm. In some embodiments, the quarry fines and/or limestone powder have a d90 in a range of about 50 µm to about 150 µm, preferably about 55 µm to about 125 µm, more preferably about 60 µm to about 100 µm, even more preferably about 70 µm to about 90 µm. Sandier, coarser quarry fines can have particles up to about 5 mm, 3 mm, 1 mm, or 0.5 mm (500 µm). In such cases, the quantity of quarry fines apportioned as "aggregate" will typically be substantially greater than the amount apportioned as "cementitious binder" (as illustrated in FIG. 6C). Larger particles may not contribute or factor into the w/p.

The LEP (e.g., d1, d5, d10 or d15) of the quarry fines and/or limestone powder can be equal to or greater than about 2.5 µm, 5 µm, 7.5 µm, 10 µm, 12.5 µm, 15 µm, 17.5 µm, 20 µm, 25 µm, 30 µm, 35 µm, 40 µm, 45 µm, or 50 µm, or be within a range defined by any two of the foregoing values.

An example of quarry fines that can be used in the disclosed compositions and methods can be obtained from Staker Parson of Ogden, Utah. They are manufactured at the Keigley quarry located in Genola, Utah, further milled to about 200 mesh minus (75 µm and smaller), and sold primarily as mine safety dust (or Coal Mine Rock Dust) and secondarily as a limestone-based soil amendment by Oldcastle (parent company of Staker Parson). A particle size analysis of the Coal Mine Rock Dust was performed using a Microtrac-X100 particle size analyzer and determined to have a very broad, flat PSD curve, with particles as large as about 135 µm, a small proportion (3%) smaller than 1 µm, a d90 of about 70 µm, a d50 of about 17 µm, and a d10 of about 2.5 µm. Assuming the particle size cutoff were 30 µm, which is roughly the d70, one can design and manufacture a cementitious composition in which about 70% of the rock dust is defined as "cementitious binder" and about 30% as "aggregate," and that has reasonably predictable rheology (e.g., slump, yield stress and/or viscosity) and strength. Alternatively, assuming the particle size cutoff were 22 µm, which is roughly the d60, one can design and manufacture a cementitious composition in which about 60% of the rock dust is defined as "cementitious binder" and about 40% as "aggregate," and that has reasonably predictable rheology (e.g., slump, yield stress and/or viscosity) and strength.

An example of limestone powder that can be used in the disclosed compositions and methods can be obtained from Specialty Minerals of Lucerne Valley, Calif. It is a ground calcium carbonate sold under the name Marble White 80. It has a d90 of about 150 µm. Marble White 80 can effectively be apportioned between cementitious binder and aggregate to reduce clinker content when used together with Portland cement (e.g., white cement) and one or more SCMs (e.g., GGBFS, ground volcanic ash, fly ash, and/or ground pumice). Another example is Blue Mountain Feed Flour, which has a d90 of about 100 µm and a d50 of about 43 µm and which is whiter than Coal Mine Rock Dust but less white than Marble 80.

C. Supplementary Cementitious Materials

The PSD of one or more SCM fractions can be defined by the d10, d50 and d90, with the d10 approximating the lower PSD endpoint (LEP), the d90 approximating the upper PSD endpoint (UEP), and the d50 approximating the mean particle size ("MPS"). In other embodiments, the d1, d5, d15, d20 or intermediate value can be used to approximate LEP, the d80, d85, d95, d99 or intermediate value to approximate UEP, and the d40, d45, d55, d60 or intermediate value to approximate MPS. In some cases, the PSD of a fine SCM fraction may be defined mainly or exclusively in terms of the MPS and/or the UEP, while the PSD of a coarse SCM fraction may be defined mainly or exclusively in terms of the MPS and/or the LEP.

Blending a fine or ultrafine SCM fraction with OPC or narrow PSD cement can "replace" at least a portion of fine or ultrafine cement particles, help disperse cement particles, fill fine pore spaces, increase fluidity, increase strength, increase particle packing density, and decrease permeability. The UEP (e.g., d85, d90, d95 or d99) of a fine or ultrafine SCM can be less than about 25 µm, 22.5 µm, 21 µm, 20 µm, 19 µm, 17.5 µm, 15 µm, 13 µm, 12 µm, 11 µm 10 µm, 9 µm, 8 µm, 7 µm, 4.5 µm, 4 µm, 3.5 µm, or 3 m or any range defined by two of the foregoing sizes. The lower UEP range limit can be about 1 µm, 2 µm, 3 µm, 4 µm, 6 µm, 8 µm, 10 µm, 12 µm, 15 µm, 17 µm, or 19 µm. The LEP (e.g., d1, d5, d10 or d15) can be equal to or greater than about 0.01 µm, 0.03 µm, 0.05 µm, 0.075 µm, 0.1 µm, 0.25 µm, 0.5 µm, 0.75 µm, 1.0 µm, 1.25 µm, 1.5 µm, 1.75 µm, 2 µm, 2.5 µm, 3 µm, 4 µm, or 5 µm. The upper LEP range limit can be about 8 µm, 6 µm, 5 m or 4 µm.

In some embodiments, it may be desirable to include a coarse SCM fraction that is as coarse or coarser than the quarry fines and/or limestone powder. Coarse SCMs can provide additional filler effect to increase strength, particle packing density, and paste density, reduce water demand, and provide late age pozzolanic activity. For example, using coarse fly and quarry fines and/or limestone powder can broaden the PSD of the overall cement blend but offer different benefits. Coarse fly ash can react pozzolanically over time but may not contribute significantly to early strength. Quarry fines and/or limestone powder do not react pozzolanically but can provide nucleation sites and/or form calcium carbonaluminates in order to accelerate early strength gain. Together, coarse fly ash and quarry fines and/or limestone powder can boost early and late strengths.

It should also be understood that ordinary SCMs can be used in the compositions and methods disclosed herein. For example, ordinary fly ash that has not been classified to form UFFA or dedusted to form coarse fly ash can be used to produce concrete of high strength when used in combination with quarry fines and/or limestone powder having a d90 in a range of about 50 µm to about 150 µm. GGBFS having a d90 between about 15-25 µm, 17-23 µm, 18-22 µm, or 19-21 µm has been found to be especially useful when combined with Portland cement of lower fineness (e.g., OPC), and limestone powder that is coarser than the Portland cement.

IV. Supplemental Reactants

A. Supplemental Lime

It can be beneficial to add supplemental lime to the cementitious compositions. Such lime is "supplemental" to lime released during hydration of hydraulic cements such as Portland cement. Supplemental lime can be added as quicklime (CaO) and/or hydrated lime ($Ca(OH)_2$). Although quicklime is more soluble than hydrated lime, when quicklime is exposed to water it is converted into hydrated lime. Therefore, the solubility of hydrated lime, or calcium hydroxide, in water is generally a limiting factor for how much supplemental lime can be added before it becomes deleterious. The solubility of calcium hydroxide in water is reportedly 0.189 g/100 mL at 0° C., 0.173 g/100 mL at 20° C., and only 0.066 g/100 mL at 100° C. The temperature of concrete when hydrating is usually above 20° C. and below 100° C. Therefore, the solubility of hydrated lime is somewhere between 0.173 g/100 mL and 0.066 g/100 mL and decreases at increased temperature.

In general, hydrated lime (e.g., Type S lime) is readily available and easier and safer to handle than quicklime. Hydrated lime also does not consume water when mixed into a cementitious composition and therefore does not affect water demand as much as quicklime. It is also not expansive like quicklime, which expands when it hydrates. It has been found that hydrated lime typically works more predictably than quicklime, with similar or even superior results from the standpoint of early and late strength development.

In some embodiments, the amount of supplemental lime can be below, at, or above the amount required to achieve or maintain saturation in water. The amount of supplemental lime required to maintain a saturated pore solution is dependent on factors such as the amount of free lime released from the hydraulic cement during hydration, the amount of lime consumed during cement hydration and pozzolanic reactions, and the solubility of lime, which decreases with increased temperature. Increased temperature may accelerate consumption of lime, offsetting negative effects of decreased solubility. Using a more reactive pozzolan may deplete lime faster than a less reactive pozzolan. The ideal amount of supplemental lime is theoretically that amount that maintains a pore solution saturated with calcium ions over time in conjunction with lime released from the hydraulic cement and is consumed by pozzolanic reactions. A relatively small excess of supplemental lime can be added as a reservoir to provide additional lime as it is depleted.

In some embodiments, the amount of supplemental lime is 1-10 times, or 1.2-8 times, or 1.5-5 times the amount required to achieve saturation in the amount of added water. One purpose of adding supplemental lime is to maintain the pore solution at a pH similar to the pH when using OPC alone. Some SCMs, including fly ash and, in particular, ultrafine fly ash (UFFA), can rapidly deplete calcium ions and lower pH of the pore solution, which can interfere with normal cement hydration and/or retard pozzolanic reactions. Adding supplemental lime helps maintain a high pH characteristic of normal cement hydration and increase the rate of pozzolanic reactions. Because lime does not otherwise contribute to concrete strength but can actually weaken it, it has been found that using a relatively small amount of supplemental lime works better than using either no added lime or too much added lime. In some embodiments, the amount of supplemental lime based on the total weight of cementitious binder (cement, SCM and quarry fines and/or limestone powder apportioned to the cementitious binder) can be about 0.1% to about 10%, or about 0.125% to about 8%, or about 0.15% to about 6%, or about 0.2% to about 4.8%, or about 0.3% to about 4%, or about 0.4% to about 3%, or about 0.5% to about 2.5%, or about 0.6% to about 2%, or about 0.7 to about 1.8% (e.g., 0.8-1.6%).

B. Supplemental Sulfate

When there is insufficient sulfate to properly react with aluminates in the cementitious binder system, a supplemental sulfate source can be added, such as calcium sulfate hemihydrate (plaster of Paris), calcium sulfate dihydrate (gypsum), anhydrous calcium sulfate (anhydrite), and alkali metal sulfates (e.g., lithium sulfate). When used, the amount of supplemental sulfate based on the total weight of cementitious binder (cement, SCM and quarry fines and/or limestone powder apportioned to the cementitious binder) can be about 0.1% to about 6%, or about 0.15% to about 5%, or about 0.2% to about 4%, or about 0.3% to about 3%, or about 0.5% to about 2.5%, or about 0.6% to about 2%, or about 0.8% to about 1.6%.

V. Cementitious Binder Blends and Compositions

Cementitious binder blends designed and manufactured as described herein can be used in place of OPC, site blends of OPC and SCM, interground blends, and other cements and blended cements known in the art. They can be used to make concrete, ready mix concrete, high performance concrete (HPC), ultrahigh performance concrete (UHPC), self-consolidating concrete (SCC) (also known as self-compacting concrete), bagged concrete, bagged cement, mortar, bagged mortar, grout, bagged grout, molding compositions, bagged molding compositions, or other fresh or dry cementitious compositions known in the art. Cementitious binder blends can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to cementitious compositions continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, countertops, sinks, ornamental stone, building facades, and the like.

Water is both a reactant and rheology modifier that permits a fresh cementitious composition to flow or be molded into a desired configuration. Hydraulic cement reacts with water, binds the other solid components together, is most responsible for early strength development, and can contribute to later strength development. Blends with high packing density have reduced void space, which reduces water demand and increases workability for a given quantity of water.

Cementitious binder blends can be dry-blended or formed in situ when making a fresh cementitious composition containing water and aggregate. Cementitious binder blends include binary, ternary, quaternary, and other blends. In some embodiments, quarry fines and/or limestone powder and one or more SCMs are blended with hydraulic cement. In some embodiments, cementitious binder blends may include one or more chemical additives that affect the chemistry of the aqueous solution, such as accelerating, retarding, and/or water-reducing admixtures, supplemental lime, and supplemental sulfate.

The calcium carbonate in quarry fines and/or limestone powder can enhance strength development. While calcium carbonate has substantially lower solubility than lime (only 0.013 g/L at 25°), it can still contribute some quantity of calcium ions. It can also provide nucleation sites for the formation of cement hydration products, mainly calcium silicate hydrates, calcium sulfoaluminate hydrates, calcium carboaluminates, and calcium carboaluminoferrites, and the like.

The cementitious binder blend can be mixed with water and one or more aggregates to form concrete and other cementitious compositions (e.g., moldable compositions, precast concrete, GFRC, stucco, grout, mortar and the like). A blend of coarse and fine aggregates of standard size can be used in ready mixed concrete. Other cementitious compositions may exclude coarse aggregates and only include one or more grades of fine aggregate.

Admixtures known in the industry can be included in cementitious compositions. Examples include low-, medium- and/or high-range water reducers (e.g., lignosulfonates, sulfonated melamine formaldehyde condensate, sulfonated naphthalene formaldehyde condensate,), superplasticizers (e.g., polycarboxylate ethers), set controllers (e.g., sulfates), retardants (e.g., hydroxycarboxylic acids and carbohydrates), accelerators (e.g., alkali and alkaline earth metal salts), strength-enhancers (e.g., TEA, TIPA, TREED, amines), corrosion inhibitors (e.g., nitrite salts), hydration stabilizers, and viscosity modifying agents (VMAs) (e.g., cellulosic ethers).

The water-to-cementitious binder ratio (w/cm) can greatly affect rheology and strength. In general, lowering the amount of water increases strength but negatively affects flow, requiring a superplasticizer and/or water-reducing admixture to maintain proper flow. Thus, there is usually an inverse correlation and tradeoff between strength and rheology, all things being equal. Of course, poor rheology can also negatively affect strength if a fresh cementitious composition cannot be properly consolidated or compacted. In addition to w/cm, the "cement factor" can affect strength. The w/cm can be in any desired value in a range of about 0.2 to about 0.7. Concrete of low strength typically has a w/cm greater than about 0.55. Concrete of moderate strength can have a w/cm between about 0.45 and about 0.55. Concrete of moderately high to high strength can have a w/cm between about 0.33 and about 0.45. Concrete of high to very high strength can have a w/cm between about 0.22 and about 0.33. Ultrahigh performance concrete (UHPC) can have a w/cm between about 0.17 and about 0.25.

The design principals disclosed herein can provide reduced clinker and/or improved strength through a wide range of water-to-cementitious binder ratios and cement factors. Nevertheless, they have been shown to provide greater improvements in terms of reduced clinker and/or improved strength and/or reduced shrinkage at lower w/cm and/or higher cement factor compared to concrete made using OPC as sole binder or at higher concentrations relative to SCMs and other mineral additions.

Notwithstanding the principals disclosed herein relative to the beneficial use of quarry fines and/or limestone powder, a few concrete and mortar mixes have been made having reduced clinker at improved strength when using ultrafine fly ash (UFFA) and/or calcined shale dust at moderate substitution levels and modestly high w/cm (i.e., between about 0.35 and about 0.485). This is attributed to the special qualities of such SCMs alone. For example, a UFFA having a d90 of about 8.5 or about 10.5 μm was found to provide the same or greater strength when substituted for cement in amounts of about 10-30%, or about 15-25% (e.g., 20%), compared to a control mix comprising 100% cement. In some cases, the UFFA was shown to provide a similar strength increase as silica fume at an OPC substitution level of 15% and a w/cm of 0.35. The UFFA was also shown to provide both greater strength and improved rheology at an OPC substitution level of 20% and a w/cm of 0.47 compared to a control mix comprising 100% cement. Calcined shale dust that was coarser than both OPC and fly ash was shown to provide greater strength and approximately the same rheology at an OPC substitution level of 15-25% (e.g., 20%) and a w/cm of 0.47 compared to a control mix comprising 100% cement.

VI. Methods of Designing and Manufacturing Cementitious Compositions

Reference is made to FIGS. 1-10, which illustrate or relate to example embodiments for designing and manufacturing of cementitious compositions that utilize quarry fines and/or limestone powder in an effective and predictable manner to yield concrete and other cementitious compositions having predictable rheology, strength, admixture requirements, and other desirable properties.

FIG. 1 is a flow diagram illustrating a method 100 for manufacturing a cementitious composition containing quarry fines and/or limestone powder. Step 110 involves combining hydraulic cement, quarry fines and/or limestone powder, aggregate and water to form a fresh cementitious composition having a defined water-to-cementitious binder ratio (defined w/cm). Sub-step or aspect 120 involves a first part or portion of the quarry fines and/or limestone powder being defined as forming part of the cementitious binder so as to contribute or factor into the defined w/cm. Sub-step or aspect 130 involves a second part or portion of the quarry fines and/or limestone powder being defined as forming part of the aggregate so as to not contribute or factor into the defined w/cm.

Method 100 differs from a design or manufacturing method in which limestone powder (e.g., nano-limestone) is used as a filler to augment but not replace a portion of the cementitious binder, which may comprise Portland cement or a blend of Portland cement and one or more SCMs. In such case, there would be no beneficial reduction in cement clinker content but merely use of limestone powder as an additive or filler, effectively replacing a portion of the fine aggregate. While using limestone powder as an additive can increase the strength of concrete due to the filler effect, it comes at the cost of increased water demand, which requires the use of more water, thereby negating or reversing the strength benefit, and/or the use of expensive water reducing admixtures, which further increases cost. There is no environmental benefit from the standpoint of reducing the $CO_2$ footprint of concrete when clinker content is not reduced. Because fine limestone powder can cost more than aggregate, replacing less expensive fine aggregate with more expensive limestone powder further increases cost.

Method 100 also differs from a design or manufacturing method in which limestone powder (e.g., nano-limestone) is used entirely as a partial substitute for Portland cement. In that case, there is a beneficial reduction in cement clinker content but also loss of strength and durability because the hydraulic cement particles are diluted with unreactive limestone particles. The only way to offset such strength loss would be to reduce the water to cement ratio (w/c), which reduces paste content, requiring either an increase in aggregate content, paste content or both, to maintain proper volume. Increasing aggregate content generally decreases strength and creates a harsher mix (i.e., more gritty and harder to finish). Increasing paste content merely adds back what was removed and typically requires several iterations to obtain the proper balance between paste content and w/c to obtain proper strength and rheology.

The tendency to use limestone powder as either an aggregate or cement substitute is based on traditional thinking and the standard practice of categorizing materials as either "cement" or "aggregate". A sophisticated concrete company stated in 2017 that they tried and failed to find a way to effectively use limestone powder in concrete: when they replaced a portion of the cementitious binder with limestone powder they obtained a beneficial cost reduction but suffered significant strength loss as well; when they added limestone powder in addition to the cementitious binder (i.e., as a filler or aggregate that replaced a portion of the fine aggregate) they obtained a beneficial increase in strength but it significantly increased the cost because the limestone powder cost more than fine aggregate and more water reducing admixture was required. It never occurred to them to split the difference and replace part of the cement with a first portion of the limestone powder and replace part of the fine aggregate with a second portion of the limestone powder, which would both reduce cost and maintain comparable strength and admixture requirements (i.e., by defining a first portion of limestone powder as "cement" or "cementitious binder" and a second portion as "aggregate" or "filler"). Their inability to think outside the box is consistent with industry practice.

Simply stated, before the present invention, there was no known standard, guideline, or accepted industry practice for characterizing quarry fines and/or limestone powder as containing both "cementitious binder" and "aggregate" portions when designing and manufacturing concrete and other cementitious compositions. In fact, neither quarry fines nor limestone powder fit any definition of "cement" or standard definition of "aggregate" and are in fact neither. A well-known expert in the field, when asked, stated that quarry fines and/or limestone powder are neither cement nor aggregate and also that there is no ASTM standard for using them. Nor do quarry fines and/or limestone powder fit the definition of a pozzolanic SCM. Therefore, treating quarry fines and/or limestone powder as any of "cement", "SCM," or "aggregate" is technically incorrect. Quarry fines and/or limestone powder fit no definitions other than "mineral additive" or "filler." As such, the industry has haphazardly attempted to use quarry fines and/or limestone powder through trial and error testing but no practical guidelines. The lack of understanding of how to knowledgeably and effectively categorize and utilize quarry fines and/or limestone powder is the most likely explanation as to why they are rarely used in concrete and continue to pile up unused in enormous quantities.

The present invention seeks to overcome poor practices and narrow thinking by defining a first portion of quarry fines and/or limestone powder as "cement" (or "cementitious binder") and a second portion as "aggregate" (or "filler") for the purpose of designing and manufacturing concrete. When this simple, but heretofore unknown, practice is followed, it provides a simple yet highly effective way to design and manufacture concrete and other cementitious compositions having predictable rheology, admixture requirements, and strength. The inventive method provides predictable rheology by factoring in a first portion of quarry fines and/or limestone powder into the determination of the w/cm to account for its contribution to water demand, but without overstating it. The inventive method provides predictable strength and avoids overstating the effect on water demand by defining and using a second portion of the quarry fines and/or limestone powder as an ultrafine "aggregate" to provide a strength-enhancing "filler effect" by effectively reducing the water-to-powder ratio of the cement paste. Design and manufacturing method 100 is therefore a powerful new tool, technical breakthrough, and methodology that result in new cementitious compositions with different ratios of hydraulic cement, quarry fines and/or limestone powder, aggregate and water, but with predictable results from the standpoint of rheology, admixture requirements, and strength. It is an entirely new way of treating materials that have heretofore been characterized as being one, and only one, of cement, SCM, or aggregate, and which fit no actual definition other than "mineral addition" that can be interground with cement clinker in amounts up to 5% according to ASTM C-150 or between 5-15% according to ASTM C-595, or "filler" that can replace a portion of the fine aggregate.

Figure 2:
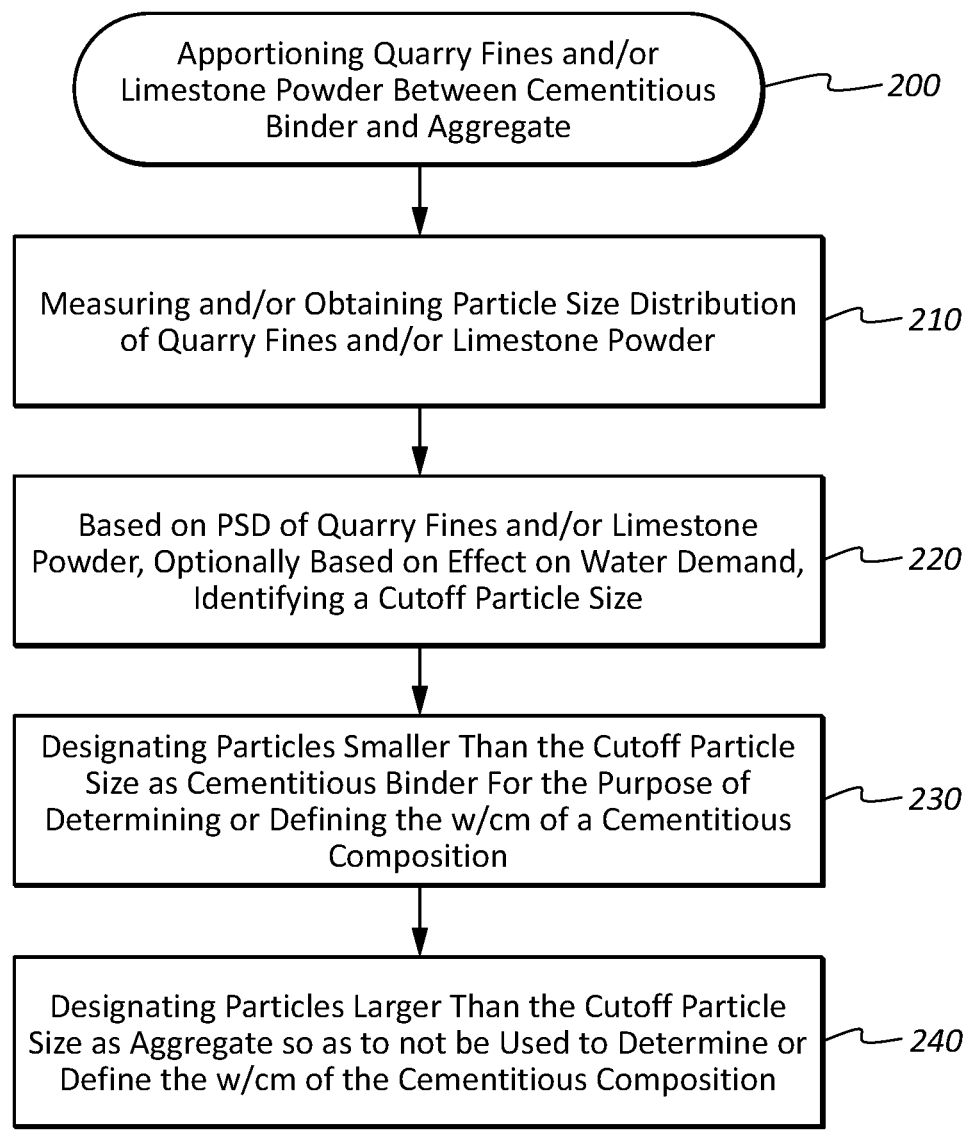
FIG. 2 is a flow chart illustrating an example method for apportioning quarry fines and/or limestone powder between cementitious binder and aggregate.

FIG. 2 is a flow diagram illustrating a method 200 for apportioning quarry fines and/or limestone powder between cementitious binder and aggregate when designing and/or manufacturing a cementitious composition. Step 210 involves measuring and/or obtaining the particle size distribution (PSD) of the quarry fines and/or limestone powder.

Step 220 involves identifying a cutoff particle size based on the PSD of the quarry fines and/or limestone powder, optionally based on the effect on water demand, which cutoff particle size can be used to apportion the material. Step 230 involves designating or defining particles smaller than the cutoff particle size as "cementitious binder" for the purpose of determining or defining the water-to-cementitious binder ratio (w/cm) of the cementitious composition being manufactured and/or designed. In general, the cutoff particle size can be any reasonable value that works in accordance with the disclosed methods. For example, it can be between about 15 µm and about 75 µm, or between about 20 µm and about 65 µm, or between about 25 µm and about 55 µm, or between about 30 µm and about 50 µm. Step 230 involves designating or defining particles larger than the cutoff particle size as "aggregate" (or filler) that is not used to determine or define the w/cm of the cementitious composition. The cutoff particle size can be determined by testing a few different cementitious compositions using a source of quarry fines and/or limestone powder having relatively constant PSD and identifying the size that yields the best and/or most predictable results of strength, water demand, and admixture requirements. By way of example and not limitation, if the cutoff particle size were determined to be 30 µm and this is the d40 of the quarry fines and/or limestone powder, 40% of the particles would be at or smaller than this size and apportioned or defined as "cementitious binder" for the purpose of determining or define the w/cm of the cementitious composition, and 60% of the of the particles would be larger than the cutoff size and apportioned or defined as "aggregate" that is not used to determine or define the w/cm. In many or most cases it means the quarry fines and/or limestone replace a both portion of cementitious binder and a portion of aggregate. This accounts for the effects on both water demand and strength without overstating them.

Figure 3:
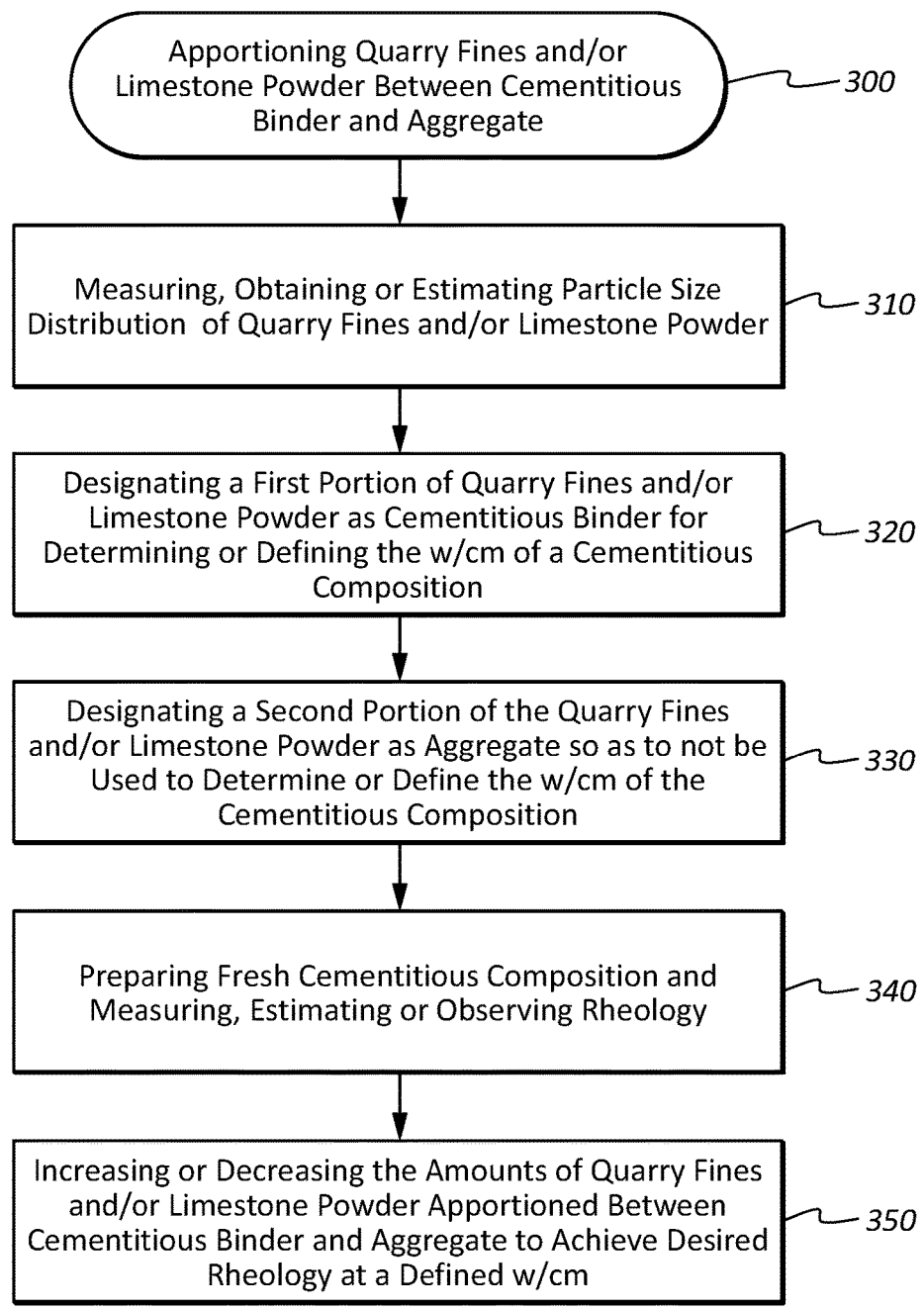
FIG. 3 is a flow chart illustrating another example method for apportioning quarry fines and/or limestone powder between cementitious binder and aggregate.

FIG. 3 is a flow diagram illustrating an alternative method 300 for apportioning quarry fines and/or limestone powder between cementitious binder and aggregate when designing and/or manufacturing a cementitious composition. Step 310 involves measuring, obtaining and/or estimating the particle size distribution (PSD) of the quarry fines and/or limestone powder. Step 330 involves designating or defining a first portion of quarry fines and/or limestone powder as "cementitious binder" for the purpose of determining or defining the w/cm of the cementitious composition being manufactured and/or designed. Step 330 involves designating or defining a second portion of quarry fines and/or limestone powder as "aggregate" that is not used to determine or define the w/cm of the cementitious composition being manufactured and/or designed. The foregoing designations or definitions can be somewhat arbitrary. However, it has been found that precision is not normally required as long as a substantial portion (e.g., 10-85%, 20-80%, 30-70%, 40-60%, 45-55% or 50%) of the particles are defined as "cementitious binder" and a substantial portion (e.g., 15-90%, 20-80%, 30-70%, 40-60%, 45-55% or 50%) of the particles are defined as "aggregate." In general, finer quarry fines and/or limestone powder may reasonably be considered to contain or approximate more "cementitious binder" particles and fewer "aggregate" particles, and coarser quarry fines and/or limestone powder may reasonably be considered to contain or approximate fewer "cementitious binder" particles and more "aggregate" particles. A few test batches can be used to determine a reasonable apportionment, mainly by testing rheology, which can be performed in a relatively short period of time, such as within 10-30 minutes after initially mixing the test batches. As a general rule, apportioning more of the quarry fines and/or limestone powder as "cementitious binder" will improve rheology, while apportioning more of the quarry fines and/or limestone powder as "aggregate" will improve strength. Striking a desirable balance between the two has been found to be remarkably easy, which demonstrates the robustness of the methodology.

Figure 4:
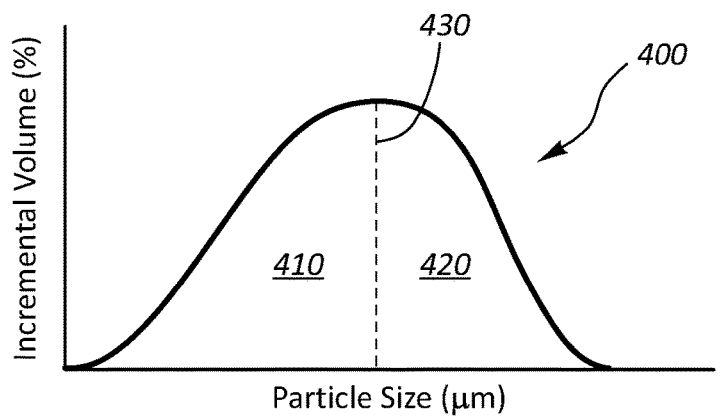
FIG. 4 is an example particle size distribution (PSD) chart that schematically illustrates the PSD of quarry fines and/or limestone powder and how finer and coarser particles can be apportioned between cementitious binder and aggregate for designing and/or manufacturing cementitious compositions.

FIG. 4 is a PSD chart 400 that schematically illustrates the particle size distribution (PSD) of hypothetical quarry fines and/or limestone powder. PSD chart 400 illustrates a first finer portion 410 with particle sizes at or less than a defined or approximated particle size cutoff 430 and a second coarser portion 420 with particle sizes at or greater than cutoff particle size cutoff 430. First portion 410 may be considered or defined as "cementitious binder" and second portion 420 may be considered or defined as "aggregate" for purposes of designing and manufacturing concrete or other cementitious composition having a defined w/cm and defined quantity of quarry fines and/or limestone powder. Chart 400 therefore visually illustrates a way to understand the apportioning method 200 shown in FIG. 2 and described above. One can readily see that moving particle size cutoff 430 to the left reduces the quantity of quarry fines and/or limestone powder defined as "cementitious binder" and increases the quantity defined as "aggregate." Conversely, it may easily be seen that moving particle size cutoff 430 to the right increases the quantity of quarry fines and/or limestone powder defined as "cementitious binder" and reduces the quantity defined as "aggregate." To be sure, quarry fines and/or limestone power are in fact neither "cementitious binder" or "aggregate" following known or standard definitions. They are merely apportioned or defined this way to facilitate the design and manufacture of a cementitious composition having predictable rheology, admixture requirements, and strength.

Figure 5:
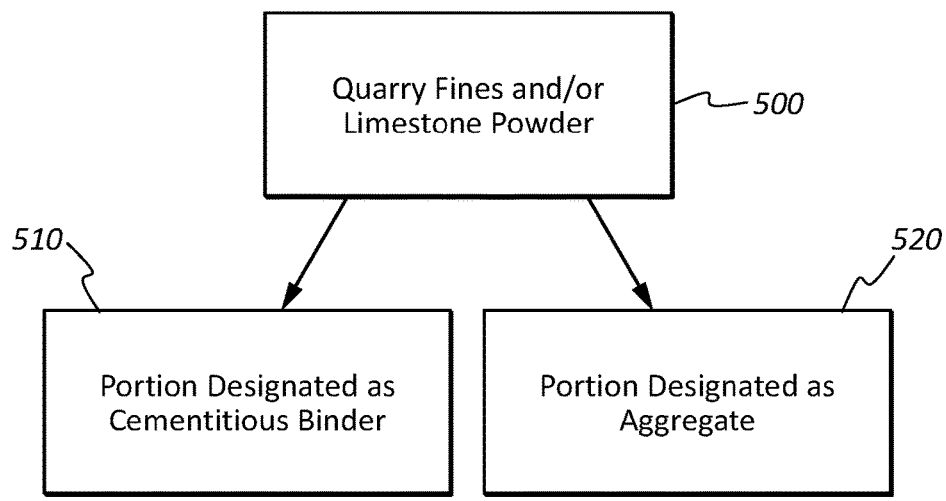
FIG. 5 is a box diagram that schematically illustrates a quantity of quarry fines and/or limestone powder apportioned between cementitious binder and aggregate.

FIG. 5 is a box diagram illustrating how a quantity of quarry fines and/or limestone powder 500 (e.g., having a d90 between about 50-150 µm) can be apportioned between a cementitious binder portion 510 and an aggregate (or filler) portion 520 for purposes of designing and manufacturing a cementitious composition having a defined w/cm and a defined quantity of quarry fines and/or limestone powder. Box diagram 500 therefore visually illustrates a way to understand the apportioning method 300 shown in FIG. 3 and described above. One can readily see that apportioning or defining first and second portions of quarry fines and/or limestone powder as either "cementitious binder" 510 or "aggregate" 520 may be somewhat arbitrary based on experience. Again, apportionment need not be viewed as an exacting or rigorous exercise because, once again, none of the particles are in fact "cementitious binder" or "aggregate" under standard definitions. They are merely apportioned or defined this way to facilitate the design and manufacture of a cementitious composition having predictable rheology, admixture requirements, and strength.

Figure 6A:
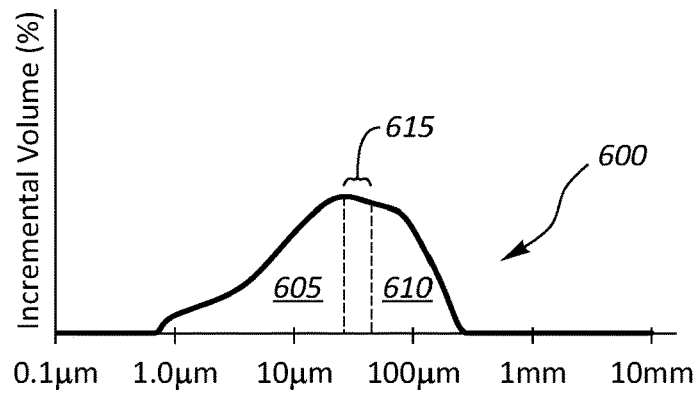
FIGS. 6A-6E are PSD charts illustrating different particle quarry fines and/or limestone powder materials and how finer and coarser particles can be apportioned between cementitious binder and aggregate for designing and/or manufacturing cementitious compositions.
Figure 6B:
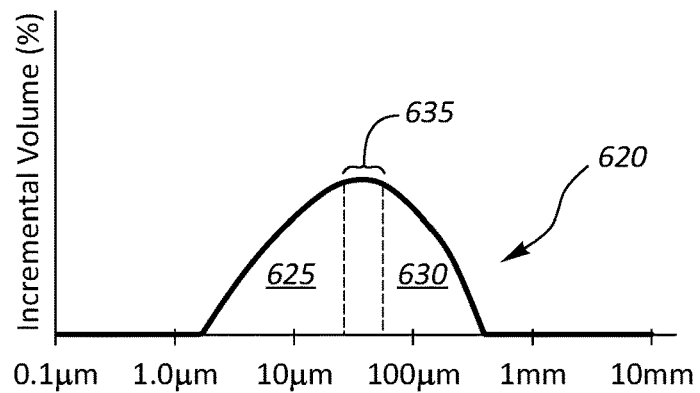
Figure 6C:
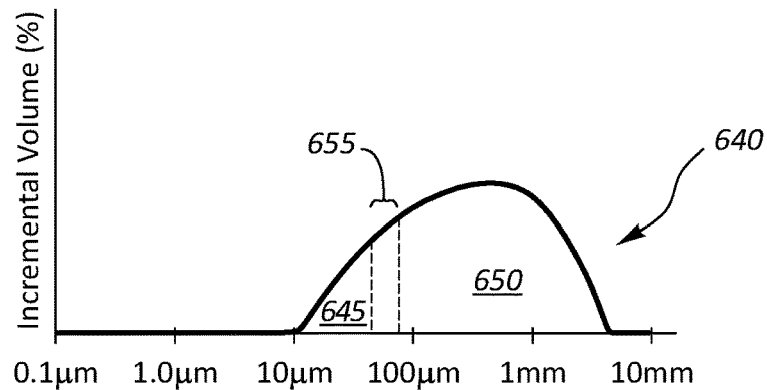

FIGS. 6A-6E are PSD charts that illustrate how quarry fines and/or limestone powder having different particle size distributions might be apportioned, designated or defined as "cement" or "aggregate". FIG. 6A is a PSD chart showing a PSD curve 600 that approximates an average PSD based on three different PSD measurements for Staker Parson mine rock dust.

The rock dust can be apportioned between a first finer portion 605 (which can be treated as "cement" or "cementitious binder") and second coarser portion 610 (which can be treated as "aggregate" or "filler") based on established or estimated particle size cutoff 615, which is shown as a range rather than a discrete particle size. That is because the actual particle size cutoff may vary depending on the particle sizes of OPC and SCM and/or the relative amounts of OPC, SCM, and rock dust, and/or the cement factor, and/or the measured effect of this particular rock dust on rheology and/or strength for given types of concrete (e.g., low, medium, or high strength). The particle size cutoff range 615 is illustrative because the actual particle size cutoff may vary within a defined range.

FIG. 6B is a PSD chart showing a PSD curve 620 that approximates a sieve analysis for a limestone powder from Blue Mountain Minerals identified as "Feed Flour." This material appears to be similar to but somewhat coarser than the Staker mine rock dust of FIG. 6A, but was found to be suitable for use in the disclosed invention. The Feed Flour can be apportioned between a first finer portion 625 (which can be treated as "cement" or "cementitious binder") and second coarser portion 630 (which can be treated as "aggregate" or "filler") based on established or estimated particle size cutoff 635, which is shown as a range. The actual particle size cutoff may vary within a range depending on factors noted in the preceding paragraph.

FIG. 6C is a PSD chart showing a PSD curve 640 that approximates a sieve analysis for limestone-based quarry fines from Blue Mountain Minerals identified as "Super Sand." This material is substantially coarser than the rock dust and limestone powder materials of FIGS. 6A-6B, but can be suitable for use in the disclosed invention if properly apportioned. This quarry fines material can be apportioned between a first finer portion 645 (which can be treated as "cement" or "cementitious binder") and second coarser portion 650 (which can be treated as "aggregate" or "filler") based on established or estimated particle size cutoff 655, which is shown as a range. The actual particle size cutoff may vary within a range depending on factors noted in the preceding paragraphs. Because about 75% of the particles in this material are larger than about 150 μm, and range up to about 4 mm, and about 14% are smaller than about 75 μm, the quantity of particles treated as "cement" or "cementitious binder" is relatively small compared to particles treated as "aggregate." Perhaps about 10-20% of this material may be defined as "cementitious binder" and about 80-90% defined as "aggregate." Alternatively, it may be advantageous to supplement this material with a finer material, such as those in FIG. 6A, 6B, 6D or 6E to boost the "cement" portion.

Figure 6D:
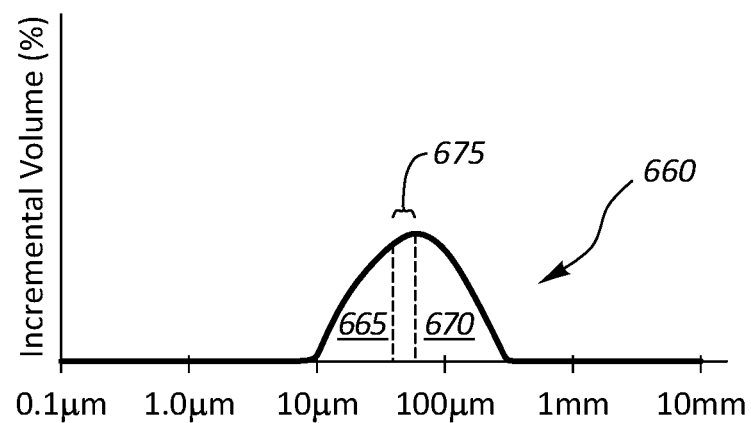

FIG. 6D is a PSD chart showing a PSD curve 660 that approximates a sieve analysis for a limestone powder from Specialty Minerals identified as "Marble White 80." This material appears to be somewhat coarser than the rock dust and limestone powder of FIGS. 6A-6B, but was determined to be suitable for use in the disclosed invention. This limestone powder can be apportioned between a first finer portion 665 (which can be treated as "cement") and second coarser portion 660 (which can be treated as "aggregate") based on established or estimated particle size cutoff 675, which is shown as a range. The actual particle size cutoff may vary within a range depending on factors noted in the preceding paragraphs.

Figure 6E:
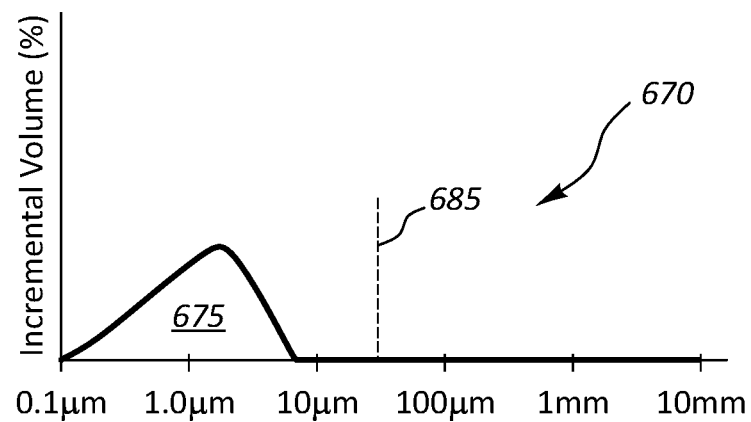

FIG. 6E is a PSD chart showing an estimated PSD curve 670 for a limestone powder from Blue Mountain Minerals identified as "micro fine" limestone. This material is much finer than any of the materials of FIGS. 6A-6D but may be suitable as a supplement for any of the materials of FIGS. 6A-6D to increase the proportion of particles defined as "cement" or "cementitious binder." If there existed a hypothetical particle size cutoff in the location shown by dotted line 685, the entirety of the micro fine material would likely be apportioned entirely as fine portion 675 and treated as "cement" or "cementitious binder" for purposes of its expected effect on water demand. While this material may increase early strength, it would not be expected to yield higher strength concrete if used solely to replace a portion of the cement. It would be expected to increase strength if used in addition to the cement and to replace part of the aggregate, but would negatively impact rheology and require the use of additional water reducing admixture(s) to offset such effects. From the standpoint of particle packing, only a limited amount of micro fine limestone can be added to the cement (perhaps no more than 10%) before it would decrease particle packing by overloading the particle system with too many ultrafine particles. This would violate the Fuller principle of broad particle size distribution.

Figure 7:
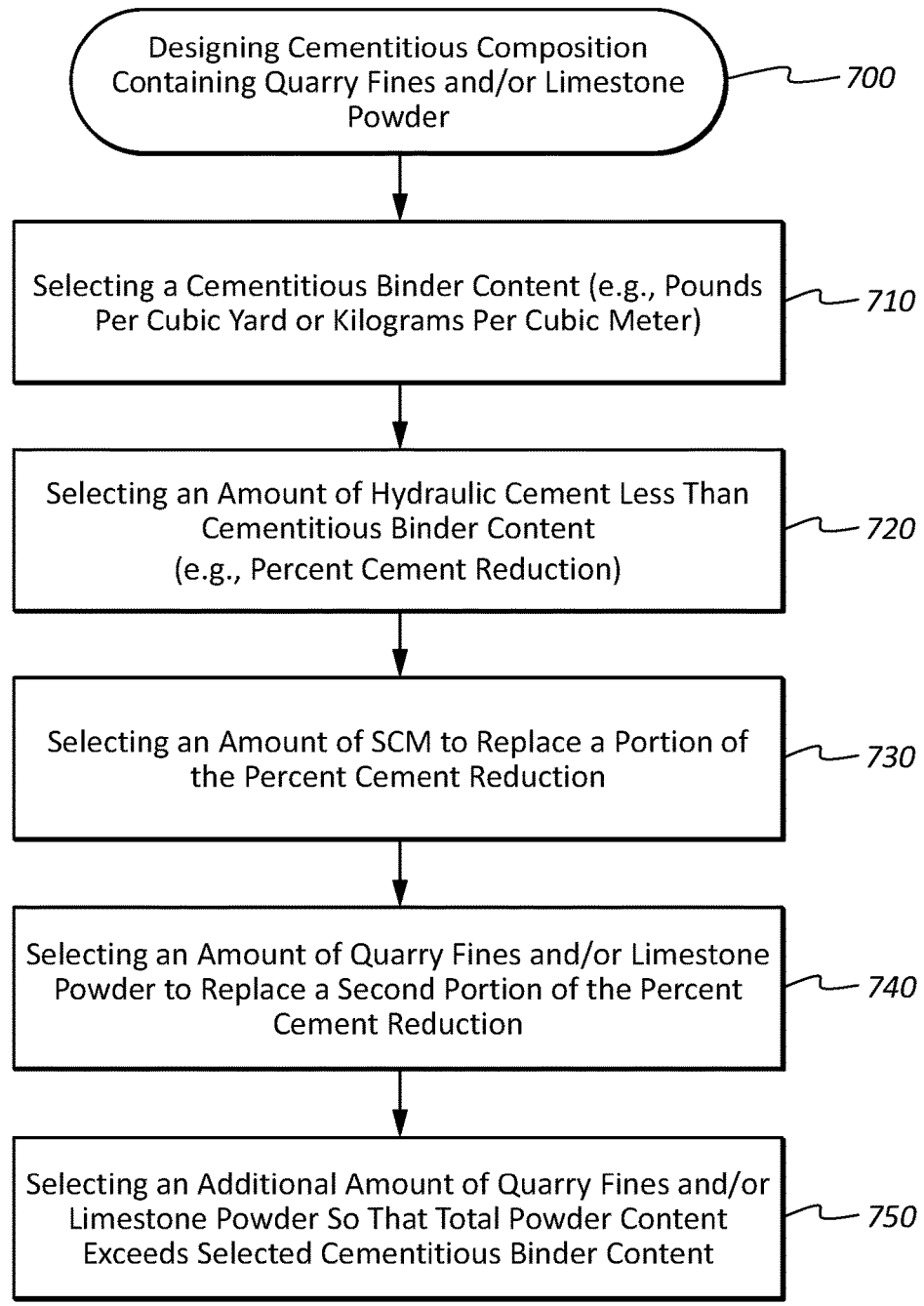
FIG. 7 is a flow chart illustrating an example method of designing a cementitious composition containing quarry fines and/or limestone powder.

FIG. 7 is a flow diagram that illustrates an example method 700 of designing a cementitious composition containing quarry fines and/or limestone powder. A first step 710 involves selecting a cementitious binder content, such as pounds per cubic yard (lb/yd$^3$) (U.S. practice), or kilograms per cubic meter (kg/m$^3$) (most parts of the world). The selected cementitious binder content correlates with the "cement factor" and can be based on known mix designs and/or standard practices of a concrete manufacturer. To the extent that the new cementitious binder system, including quarry fines and/or limestone powder, yields a stronger cementitious binder paste, the selected cementitious binder content can be less than the cementitious binder content of a known cementitious mix that is being redesigned according to the invention. A second step 720 involves selecting an amount of hydraulic cement that is less than the selected cementitious binder content. For example, if the selected amount of hydraulic cement is 65% of the selected cementitious binder content, it would result in a reduction in clinker content of 35% compared to a standard cementitious composition made using hydraulic cement as sole cementitious binder. A third step 730 involves selecting an amount of SCM to replace all or a portion of the cement reduction. For example, if the cement reduction were 35%, the selected amount of SCM might be any amount up to or exceeding 35%. However, because the purpose of this method is to substitute a portion of the hydraulic cement with quarry fines and/or limestone powder, the selected amount of SCM can be less than 35%. For example, the selected amount of SCM might be 25%. That would leave a remaining cementitious binder "deficit" of 10% that can be occupied by a powder. A fourth step 740 involves selecting an amount of quarry fines and/or limestone powder to replace an additional portion of the cement reduction. For example, if the cement reduction were 35%, and 25% of the cementitious binder comprised one or more SCMs, the amount of quarry fines and/or limestone powder required to eliminate the cementitious binder deficit would be 10% of the total binder. If other components, such as supplemental lime and/or supplemental sulfate are included and considered to form part of the cementitious binder, a lower quantity of quarry fines and/or limestone powder may be required to eliminate the cementitious binder deficit. A fifth step 750 involves selecting an additional amount of quarry fines and/or limestone powder so that the total powder content (hydraulic cement, SCM, quarry fines and/or limestone powder and optional supplemental lime and/or sulfate) exceeds the selected cementitious binder content. Following this procedure permits one to consider the materials selected in steps 720, 730 and 740 to contribute to the defined w/cm for purposes of yielding a cementitious composition having predictable rheology at a given cement factor. However, the materials selected in steps 720, 730, 740 and 750 will contribute to the overall powder content and affect the strength. An increased powder content also reduces the tendency of the cementitious composition to experience bleeding or segregation, improving workability, cohesiveness, finishability, and overall performance. Based on the total cementitious paste volume, including all powders and water, the amount(s) of fine, medium, and/or coarse aggregates can be adjusted to produce concrete of the correct yield (e.g., per cubic yard or cubic meter).

Figure 8:
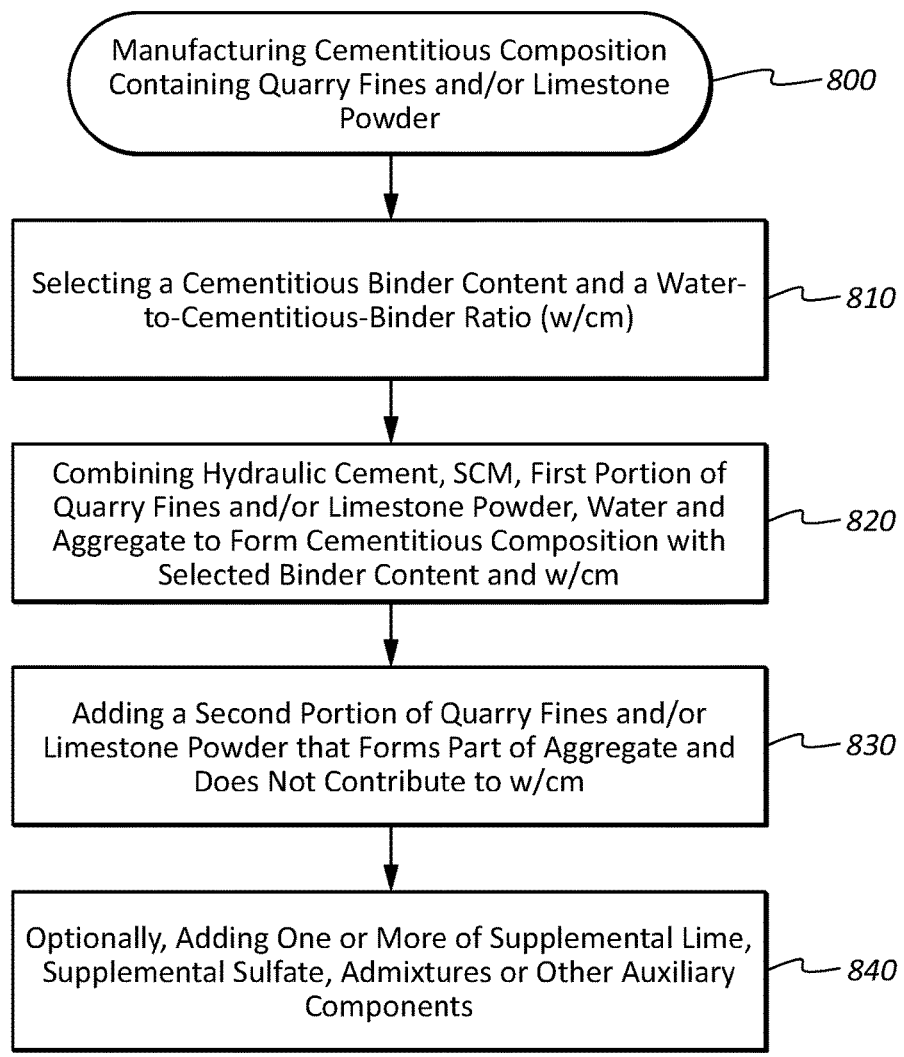
FIG. 8 is a flow chart illustrating an example method of manufacturing a cementitious composition containing quarry fines and/or limestone powder.

FIG. 8 is a flow diagram that illustrates an example method 800 of manufacturing a cementitious composition comprising quarry fines and/or limestone powder. A first step 810 involves selecting a cementitious binder content and a water-to-cementitious binder ratio (w/cm) (i.e., defined w/cm). These can be based on known mix designs and/or standard practices of a concrete manufacturer in order to design concrete having a desired or predetermined rheology and strength. A second step 820 involves combining hydraulic cement, one or more SCMs, a first portion of quarry fines and/or limestone powder, water and aggregate to form a cementitious composition with the selected binder content and w/cm. A third step 830 involves adding a second portion of quarry fines and/or limestone powder that is deemed to form part of the aggregate, not the cementitious binder, so as to not contribute to the defined w/cm. A fourth step 840 involves the optional step of adding one or more of supplemental lime, supplemental sulfate or other auxiliary components. To be sure, steps 820, 830 and 840 need not be performed sequentially or in any particular order. They can be performed simultaneously and/or partially combined and/or performed in a different order, including any desired order that fits within a concrete manufacturer's standard practices. The steps are merely set forth as separate steps to illustrate how they analytically reflect or represent aspects of the new design and manufacture methodologies disclosed herein.

VII. Performance-Enhancing Particulate Pre-Mix

Quarry fines and/or limestone powder can be blended with one or more performance-enhancing additives to yield a performance-enhancing particulate pre-mix that can be added to concrete or other cementitious mixture to substitute for a portion of the cement and/or aggregate components normally used in accordance with a given mix design. Performance-enhancing additives may include one or more of supplemental lime (e.g., CaO, Ca(OH)$_2$, hydrated lime, or Type S Lime), supplemental sulfate (e.g., calcium sulfate hemihydrate, plaster of Paris, calcium sulfate dihydrate, gypsum, anhydrous calcium sulfate, anhydrite, or alkali metal sulfate), alkanolamines (e.g., triethanolamine (TEA) or triisopropanolamine (TIPA)), amines (tetrahydroxyethylethylene diamine (THEED) or poly(hydroxyalkylated)ethyleneamine) (polyHEED), water-reducing admixtures, superplasticizers, accelerators, retardants, and the like. Because quarry fines and/or limestone powder are non-reactive, additives containing water or moisture can be blended with quarry fines and/or limestone powder without premature hydration, as would occur if added to a cementitious binder prior to being used to make a fresh cementitious mixture. The performance-enhancing particulate pre-mix can be made using any known blending method, including intergrinding, planetary mixers, spraying, and the like.

In some embodiments, the performance-enhancing particulate pre-mix comprises less than 50%, 45%, 40%, 35%, 30%, 25%, 20%, 15%, 10%, 7%, 5%, 4%, 3%, 2%, or 1% of hydraulic cement and can be free of hydraulic cement altogether. In some embodiments, the performance-enhancing particulate pre-mix comprises less than 50%, 45%, 40%, 35%, 30%, 25%, 20%, 15%, 10%, 7%, 5%, 4%, 3%, 2%, or 1% of combined hydraulic cement and supplemental cementitious material (SCM) and can be free of hydraulic cement and SCM altogether.

The performance-enhancing particulate premix can be used to replace a portion of cementitious binder, including OPC, but especially blended cements comprising OPC and at least one SCM selected from slag, fly ash, natural pozzolan, ground glass, and the like. Because of its low cost, which is less than, the same as, or only marginally more than the cost of aggregate, the premix may also be used to replace a portion of sand or other aggregate. Because water demand of the performance-enhancing particulate premix is typically less than cement, but more than aggregate, using it to replace both a portion of the cementitious binder and aggregate portions strikes an optimal balance that enhances performance without significantly increasing, and in some cases reducing, water demand.

Figure 9:
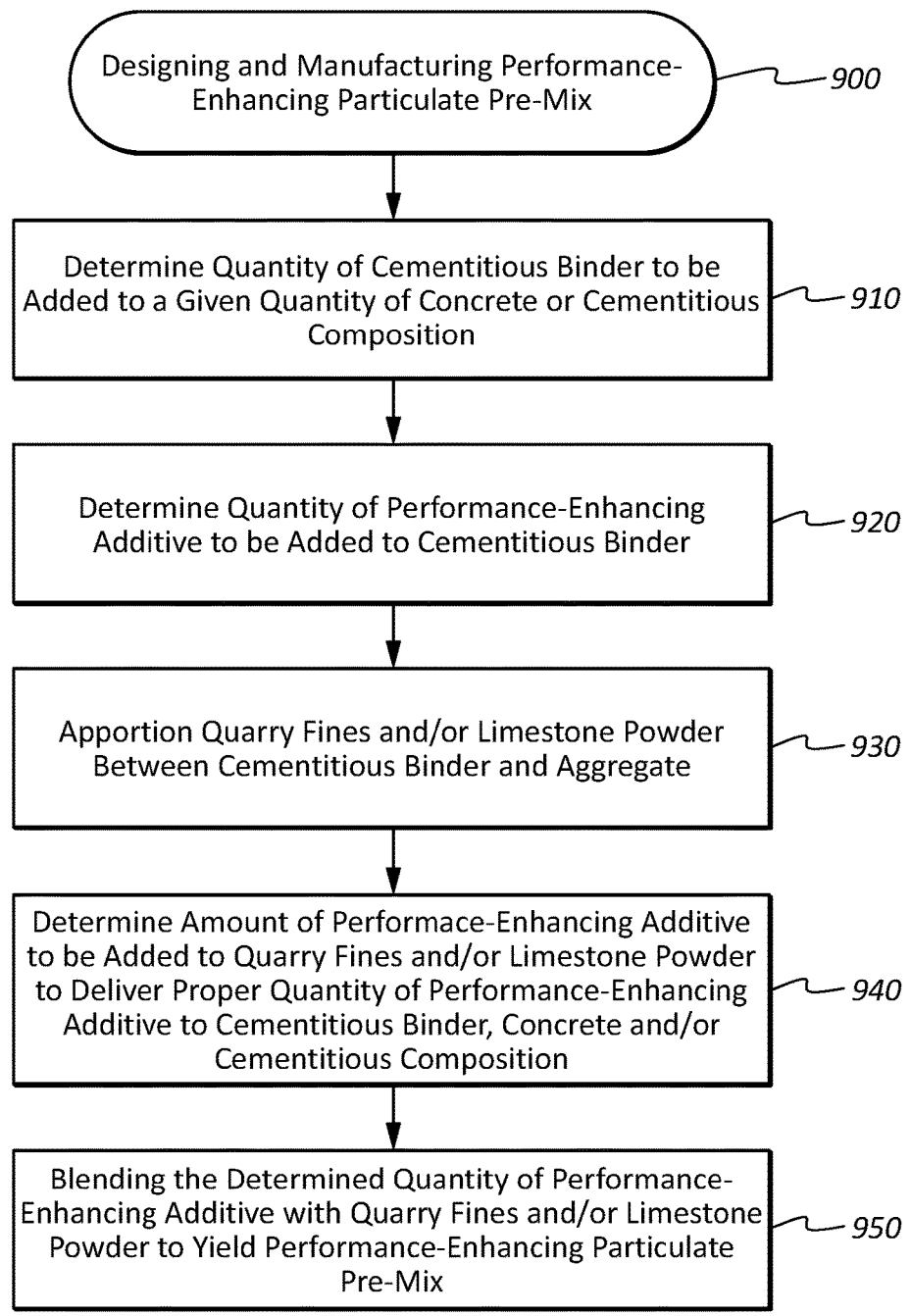
FIG. 9 is a flow chart illustrating an example method of designing and manufacturing a performance-enhancing particulate pre-mix.
Figure 10:
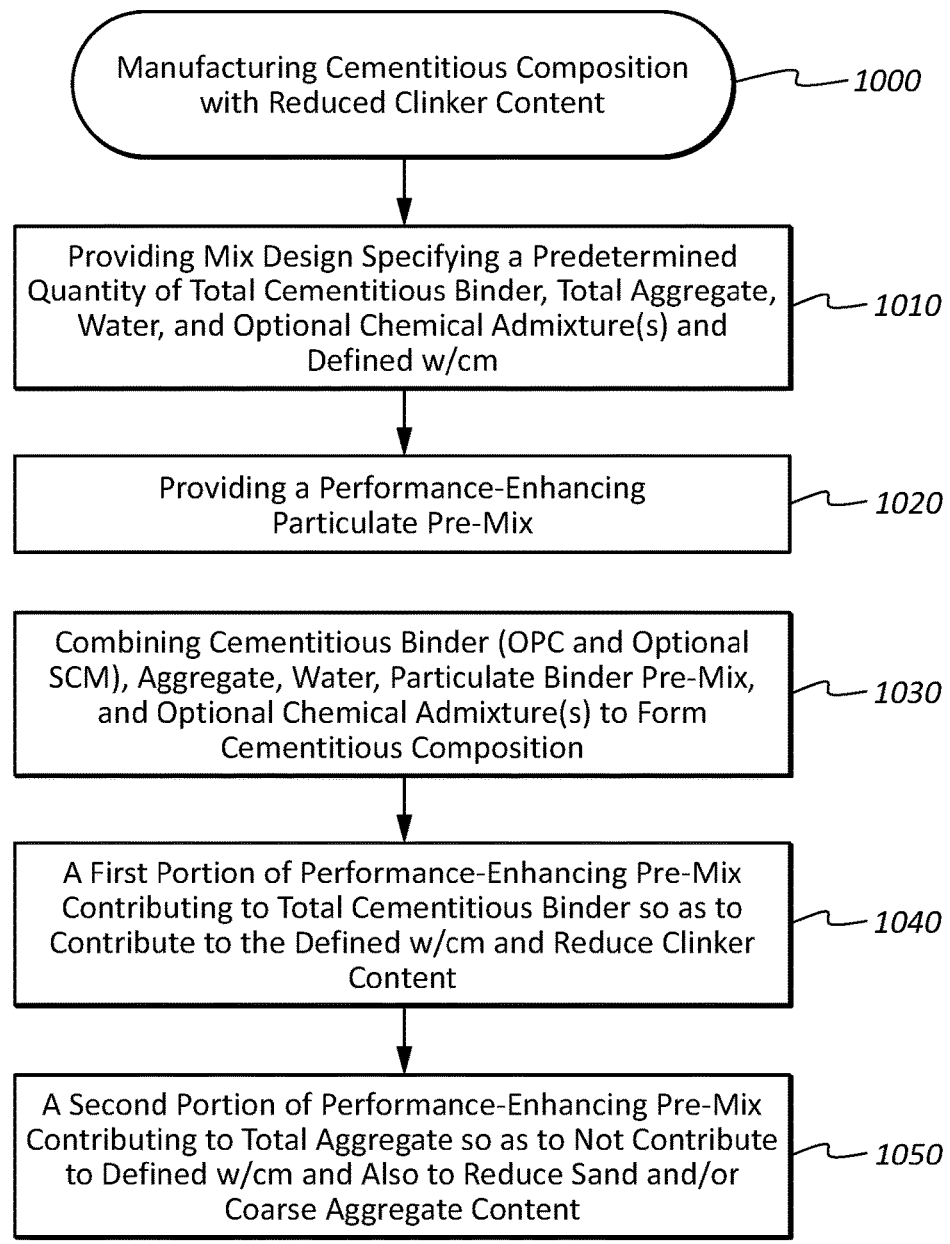
FIG. 10 is a flow chart illustrating an example method of manufacturing a cementitious composition with reduced clinker composition using a performance-enhancing particulate pre-mix.

Reference is made to FIGS. 9-10, which illustrate or relate to example embodiments for designing and manufacturing a performance-enhancing particulate pre-mix and cementitious compositions made using the pre-mix, which utilize quarry fines and/or limestone powder and one or more performance-enhancing additives. The methods illustrated in FIGS. 9-10 are given by way of example, not limitation, and performance-enhancing particulate pre-mix compositions can be designed and manufactured using any desired method.

FIG. 9 is a flow diagram illustrating a method 900 for designing and manufacturing a performance enhancing pre-mix. Step 910 involves determining a quantity of cementitious binder to be added to a given quantity of concrete or cementitious composition (e.g., lb/yd$^3$ or kg/m$^3$). Step 920 involves determining a quantity of performance-enhancing additive to be added to the concrete or cementitious composition by means of the performance-enhancing particulate pre-mix. Step 930 involves apportioning quarry fines and/or limestone powder between cementitious binder and aggregate. Step 940 involves determining an amount of the performance-enhancing additive to be added to the quarry fines and/or limestone powder in order to deliver a proper quantity of the performance-enhancing additive to the cementitious binder, concrete, or other cementitious composition. Step 950 involves blending the determined quantity of performance-enhancing additive with the quarry fines and/or limestone powder to yield the performance-enhancing particulate pre-mix.

FIG. 10 is a flow diagram illustrating a method 1000 for manufacturing a cementitious composition with reduced clinker content. Step 1010 involves providing a mix design specifying a predetermined quantity of total cementitious binder, total aggregate, water, and optional chemical admixture(s), and a defined water-to-cement ratio (w/c) and/or water-to-cementitious binder ratio (w/cm). A typical mix design for concrete specifies the quantity of each material per cubic yard or cubic meter of concrete. Step 1020 involves providing a performance-enhancing particulate pre-mix as described herein. Alternatively, some or all of the "pre-mix" can be manufactured in situ when blending the components of the cementitious composition. Step 1030 involves combining the cementitious binder (OPC, optionally with SCM), aggregate, water, and optional chemical admixture(s) to form a cementitious composition. Sub-step 1040 involves a first portion of the performance-enhancing particulate pre-mix contributing to the total (or defined) cementitious binder content so as to contribute or factor into the defined w/cm (or w/c) and reduce the clinker content of the mix design compared to concrete made in the absence of the performance-enhancing particulate pre-mix. Sub-step 1050 involves a second portion of the performance-enhancing particulate pre-mix contributing to the total aggregate content and not the defined cementitious binder content so as to not contribute to the defined w/cm (or w/c) and also to reduce sand and/or coarse aggregate content of the mix design compared to concrete made in the absence of the performance-enhancing particulate pre-mix. It will be appreciated that the performance-enhancing particulate pre-mix may reduce SCM content in addition to, or instead of, reducing clinker content.

VIII. Attributes of Concrete and Cementitious Compositions

Concrete and other cementitious compositions made according to the disclosed invention will typically have readily observable attributes or signatures that set them apart from conventional concrete mix designs, particularly when the discloses design method are used to redesign an existing concrete mix design. For example, a commercial concrete mix design will typically have a specified cementitious binder content, specified water-to-cementitious binder ratio (w/cm) (i.e., weight of water divided by the combined weight of Portland cement and all SCMs), and specified aggregate(s) content. A new concrete mix design made according to the disclosed invention will typically have one or more of the following attributes or signatures:

(1) higher actual w/cm (i.e., weight of water divided by combined weight of Portland cement and SCMs, excluding quarry fines and/or limestone powder) than the specified w/cm of the commercial mix when a portion of cementitious binder is replaced by quarry fines and/or limestone powder that contribute or factor into the defined w/cm;
(2) lower w/p (i.e., weight of water divided by combined weight of Portland cement, SCMs, and total quarry fines and/or limestone powder) than the specified w/cm of the commercial mix when a second portion of quarry fines and/or limestone powder does not contribute to and is not factored into the defined w/cm;
(3) a design w/cm that is similar or equal to the specified w/cm of the commercial mix (within + or − 0.03, 0.02, 0.01, or 0.005;
(4) total combined Portland cement and SCM content, excluding quarry fines and/or limestone powder, that is less than the specified cementitious binder content of the commercial mix;
(5) total powder content, including total combined cementitious binder and quarry fines and/or limestone powder, greater than the specified cementitious binder content of the commercial mix;
(6) reduced quantity of fine aggregate compared to the commercial mix when replaced by a portion of the quarry fines and/or limestone powder;
(7) reduced VMA requirement in the case of mix that includes superplasticizer because lower w/p reduces bleeding and segregation;
(8) higher paste density due to increased particle packing density of total particles compared to paste density of the commercial mix;
(9) greater cementitious paste density in the interfacial transition zone (ITZ) between bulk paste and aggregate surfaces (e.g., coarse aggregate surfaces) compared to the ITZ in commercial mix; and
(10) greater bond strength between cementitious paste and coarse aggregates compared to the commercial mix.

IX. Examples

Some examples below utilized quarry fines purchased from the Keigley quarry located on Genola, Utah at a price substantially lower than the typical cost of OPC. The quarry fines were conveniently packaged in 50 pound sacks of coal mine rock dust stacked on a pallet. In this form, the product was still significantly less expensive than the bulk price of OPC. If purchased in bulk, the cost of quarry fines would be about ⅓ or less than the bulk price of OPC. This highlights the tremendous cost savings that can be realized by effectively using quarry fines. In the examples below, 25-50% of the OPC normally contained in concrete was replaced with various SCMs and quarry fines and provided similar or greater strength than control mixes containing 100% OPC or 80% OPC and 20% fly ash. A first particle size analysis of the coal mine rock dust performed using a Microtrac-X100 particle size analyzer showed a very broad, flat PSD curve, with particles as large as about 135 µm and a small proportion (3%) smaller than 1 µm, a d90 of about 70 µm, a d50 of about 17 µm, and a d10 of about 2.5 µm. A chemical analysis of the coal mine rock dust showed that it contained 87% calcite ($CaCO_3$), 3% dolomite ($CaMg(CO_3)_2$), 3% quartz, 1% K-feldspar, 1% ankerite/Fe dolomite, and 5% illite-mica. A second particle size analysis obtained by hydrometer analysis showed a percent passing of 93% at 75 µm, 61% passing at 27 µm, 53% passing at 18 µm, 43% passing at 11 µm, 31% passing at 8 µm, 23% passing at 6 µm, 13% passing at 3 µm, and 6.2% passing at 1 µm. A third particle size analysis performed by a Malvern Mastersizer 2000 showed a d90 of about 91 µm, a d50 of about 17 µm, and a d10 of about 2.75 µm.

Some examples utilized Feed Flour limestone powder sold by Blue Mountain Minerals, Columbia, Calif. It reportedly contains about 90% $CaCO_3$ and has a d90 of about 100 µm and a d50 of about 43 µm. It is off-white in color.

Some examples utilized limestone powder sold by Specialty Minerals in Lucerne Valley, Calif. It is a ground calcium carbonate sold under the name Marble White 80. It reportedly has a brightness of 92, specific gravity of 2.7, and contains 98% calcium carbonate, 1.2% magnesium carbonate, and less than 0.1% iron oxide. A sieve analysis was performed on a 1000 g sample, with 32.51 g (3.251%) retained on a #70 sieve (212 µm), 71.83% (7.183%) retained on a #100 sieve (150 µm), 170.18 g (17.018%) retained on a #140 sieve (106 µm), 246.52 (24.653%) retained on a #200 sieve (75 µm), and 478.95 g (47.895%) in the pan. The d90 is therefore about 150 µm and the d50 is about 75 µm.

Some examples utilized Class F fly ash produced at the Gaston, Ala. steam power plant and provided by Headwaters, Inc., previously headquartered in South Jordan, Utah, recently acquired by Boral. Various forms of this fly ash were used, including in its original form (FA) and after being classified into fine (FFA), ultrafine (UFFA), and coarse fractions (CFA). Classification was performed by RSG, Inc., located in Sylacauga, Ala. The PSD of each material was measured by RSG using a Microtrac-X100 particle size analyzer. The unprocessed fly ash (FA) had a d90 of about 80 µm, a d50 of about 20 µm, and a d10 of about 2.5 µm. The fine fly ash (FFA) after a first classification had a d90 of about 20 µm, a d50 of about 7.5 µm, and a d10 of about 1.5 µm. The coarse fly ash (CFA) after the first classification had a d90 of about 120 µm, a d50 of about 45 µm, and a d10 of about 20 µm. The FFA was classified again to yield a first ultrafine fly ash (UFFA) having a d90 of about 4.6 µm, a d50 of about 2.5 µm, and a d10 of about 1.16 µm, and a second UFFA having a d90 of about 8.5 µm, a d50 of about 4.6 µm, and a d10 of about 1.45 µm. Some examples utilized Class F fly ash produced at Four Corners, Fruitland, N. Mex., power plant, distributed by SRMG, and provided by Central Concrete.

Some examples utilized ultrafine fly ash produced by classifying fly ash produced at three power plants owned by Pacificorp: Jim Bridger, located in Bridger, Wyo.; Hunter, located in Castle Dale, Utah; and Huntington, located in Huntington, Utah. The fly ashes were classified by RSG. The Bridger fly ash was apparently moist and agglomerated and was not able to be effectively classified or its PSD characterized. The Bridger "UFFA" was therefore the least effective even though it is the only one of these three fly ashes sold and used commercially in concrete on a consistent basis.

The Hunter and Huntington fly ashes are generally considered to be of substandard quality, are not generally used in concrete, are sometimes used in asphalt, and are typically landfilled (i.e., because of excessive carbon and/or a reactivity index below 75). They reportedly amount to about 1 million tons produced per year. This would be a substantial source of fly ash if it could be beneficiated into usable products of acceptable quality. The Hunter and Huntington fly ashes were classified to provide a 20% yield of UFFA product, which would amount to about 200,000 tons per year of high quality UFFA between the two geographically similar situated power plants.

The PSD of the Hunter UFFA was measured by RSG using a Microtrac X100 particle size analyzer and reported to have a d90 of about 7.5 µm, a d50 of about 3.1 µm, and a d10 of about 1.1 µm. The PSD was bimodal with peaks at about 1.3 µm and about 4 µm. The specific gravity of the Hunter UFFA was determined to be 2.6375 and the LOI satisfied ASTM C-618. The Hunter UFFA was tested by Wyoming Analytical Laboratories and determined to contain 44.73% $SiO_2$, 18.70% $Al_2O_3$, 13.53% CaO, 2.72% $SO_3$, 5.78% $Fe_2O_3$ (total SAF=69.21); 5.29% MgO, 1.66% $Na_2O$, 1.57% $K_2O$, 0.99% $TiO_2$, 1.26% $P_2O_5$, and 3.43% LOI. A calorimetry test indicated some degree of set retardation when used with OPC at 40%.

The PSD of the Huntington UFFA was measured by RSG using a Microtrac X100 particle size analyzer and reported to have a d90 of about 10.5 µm, a d50 of about 3.8 µm and a d10 of about 1.26 µm. The specific gravity of the Huntington UFFA was determined to be 2.534 and the LOI satisfied ASTM C-618 according to NIST analysis. The Huntington UFFA was tested by Wyoming Analytical Laboratories and determined to contain 44.94% $SiO_2$, 19.30% $Al_2O_3$, 4.17% $Fe_2O_3$ (total SAF=69.11), 9.34% CaO, 2.17% $SO_3$, 3.35% MgO, 2.87% $Na_2O$, 1.85% $K_2O$, 1.07% $TiO_2$, 0.92 $P_2O_5$, and 9.02% LOI (making it non-conforming if accurate). A calorimetry test indicated some degree of set retardation when used with OPC at 40%.

Some examples utilized calcined shale flue dust produced by Utelite Corporation, Coalville, Utah. The shale dust is collected in the baghouse and is a byproduct produced during the calcining of shale to make lightweight aggregates. The shale dust has not previously been used in concrete and, to the best of the knowledge of Utelite personnel that initially provided a sample, had never previously been tested in concrete or as a cement substitute. Instead, it is occasional used as a filler in asphalt but typically landfilled. The PSD of the shale dust was measured by RSG using a Microtrac X100 particle size analyzer and reported to have a d90 of about 114 µm, a d50 of about 24 µm and a d10 of about 3.5 µm. The shale dust was determined by XRF to contain 56.6% $SiO_2$, 14.2% $Al_2O_3$, 6.04% CaO, 2.25% MgO, 4.21% $Fe_2O_3$, 0.29% $Na_2O$, 1.98% $K_2O$, 0.54% $TiO_2$, 0.21 $P_2O_5$, 0.72% S, 0.02% $MnO_2$, 0.06% BaO, <0.21% Cr. The chemistry is therefore similar to a Class F fly ash except that shale dust has no combustible elemental carbon.

Some examples used Holcim Type II/V OPC manufactured at Devil's Slide cement plant, Morgan, Utah, and sold at Home Depot, Salt Lake City, Utah (sometimes labeled as Type I/II/V or I/II, previously assumed to be Type I/II, and now understood to be Type II/V according to general requirement for cement in Utah to be Type II/V according to ASTM C-150). Some examples used Lehigh Type II/V cement from Lehigh Hanson cement plant, Cupertino, Calif., and provided by Central Concrete.

Some examples utilized Grade 120 ground granulated blast furnace slag (GGBFS) sold by Lehigh Heidelberg, Stockton, Calif., and provided by Central Concrete, located in San Jose, Calif. The GGBFS was determined by XRD to be 97.2% amorphous and by XRF to contain 30.4% $SiO_2$, 13.7% $Al_2O_3$, 43.4% CaO, 6.3% MgO, 0.6% $Fe_2O_3$, 0.1% $Na_2O$, 0.3% $K_2O$, 0.6% $TiO_2$, 4.4% $SO_3$, and 0.01% $MnO_2$. The PSD of the GGBFS reportedly has d90 of about 20 µm, a d50 of about 7.5 µm and a d10 of about 1.6 µm.

Some examples utilized a fine clinker ground by Gebr. Pfeiffer at Kaiserslautern, Germany, to specifications provided by the inventor. Raw Type II/V clinker was provided by Drake Cement, located in Paulden, Ariz., and owned by Unacem, Peru. Some examples utilized an interground blend of volcanic ash provided by Staker Parson, Ogden, Utah, and limestone granules provided by Pfeiffer and ground by Pfeiffer to specifications provided by the inventor. The moisture content of the volcanic ash as received was 6.0%. Intergrinding the volcanic ash with limestone reduced the water content of the interground blend to less than 0.5%. Strength testing indicates the volcanic ash was pozzolanically activated by intergrinding with the limestone.

Concrete mixes tested herein were prepared using a 3.5 cubic feet rotary mixer and cast into 4×8 inch plastic cylinder molds, allowed to harden, transported to CMT Engineering, Inc., of West Valley City, Utah, demolded, placed into a curing chamber, and tested at designated intervals (e.g., 3, 7, 28, 91, and 182 days). Mortar mixes were prepared using a Hobart mixer and cast into 2×2 inch cube molds, allowed to harden, placed into a saturated limewater bath, transported to CMT Engineering, placed into a saturated limewater bath inside the curing chamber, and tested at designated intervals. A lignosulfonate water reducer and/or superplasticizer was/were employed as needed to maintain adequate rheology (e.g., approximate slump of about 3-6 inches, or 7.5-15 cm) and in commercially acceptable amounts.

Comparative Examples 1-5

Comparative Example 1 was prepared from a standard "6-bag" concrete mix containing 564 lbs. of OPC per cubic yard and having a design strength of 5200 psi (35.85 MPa) at 28 days. Comparative Example 2 was prepared from a standard 6-bag concrete mix in which 20% of the OPC is substituted with fly ash. Comparative Example 3 was a further modified standard 6-bag mix in which 30% of the OPC was substituted with fly ash and the sand reduced. Comparative Examples 1-3 are useful control mixes against which other concrete mixes can be compared. The compositions of Comparative Examples 1-3 are set forth in Table 1. Comparative Example 4 is identical to Comparative Example 2 except that 20% of the OPC was substituted with quarry fines instead of fly ash. Comparative Example 5 is identical to Comparative Example 3 except that 30% of the OPC was substituted with quarry fines instead of fly ash. Comparative Examples 4 and 5 do not include an additional quantity of quarry fines deemed as aggregate to replace a portion of the sand.

TABLE 1

| Components/Compressive Strength | Comparative Examples | | | | |
|---|---|---|---|---|---|
| | 1 | 2 | 3 | 4 | 5 |
| Holcim II/V OPC (lb.) | 564 | 451.2 | 394.8 | 451.2 | 394.8 |
| Clinker Reduction (%) | 0% | 20% | 30% | 20% | 30% |
| Class F Fly Ash (lb.) | 0 | 112.8 | 169.2 | 0 | 0 |
| Mine Rock Dust (lb.) | 0 | 0 | 0 | 112.8 | 169.2 |
| Coarse Aggregate (lb.) | 1750 | 1750 | 1750 | 1750 | 1750 |
| Fine Aggregate (lb.) | 1372 | 1338 | 1320 | 1338 | 1320 |
| Water (lb.) | 266.6 | 266.6 | 266.6 | 266.6 | 266.6 |
| Defined w/cm | 0.47 | 0.47 | 0.47 | 0.47 | 0.47 |
| Actual w/cm | 0.47 | 0.47 | 0.47 | 0.59 | 0.675 |
| w/c | 0.47 | 0.59 | 0.675 | 0.59 | 0.675 |
| w/p | 0.47 | 0.47 | 0.47 | 0.47 | 0.47 |
| 3-day (psi/MPa) | 3850/26.5 | 3482/24.0 | 3050/21.0 | 3340/23.0 | 2980/20.5 |
| 7-day (psi/MPa) | 4580/31.6 | 4097/28.2 | 3870/26.7 | 3670/25.3 | 3360/23.2 |
| 28-day (psi/MPa) | 5690/39.2 | 5202/35.9 | 5010/34.5 | 4720/32.5 | 4000/27.6 |
| 3-month (psi/MPa) | 6240/43.0 | 6135/42.3 | 5910/40.7 | 5210/35.9 | 4910/33.9 |
| 6-month (psi/MPa) | 6850/47.2 | 6505/44.9 | 5960/41.1 | 5470/37.7 | 5190/35.8 |

Table 1. Mix composition and strength of Control mixes with 100% OPC, 20% and 30% class F fly ash, or 20% and 30% quarry fines Comparative Examples 1-3 show the relative effects of using OPC compared with a blend of OPC and fly ash at 20% and 30% substitution. Comparative Examples 4 and 5 included OPC and quarry fines at 20% and 30% substitution. As expected, the quarry fines, being non-reactive, performed worse than fly ash when used simply as a partial cement substitute. But when used in ternary and quaternary blends as described in working examples below, they permitted substantially higher clinker reductions at similar to higher strength compared to Comparative Examples 1-5.

Working Examples—Concrete

The following working examples were designed and manufactured by the inventor and are identified using their mix ID numbers assigned during testing and were manufactured using the concrete mix designs set forth in the tables below. Strength values are also provided.

Compared to Comparative Examples 1-5, Mix 10 had the lowest clinker content, highest absolute water-to-cement ratio (w/c), and highest strength at 28, 91, and 182 days. Mixes 10, 11A, 11B and 12B all benefited significantly from including quarry fines as both a partial cement replacement and a partial ultrafine aggregate addition. In addition, the inclusion of Type S lime in each of Mixes 10, 11A, 11B and 12B also appears to have provided a strength benefit. The inclusion of plaster of Paris is believed to have improved rheology and/or increased strength.

Mix 12A is unique because it included no quarry fines, Type S lime, or plaster of Paris addition but exhibited high strength owing to the use of Huntington UFFA having a d90=10.5 μm, a d50=3.8 μm, and a d10=1.26 μm. UFFA was easily dispersed and greatly increased flow compared to using silica fume.

TABLE 2

| Components/Compressive Strength | Example (Mix ID) | | | | |
|---|---|---|---|---|---|
| | 10 | 11A | 11B | 12A | 12B |
| Holcim II/V OPC (lb.) | 366.6 | 394.8 | 394.8 | 451.2 | 366.6 |
| Clinker Reduction (%) | 35% | 30% | 30% | 20% | 35% |
| Class F Fly Ash (lb.) | 84.6 | 84.6 | 0 | 0 | 0 |
| Huntington UFFA (lb.) | 0 | 0 | 0 | 112.8 | 141.0 |
| Calcined Shale Dust (lb.) | 84.6 | 0 | 84.6 | 0 | 0 |
| Mine Rock Dust (lb.) | 112.8 | 163.58 | 163.58 | 0 | 101.5 |
| Type S Lime | 22.56 | 11.28 | 11.28 | 0 | 8.46 |
| Plaster of Paris | 5.64 | 5.64 | 5.64 | 0 | 2.82 |
| Course Aggregate (lb.) | 1750 | 1650 | 1650 | 1750 | 1705 |
| Fine Aggregate (lb.) | 1249 | 1302 | 1302 | 1338 | 1300 |
| Water (lb.) | 248.2 | 248.2 | 248.2 | 266.6 | 242.5 |
| Defined w/cm | 0.40 | 0.43 | 0.43 | 0.47 | 0.39 |
| Actual w/cm | 0.44 | 0.50 | 0.50 | 0.47 | 0.47 |
| w/c | 0.68 | 0.63 | 0.63 | 0.59 | 0.66 |
| w/p | 0.37 | 0.38 | 0.38 | 0.47 | 0.39 |
| 3-day (psi/MPa) | 2720/18.8 | 2950/20.3 | 3250/22.4 | 3010/20.8 | 2860/19.7 |
| 7-day (psi/MPa) | 4350/30.0 | 3800/26.2 | 3960/27.3 | 4570/31.5 | 4490/31.0 |
| 28-day (psi/MPa) | 6160/42.5 | 4850/33.4 | 5530/38.1 | 6480/44.7 | 6620/45.6 |
| 3-month (psi/MPa) | 7170/49.4 | 6050/41.7 | 6620/45.6 | 7540/52.0 | 8310/57.3 |
| 6-month (psi/MPa) | 7760/53.5 | 6060/41.8 | 7020/48.4 | 8440/58.2 | 8920/61.5 |

TABLE 3

| Components/Compressive Strength | Example (Mix ID) | | | | |
|---|---|---|---|---|---|
| | 12C | 13A | 13B | 13C | 17C |
| Holcim II/V OPC (lb.) | 366.6 | 451.2 | 394.8 | 366.6 | 423 |
| Clinker Reduction (%) | 35% | 20% | 30% | 35% | 25% |
| Class F Fly Ash (lb.) | 0 | 0 | 0 | 0 | 112.8 |
| UFFA (lb.) | 0 | 0 | 84.6 | 141 | 0 |
| Calcined Shale Dust (lb.) | 141 | 112.8 | 84.6 | 50.8 | 0 |
| Mine Rock Dust (lb.) | 101.5 | 0 | 56.4 | 56.4 | 90.2 |
| Type S Lime | 8.46 | 0 | 0 | 5.64 | 5.64 |
| Plaster of Paris | 2.82 | 0 | 0 | 0 | 0 |
| Course Aggregate (lb.) | 1705 | 1750 | 1685 | 1687 | 1700 |
| Fine Aggregate (lb.) | 1304 | 1338 | 1300 | 1300 | 1260 |
| Water (lb.) | 242.5 | 266.6 | 248.2 | 248.2 | 256.3 |
| Defined w/cm | 0.43 | 0.47 | 0.42 | 0.42 | 0.44 |
| Actual w/cm | 0.47 | 0.47 | 0.44 | 0.44 | 0.47 |
| w/c | 0.66 | 0.59 | 0.63 | 0.68 | 0.61 |
| w/p | 0.39 | 0.47 | 0.40 | 0.40 | 0.41 |
| 3-day (psi/MPa) | 2960/20.4 | 4080/28.1 | 3930/27.1 | 3280/22.6 | 3690/25.4 |
| 7-day (psi/MPa) | 4420/30.5 | 4605/31.7 | 5670/39.1 | 5000/34.5 | 4450/30.7 |
| 28-day (psi/MPa) | 7390/50.9 | 6100/42.0 | 7550/52.1 | 7600/52.4 | 5380/39.1 |
| 3-month (psi/MPa) | 8580/59.1 | 7050/48.6 | 8290/57.2 | 8530/58.8 | 6660/45.9 |
| 6-month (psi/MPa) | 8980/61.9 | 7180/49.5 | 9170/63.2 | 9220/63.6 | 7010/48.3 |

Mix 13B contained Huntington UFFA, and Mix 13C contained Hunter UFFA. Mixes 12C, 13B, 13C and 17C all appear to have benefited significantly from including quarry fines as both a partial cement replacement and a partial ultrafine aggregate addition. In addition, Mixes 12C, 13C and 17C appear to have benefited significantly by including Type S lime.

Mix 13A is unique because it included no quarry fines, Type S lime, or plaster of Paris addition but exhibited higher strength than any of Comparative Examples 1-5 at all ages owing to the use of calcined shale dust having a d90=114 μm, d50=24 μm and d10=3.5 μm. This material is an industrial waste product that has not heretofore been used by any concrete company to make concrete or other cementitious composition.

TABLE 4

| Components/Compressive Strength | Example (Mix ID) | | | | |
|---|---|---|---|---|---|
| | 17D | 17E | 17F | 17G | 17H |
| Holcim II/V OPC (lb.) | 394.8 | 394.8 | 366.6 | 366.6 | 338.4 |
| Clinker Reduction (%) | 30% | 30% | 35% | 35% | 40% |
| Class F Fly Ash (lb.) | 112.8 | 112.8 | 141 | 112.8 | 141 |
| Mine Rock Dust (lb.) | 112.8 | 107.2 | 107.2 | 135.4 | 141 |
| Type S Lime | 0 | 5.64 | 5.64 | 5.64 | 5.64 |
| Course Aggregate (lb.) | 1720 | 1720 | 1750 | 1750 | 1750 |
| Fine Aggregate (lb.) | 1260 | 1260 | 1237 | 1241 | 1241 |
| Water (lb.) | 248.2 | 248.2 | 266.6 | 242.5 | 236.9 |
| Defined w/cm | 0.44 | 0.44 | 0.47 | 0.44 | 0.43 |
| Actual w/cm | 0.49 | 0.48 | 0.52 | 0.50 | 0.49 |
| w/c | 0.63 | 0.63 | 0.73 | 0.66 | 0.70 |
| w/p | 0.40 | 0.40 | 0.43 | 0.39 | 0.38 |
| 3-day (psi/MPa) | 4320/29.8 | 4520/31.2 | 2850/19.6 | 4130/28.5 | 3180/21.9 |
| 7-day (psi/MPa) | 5450/37.6 | 5900/40.1 | 3660/25.2 | 5330/36.7 | 4260/29.4 |
| 28-day (psi/MPa) | 6830/47.1 | 7280/50.2 | 5320/36.7 | 6960/48.0 | 5930/40.9 |
| 3-month (psi/MPa) | 8530/58.8 | 9300/64.1 | 6830/47.1 | 9080/62.6 | 8130/56.1 |
| 6-month (psi/MPa) | 8750/60.3 | 9610/66.3 | 7540/52.0 | 9480/65.4 | 9100/62.7 |

Mixes 17D, 17E, 17F, 17G and 17H all appear to have benefited significantly from including quarry fines as both a partial cement replacement and a partial ultrafine aggregate addition. Mixes 17E, 17F, 17G and 17H appear to have benefited by including Type S lime.

TABLE 5

| Components/Compressive Strength | Example (Mix ID) | | | | |
|---|---|---|---|---|---|
| | 17I | 17J | 15-30-10 | 15-20-20 | 15-30-30 |
| Holcim II/V OPC (lb.) | 366.6 | 338.4 | 394.8 | 394.8 | 282 |
| Clinker Reduction (%) | 35% | 40% | 30% | 30% | 50% |
| Class F Fly Ash (lb.) | 141 | 0 | 0 | 0 | 0 |
| Calcined Shale Dust (lb.) | 0 | 141 | 169.2 | 112.8 | 169.2 |
| Mine Rock Dust (lb.) | 107.2 | 141 | 56.4 | 112.5 | 169.2 |
| Type S Lime | 5.64 | 5.64 | 0 | 0 | 0 |
| Course Aggregate (lb.) | 1750 | 1750 | 1745 | 1745 | 1745 |
| Fine Aggregate (lb.) | 1237 | 1241 | 1274 | 1274 | 1282 |
| Water (lb.) | 242.5 | 236.9 | 265.1 | 265.1 | 253.8 |
| Defined w/cm | 0.43 | 0.43 | 0.45 | 0.47 | 0.47 |
| Actual w/cm | 0.47 | 0.49 | 0.47 | 0.52 | 0.56 |
| w/c | 0.66 | 0.70 | 0.67 | 0.67 | 0.90 |
| w/p | 0.39 | 0.38 | 0.43 | 0.43 | 0.41 |
| 3-day (psi/MPa) | 3360/23.2 | 3150/21.7 | 3390/23.4 | 3460/23.8 | 2130/14.7 |
| 7-day (psi/MPa) | 4360/30.1 | 4330/29.8 | 3900/26.7 | 3850/26.5 | 2700/18.6 |
| 28-day (psi/MPa) | 6190/42.7 | 6300/43.4 | 5190/35.8 | 5440/37.5 | 4000/27.6 |
| 3-month (psi/MPa) | 7430/51.2 | 7430/51.2 | 6080/41.9 | 5860/40.4 | 4240/29.2 |
| 6-month (psi/MPa) | 8400/57.9 | 7740/53.4 | 6240/43.0 | 6230/43.0 | 4290/29.6 |

Mixes 17I, 17J, 15-30-10, 15-20-20, and 15-30-30 all appear to have benefited significantly from including quarry fines as both a partial cement replacement and a partial ultrafine aggregate addition. Mixes 17I and 17J appear to have benefited by including Type S lime.

TABLE 6

| Components/Compressive Strength | Example (Mix ID) | | | | |
|---|---|---|---|---|---|
| | 14A | 14B | 14AF | 12CF | 12CG |
| Holcim II/V OPC (lb.) | 317.3 | 317.3 | 0 | 0 | 0 |
| Fine Clinker, d90 = 24 μm | 0 | 0 | 286.89 | 347.08 | 340.78 |
| Clinker Reduction (%) | 44% | 44% | 44% | 35% | 35% |
| Class F Fly Ash (lb.) | 105.8 | 211.6 | 105.75 | 0 | 0 |
| UFFA (lb.) | 105.8 | 0 | 105.75 | 141 | 141 |
| Coarse fly ash (CFA) (lb.) | 162.2 | 268 | 162.15 | 0 | 0 |
| Mine Rock Dust (lb.) | 105.8 | 0 | 105.8 | 104.34 | 104.34 |
| Type S Lime | 14.1 | 14.1 | 14.1 | 8.46 | 8.46 |
| Plaster of Paris | 0 | 0 | 30.36 | 19.15 | 25.82 |
| Course Aggregate (lb.) | 800 | 800 | 0 | 0 | 0 |
| Pea Gravel (lb.) | 800 | 800 | 1660 | 1750 | 1750 |
| Fine Aggregate (lb.) | 1263 | 1263 | 1210 | 1259 | 1257 |
| Water (lb.) | 211.5 | 211.5 | 211.5 | 242.52 | 242.52 |
| Defined w/cm | 0.28 | 0.26 | 0.24 | 0.43 | 0.43 |
| Actual w/cm | 0.30 | 0.26 | 0.26 | 0.47 | 0.47 |
| w/c | 0.67 | 0.67 | 0.67 | 0.66 | 0.66 |
| w/p | 0.26 | 0.26 | 0.23 | 0.39 | 0.39 |
| 3-day (psi/MPa) | 4030/27.8 | 2950/20.3 | 3850/26.5 | 5209/35.9 | 5410/37.3 |
| 7-day (psi/MPa) | 5690/39.2 | 3790/26.1 | 5280/36.4 | 6850/47.2 | 6420/44.3 |
| 28-day (psi/MPa) | 9210/63.5 | 6170/42.5 | 8820/60.8 | 9980/68.8 | 9730/67.1 |
| 3-month (psi/MPa) | 10280/70.9 | 7110/49.0 | 11330/78.1 | 12460/85.9 | 12100/83.4 |
| 6-month (psi/MPa) | 11510/79.4 | 8320/57.4 | 12820/88.4 | 13640/94.0 | 13910/95.9 |

Mixes 14A, 14AF, 12CF, and 12CG all appear to have benefited significantly from including quarry fines as both a partial cement replacement and a partial ultrafine aggregate addition. Mixes 14A, 14B, 14AF, 12CF, and 12CG appear to have benefited by including Type S lime. Mixes 14AF, 12CF, and 12CG appear to have benefited by including Fine clinker instead of OPC and UFFA instead of FA.

TABLE 7

| Components/Compressive Strength | Example (Mix ID) | | | | |
|---|---|---|---|---|---|
| | 18A | 18B | 18C | 5A | 5B |
| Holcim II/V OPC (lb.) | 282 | 250.98 | 250.98 | 400 | 376 |
| Clinker Reduction (%) | 50% | 55.5% | 55.5% | 29% | 33.3% |

TABLE 7-continued

| Components/Compressive Strength | Example (Mix ID) | | | | |
|---|---|---|---|---|---|
| | 18A | 18B | 18C | 5A | 5B |
| GGBFS | 0 | 250.98 | 250.98 | 0 | 0 |
| Class F Fly Ash (lb.) | 197.4 | 0 | 0 | 0 | 361 |
| Mine Rock Dust (lb.) | 152.28 | 112.8 | 109.98 | 400 | 112.8 |
| Type S Lime | 11.28 | 5.64 | 5.64 | 0 | 7.52 |
| Plaster of Paris | 5.64 | 0 | 2.82 | 4.0 | 7.52 |
| Pea Gravel (lb.) | 1750 | 1750 | 1750 | 1500 | 1500 |
| Fine Aggregate (lb.) | 1273 | 1348 | 1348 | 1190 | 1192 |
| Water (lb.) | 242.5 | 242.5 | 242.5 | 300 | 285.8 |
| Defined w/cm | 0.43 | 0.43 | 0.43 | 0.50 | 0.35 |
| Actual w/cm | 0.49 | 0.48 | 0.48 | 0.75 | 0.38 |
| w/c | 0.86 | 0.97 | 0.97 | 0.75 | 0.76 |
| w/p | 0.37 | 0.39 | 0.39 | 0.38 | 0.33 |
| 3-day (psi/MPa) | 1530/10.5 | 2170/15.0 | 4980/34.3 | 2980/20.5 | 4130/28.5 |
| 7-day (psi/MPa) | 2700/18.6 | 5140/35.4 | 7080/48.8 | 3360/23.2 | 4860/33.5 |
| 28-day (psi/MPa) | 4250/29.3 | 7510/51.8 | 8580/59.2 | 4000/27.6 | 7490/51.6 |
| 3-month (psi/MPa) | 6380/44.0 | 7960/54.9 | 9570/66.0 | 4910/33.9 | 10000/68.9 |
| 6-month (psi/MPa) | 7060/48.7 | 8050/55.5 | 9740/67.2 | 5250/36.2 | 11360/78.3 |

Mixes 18A, 18B, 18C, 5A and 5B all appear to have benefited significantly from including quarry fines as both a partial cement replacement and a partial ultrafine aggregate addition. Mixes 18A, 18B, 18C and 5B appear to have benefited by including Type S lime, and Mixes 18A, 18C and 5B appear to have benefited by including plaster of Paris. In fact, the only difference between Mixes 18B and 18C was the inclusion of a small amount of plaster of Paris, with a corresponding reduction in quarry fines—the effect on strength was dramatic and consistent at all ages, which indicates that the use of GGBFS in this mix caused a sulfate deficit and the plaster of Paris apparently corrected it.

TABLE 8

| Components/Compressive Strength | Example (Mix ID) | | |
|---|---|---|---|
| | 19A | 19B | 19C |
| Holcim II/V OPC (lb.) | 250.98 | 250.98 | 480 |
| Clinker Reduction (%) | 55.5% | 55.5% | 15% |
| UFFA (lb.) | 250.98 | 250.98 | 200 |
| Mine Rock Dust (lb.) | 107.16 | 104.34 | 200 |
| Type S Lime | 11.28 | 11.28 | 8 |
| Plaster of Paris | 0 | 2.82 | 8 |
| Pea Gravel (lb.) | 1750 | 1750 | 1500 |
| Fine Aggregate (lb.) | 1322 | 1321 | 1145 |
| Water (lb.) | 242.5 | 242.5 | 316.8 |
| Defined w/cm | 0.43 | 0.43 | 0.40 |
| Actual w/cm | 0.47 | 0.47 | 0.46 |
| w/c | 0.97 | 0.97 | 0.79 |
| w/p | 0.39 | 0.39 | 0.35 |
| 3-day (psi/MPa) | 1420/9.8 | 1550/10.7 | 3890/26.8 |
| 7-day (psi/MPa) | 2940/20.3 | 3170/21.9 | 5020/34.6 |
| 28-day (psi/MPa) | 6650/45.9 | 6770/46.7 | 8680/59.8 |
| 3-month (psi/MPa) | 9740/67.2 | 9760/67.3 | 11020/76.0 |
| 6-month (psi/MPa) | 11200/77.2 | 10280/70.9 | 11530/79.5 |

Mixes 19A, 19B, and 19C all appear to have benefited significantly from including quarry fines as both a partial cement replacement and a partial ultrafine aggregate addition and by including Type S lime. The use of plaster of Paris in Mix 19B does not seem to have made much difference, if any, and may have improved Mix 19C.

Concrete Mixes: Design Strength=5000 psi (34.5 MPa) @ 28 Days

The following examples were designed and manufactured according to the present invention and are based on a commercial mix having a design strength of 5000 psi (34.5 MPa) at 28 days and total cementitious binder of 610 lbs/yd³. The compositions, strengths, and estimated cost savings are set forth below in Table 9. All mixes exceeded the design strength and had reduced cost compared to the commercial mix.

TABLE 9

| Components/Compressive Strength | Example (Mix ID) | | | | |
|---|---|---|---|---|---|
| | 1A | 1B | 1C | 1D | 1E |
| Lehigh II/V OPC (lb.) | 197.4 | 225.5 | 213.5 | 213.5 | 198.25 |
| Clinker Reduction (%) | 35% | 26% | 30% | 30% | 35% |
| Lehigh GGBFS | 197.4 | 225.5 | 213.5 | 183 | 198.25 |
| Class F Fly Ash (lb.) | 84.6 | 0 | 91.5 | 91.5 | 91.5 |
| Limestone Powder (lb.) | 132.54 | 145.75 | 152.5 | 183 | 177.5 |
| Type S Lime | 5.64 | 5.5 | 0 | 0 | 3.05 |
| Plaster of Paris | 2.86 | 2.75 | 0 | 0 | 2.44 |
| Coarse Aggregate (lb.) | 1750 | 1800 | 1700 | 1700 | 1750 |
| Fine Aggregate (lb.) | 1440 | 1484 | 1386 | 1385 | 1320 |
| Water (lb.) | 253.8 | 247.5 | 274.5 | 274.5 | 274.5 |
| Defined w/cm | 0.45 | 0.45 | 0.45 | 0.45 | 0.45 |
| Actual w/cm | 0.52 | 0.54 | 0.53 | 0.56 | 0.56 |
| w/c | 1.29 | 1.10 | 1.29 | 1.29 | 1.38 |

TABLE 9-continued

| Components/Compressive | Example (Mix ID) | | | | |
|---|---|---|---|---|---|
| Strength | 1A | 1B | 1C | 1D | 1E |
| w/p | 0.41 | 0.41 | 0.41 | 0.41 | 0.41 |
| Cost reduction pcy | $2.96 | $1.91 | $2.38 | $3.17 | $2.99 |
| 3-day (psi/MPa) | 2210/15.2 | 1940/13.4 | 1970/13.6 | 1970/13.6 | 1820/12.5 |
| 7-day (psi/MPa) | 3670/25.3 | 3550/24.5 | 3770/26.0 | 3600/24.8 | 3430/23.6 |
| 28-day (psi/MPa) | 5720/39.4 | 5540/38.2 | 6380/44.0 | 6560/45.2 | 5680/39.2 |
| 3-month (psi/MPa) | 6170/42.5 | 6560/45.2 | 7460/51.4 | 7240/49.9 | 6480/44.7 |
| 6-month (psi/MPa) | N/A | N/A | N/A | N/A | N/A | pcy = per cubic yard

The use of limestone powder (Blue Mountain Minerals Feed Flour) according to the invention permitted substantial clinker reduction, cost reduction, and comparable strength compared to commercial mix. Type S lime and plaster of Paris appear to have a negative effect in these mixes, suggesting that at higher w/c they are not necessarily beneficial.

The foregoing compositions have the following characteristics and prophetic or hypothetical modification range:

| Aspect | Range | Modification Range |
|---|---|---|
| OPC: | 197.4-225.5 lb/yd³ | 185-245 lb/yd³ |
| GGBFS: | 183-225.5 lb/yd³ | 120-235 lb/yd³ |
| Fly Ash: | 0-91.5 (84.6-91.5) lb/yd³ | 0-120 (70-105) lb/yd³ |
| Limestone powder: | 132.5-183 lb/yd³ | 110-200 lb/yd³ |
| Defined w/cm: | 0.45 | 0.44-0.46 |
| Actual w/cm: | 0.52-0.56 | 0.50-0.58 |
| w/c: | 1.10-1.38 | 1.0-1.50 |
| w/p: | 0.41 | 0.38-0.44 |

Concrete Mixes: Design Strength=8000 psi (55.2 MPa) @ 28 Days

The following examples were designed and manufactured according to the present invention and are based on a commercial mix having a design strength of 8000 psi (55.2 MPa) at 28 days and total cementitious binder of 845 lbs/yd³. The compositions, strengths, and estimated cost savings are set forth below in Tables 10 and 11. All mixes exceeded the design strength and had reduced cost compared to the commercial mix.

TABLE 10

| Components/Compressive | Example (Mix ID) | | | | |
|---|---|---|---|---|---|
| Strength | 2A | 2C | 2D | 2E | 2F |
| Lehigh II/V OPC (lb.) | 295.75 | 297.5 | 297.5 | 297.5 | 297.5 |
| Clinker Reduction (%) | 30% | 30% | 30% | 30% | 30% |
| Lehigh GGBFS | 295.75 | 297.5 | 297.5 | 297.5 | 297.5 |
| Class F Fly Ash (lb.) | 126.75 | 0 | 0 | 0 | 0 |
| Limestone Powder (lb.) | 211.25 | 210 | 203 | 203 | 199.5 |
| Type S Lime | 0 | 0 | 7 | 0 | 7 |
| Plaster of Paris | 0 | 0 | 0 | 7 | 3.5 |
| Coarse Aggregate (lb.) | 1600 | 1700 | 1700 | 1700 | 1700 |
| Fine Aggregate (lb.) | 1225 | 1392 | 1391 | 1392 | 1390 |
| Water (lb.) | 283.2 | 252 | 252 | 252 | 252 |
| Defined w/cm | 0.34 | 0.36 | 0.36 | 0.36 | 0.36 |
| Actual w/cm | 0.39 | 0.42 | 0.42 | 0.42 | 0.42 |
| w/c | 0.96 | 0.85 | 0.85 | 0.85 | 0.85 |
| w/p | 0.30 | 0.31 | 0.31 | 0.31 | 0.31 |
| Cost reduction pcy | $ 2.41 | $ 7.79 | $ 7.46 | $ 7.45 | $ 6.53 |
| 3-day (psi/MPa) | 5370/37.0 | 4750/32.7 | 4540/31.3 | 5960/41.1 | 6870/47.4 |
| 7-day (psi/MPa) | 7780/53.6 | 6900/47.6 | 6320/43.6 | 8680/59.8 | 9080/62.6 |
| 28-day (psi/MPa) | 9330/64.3 | 9110/62.8 | 7970/55.0 | 10360/71.4 | 10900/75.5 |
| 3-month (psi/MPa) | 10210/70.4 | 9400/64.8 | N/A | 11390/78.5 | 11610/80.0 |
| 6-month (psi/MPa) | N/A | N/A | N/A | N/A | N/A | pcy = per cubic yard

Mixes 2C-2F are virtually identical except for varying quantities of Type S lime and plaster of Paris. The best results were obtained when plaster of Paris was used Type S lime provided no benefit by itself and a small benefit when used in combination with plaster of Paris. It appears that more Type S lime than could be consumed was added given the low w/cm of the mixes and low solubility of lime.

TABLE 11

| Components/Compressive Strength | Example (Mix ID) | | | | |
|---|---|---|---|---|---|
| | 2F-1 | 2F-2 | 2G | 2H | 2H-1 |
| Lehigh II/V OPC (lb.) | 297.5 | 297.5 | 270 | 294.5 | 294.5 |
| Clinker Reduction (%) | 30% | 30% | 36% | 30% | 30% |
| Lehigh GGBFS | 297.5 | 297.5 | 270 | 259 | 259 |
| Class F Fly Ash (lb.) | 0 | 0 | 100.5 | 70 | 0 |
| Huntington UFFA | 0 | 0 | 0 | 0 | 70 |
| Limestone Powder (lb.) | 199.5 | 199.5 | 175.5 | 171.5 | 171.5 |
| Type S Lime | 7 | 7 | 6 | 7 | 7 |
| Plaster of Paris | 3.5 | 3.5 | 3 | 3.5 | 3.5 |
| Coarse Aggregate (lb.) | 1700 | 1700 | 1650 | 1650 | 1650 |
| Fine Aggregate (lb.) | 1366 | 1390 | 1330 | 1409 | 1429 |
| Water (lb.) | 252 | 252 | 270 | 252 | 252 |
| Defined w/cm | 0.36 | 0.36 | 0.36 | 0.36 | 0.36 |
| Actual w/cm | 0.42 | 0.42 | 0.42 | 0.40 | 0.40 |
| w/c | 0.85 | 0.85 | 1.00 | 0.83 | 0.83 |
| w/p | 0.31 | 0.31 | 0.33 | 0.31 | 0.31 |
| Cost reduction pcy | $ 6.11 | $ 7.46 | $ 7.65 | $ 9.56 | $ 7.67 |
| 3-day (psi/MPa) | 2900/20.0 | 4335/29.9 | 4570/31.5 | 3385/23.3 | 3845/26.5 |
| 7-day (psi/MPa) | 5580/38.5 | 7680/53.0 | 6460/44.5 | 6150/42.4 | 6835/47.1 |
| 28-day (psi/MPa) | 8180/56.4 | 9820/67.7 | 9080/62.6 | 10600/73.1 | 10380/71.6 |
| 3-month (psi/MPa) | N/A | N/A | 9870/68.1 | N/A | N/A |
| 6-month (psi/MPa) | N/A | N/A | N/A | N/A | N/A | pcy = per cubic yard

Mixes 2C-2F are virtually identical except for varying quantities of Type S lime and plaster of Paris. The best results were obtained when plaster of Paris was used. Type S lime provided no benefit by itself and more early than later benefit when used in combination with plaster of Paris. Given the low w/cm of the mixes and low solubility of lime, perhaps more Type S lime than could be consumed was added and some ended up unreacted.

Mix 2F was tested for shrinkage, which indicated less than 0.070% shrinkage at 28 days, and lower shrinkage at each of 7, 14, 21, and 28 days than a control mix based on the corresponding commercial mix.

The foregoing compositions have the following characteristics and prophetic or hypothetical modification range:

| Aspect | Range | Modification Range |
|---|---|---|
| OPC: | 270-297.5 lb/yd³ | 250-335 lb/yd³ |
| GGBFS: | 259-297.5 lb/yd³ | 230-315 lb/yd³ |
| Fly Ash: | 0-126.75 (70-126.75) lb/yd³ | 0-140 (50-140) lb/yd³ |
| Limestone powder: | 171.5-211.25 lb/yd³ | 150-225 lb/yd³ |
| Lime: | 0-7 (6-7) lb/yd³ | 0-10 (3-9) lb/yd³ |
| CaSO₄ (hemi): | 0-7 (3-7) lb/yd³ | 0-10 (2-5) lb/yd³ |
| Defined w/cm: | 0.34-0.36 | 0.33-0.37 |
| Actual w/cm: | 0.39-0.42 | 0.37-0.44 |
| w/c: | 0.83-1.00 | 0.70-1.20 |
| w/p: | 0.30-0.33 | 0.29-0.35 |

Concrete Mixes: Design Strength=4000 psi (27.6 MPa) @ 3 Days

The following examples were designed and manufactured according to the present invention and are based on a commercial mix having a design strength of 4000 psi (27.6 MPa) at 3 days and total cement binder of 687 lbs/yd³. The compositions, strengths, and estimated cost savings are set forth below in Table 12. All mixes equaled or exceeded the design strength and all had reduced cost compared to the commercial mix.

TABLE 12

| Components/Compressive Strength | Example (Mix ID) | | | | |
|---|---|---|---|---|---|
| | 18C-1 | 3A | 3B | 3B-1 | 3C |
| Lehigh II/N OPC (lb.) | 250.98 | 343.5 | 267 | 267 | 287.1 |
| Clinker Reduction (%) | 63% | 50% | 61% | 61% | 35% |
| Lehigh GGBFS | 250.98 | 206.1 | 267 | 267 | 287.1 |
| Limestone Powder (lb.) | 109.98 | 206.1 | 117 | 117 | 141.9 |
| Type S Lime | 5.64 | 0 | 6 | 6 | 6.6 |
| Plaster of Paris | 2.82 | 0 | 3 | 3 | 3.3 |
| Coarse Aggregate (lb.) | 1800 | 1700 | 1800 | 1800 | 1750 |
| Fine Aggregate (lb.) | 1468 | 1369 | 1452 | 1440 | 1376 |
| Water (lb.) | 242.5 | 274.9 | 240 | 240 | 264 |
| Defined w/cm | 0.43 | 0.40 | 0.40 | 0.40 | 0.40 |
| Actual w/cm | 0.48 | 0.50 | 0.44 | 0.44 | 0.45 |
| w/c | 0.97 | 0.80 | 0.90 | 0.90 | 0.92 |
| w/p | 0.39 | 0.36 | 0.36 | 0.36 | 0.41 |
| Cost reduction pcy | $ 5.87 | $ 4.64 | $ 6.12 | $ 8.54 | $ 4.17 |
| 3-day (psi/MPa) | 5170/35.6 | 4010/27.6 | 4750/13.6 | 4160/28.7 | 4620/31.8 |
| 7-day (psi/MPa) | 7010/48.3 | 6010/41.4 | 6930/47.8 | 5890/40.6 | 6820/47.0 |
| 28-day (psi/MPa) | 8790/60.6 | 8280/57.1 | 9060/62.5 | 8420/58.0 | 9290/64.0 |
| 3-month (psi/MPa) | 9910/68.3 | 8950/61.7 | 10200/70.3 | N/A | 10110/69.7 |
| 6-month (psi/MPa) | N/A | N/A | N/A | N/A | N/A | pcy = per cubic yard

The use of limestone powder according to the invention permitted substantial clinker reduction, cost reduction, and comparable strength compared to commercial mix. Type S lime and plaster of Paris appear to provide a positive effect in these mixes, perhaps because they were appropriate for the w/c.

Mixes 18C-1, 3B, and 3C were tested for shrinkage, which indicated less than 0.040% shrinkage at 28 days for each mix, and lower shrinkage for each mix at each of 7, 14, 21, and 28 days than a control mix based on the corresponding commercial mix.

The foregoing compositions have the following characteristics and prophetic or hypothetical modification range:

| Aspect | Range | Modification Range |
|---|---|---|
| OPC: | 250.98-343.5 lb/yd$^3$ | 240-500 lb/yd$^3$ |
| GGBFS: | 259-297.5 lb/yd$^3$ | 230-315 lb/yd$^3$ |
| Limestone powder: | 109.98-206.1 lb/yd$^3$ | 100-220 lb/yd$^3$ |

-continued

| Aspect | Range | Modification Range |
|---|---|---|
| Lime: | 0-6.6 (5.64-6.6) lb/yd$^3$ | 0-10 (4-8) lb/yd$^3$ |
| CaSO$_4$ (hemi): | 0-3.3 (2.82-3.3) lb/yd$^3$ | 0-6 (1.5-5) lb/yd$^3$ |
| Defined w/cm: | 0.40-0.43 | 0.38-0.44 |
| Actual w/cm: | 0.44-0.50 | 0.42-0.52 |
| w/c: | 0.80-0.97 | 0.65-1.05 |
| w/p: | 0.36-0.41 | 0.34-0.42 |

Concrete Mixes: Design Strength=4000 psi (27.6 MPa) @ 28 Days

The following examples were designed and manufactured according to the present invention and are based on a commercial mix having a design strength of 4000 psi (27.6 MPa) at 28 days and total cement binder of 551 lbs/yd$^3$. The compositions, strengths, and estimated cost savings are set forth below in Table 13. All mixes equaled or exceeded the design strength and all had reduced cost compared to the commercial mix.

TABLE 13

| Components/Compressive Strength | Example (Mix ID) | | | | |
|---|---|---|---|---|---|
| | 4A | 4B | 4C | 4D | 4F |
| Lehigh II/V OPC (lb.) | 198.4 | 192.9 | 275.5 | 250 | 208 |
| Clinker Reduction (%) | 34% | 36% | 9% | 17% | 31% |
| Lehigh GGBFS | 198.4 | 176.3 | 176.3 | 175 | 156 |
| Class F Fly Ash (lb.) | 74.1 | 74.1 | 55.1 | 0 | 78 |
| Limestone Powder (lb.) | 132.2 | 159.8 | 137.75 | 125 | 130 |
| Coarse Aggregate (lb.) | 1675 | 1675 | 1700 | 1750 | 1680 |
| Fine Aggregate (lb.) | 1428 | 1426 | 1418 | 1511 | 1518 |
| Water (lb.) | 273 | 273 | 273 | 248 | 250 |
| Defined w/cm | 0.50 | 0.50 | 0.50 | 0.50 | 0.50 |
| Actual w/cm | 0.58 | 0.62 | 0.54 | 0.58 | 0.57 |
| w/c | 1.38 | 1.42 | 0.99 | 0.99 | 1.20 |
| w/p | 0.45 | 0.45 | 0.45 | 0.45 | 0.44 |
| Cost reduction pcy | $ 1.41 | $ 2.15 | $ 0.76 | $ 1.03 | $ 1.01 |
| 3-day (psi/MPa) | 2010/13.8 | 1760/12.1 | 1860/12.8 | 1920/13.2 | 1770/12.2 |
| 7-day (psi/MPa) | 3310/22.8 | 3120/21.5 | 3280/22.6 | 3270/22.5 | 3200/22.1 |
| 28-day (psi/MPa) | 6480/44.7 | 5230/36.0 | 5890/40.6 | 5890/40.6 | 5430/37.4 |
| 3-month (psi/MPa) | N/A | N/A | N/A | N/A | N/A |
| 6-month (psi/MPa) | N/A | N/A | N/A | N/A | N/A | pcy = per cubic yard

The use of limestone powder according to the invention permitted substantial clinker reduction, cost reduction, and comparable strength compared to commercial mix. Type S lime and plaster of Paris were not used.

The foregoing compositions have the following characteristics and prophetic or hypothetical modification range:

| Aspect | Range | Modification Range |
|---|---|---|
| OPC: | 198.275.5 lb/yd$^3$ | 250-335 lb/yd$^3$ |
| GGBFS: | 156-198.3 lb/yd$^3$ | 230-315 lb/yd$^3$ |
| Fly Ash: | 0-78 (55.1-78) lb/yd$^3$ | 0-140 (50-140) lb/yd$^3$ |
| Limestone powder: | 125-159.8 lb/yd$^3$ | 150-225 lb/yd$^3$ |
| Defined w/cm: | 0.50 | 0.48-0.52 |
| Actual w/cm: | 0.54-0.62 | 0.52-0.63 |
| w/c: | 0.99-1.42 | 0.90-1.50 |
| w/p: | 0.45 | 0.43-47 |

Working Examples—Mortar

Mortar mixes were made according to ASTM C109, but modified by the inventor to include less water and more cement, using a Hobart mixer. Fresh mortar was cast into 2×2 inch cubes and tested by CMT Engineering in West Valley City, Utah. Portland cement was a Type I/II OPC manufactured by Holcim, Devil's Slide, Utah plant, and purchased at Home Depot, Salt Lake City. Ultrafine fly ash (UFFA) was made by classifying a fly ash from Huntington, Hunter, Jim Bridger, and Gaston power plants. The Bridger fly ash was moist, became agglomerated and did not form UFFA but either there was no separation or there was only poor separation. It will be designated as fine fly ash (FFA). The silica fume was condensed silica fume provided by Calmetrix. The calcined shale dust was obtained from Utelite, Coalville, Utah. Class F fly ash was a standard fly ash obtained from Gaston, Ala., power plant. Limestone powder was Marble White 80 from Specialty Minerals. The quarry fines containing at least about 90% limestone in the form of calcite was coal mine rock dust purchased from Staker Parson and produced in Genola, Utah at Keigley limestone quarry. The sand was graded Unimin silica sand purchased at Home Depot. The components, their quantities, and compressive strengths of the mortar mixes are set forth in Tables 14-22. Lignosulfonate (Plastocrete 161) and/or polycarboxylate ether (Viscocrete 2100) were used in some cases to maintain flow between 100-120 on a flow table.

Mix 111 is a 100% OPC control mix. Mix 111A is an 85-15% OPC-fly ash control mix. Mix 111B is an 85-15% OPC-silica fume control mix. They are surrogates for how concrete and mortar are commonly manufactured. Mix 111 illustrates a high strength mortar that includes an elevated quantity of OPC and has a moderately low water to cement ratio (w/c=0.35). Mix 111A illustrates the negative effect on early strength of replacing 15% of the OPC with ordinary fly ash. Mix 111B illustrates the positive effect on strength of replacing 15% of the OPC with silica fume. The effect on strength of using different SCMs and optionally limestone, quarry fines and/or Type S lime, are illustrated by the other mortar mixes below.

TABLE 14

| Components/Compressive Strength | Example (Mix ID) | | | | | |
|---|---|---|---|---|---|---|
| | 111 | 111A | 111B | 111D | 111E | 111F |
| Type I/II OPC (g) | 920 | 782 | 782 | 782 | 782 | 782 |
| Gaston Fly Ash (g) | 0 | 138 | 0 | 0 | 0 | 0 |
| Silica Fume (g) | 0 | 0 | 138 | 0 | 0 | 0 |
| Hunter UFFA (g) | 0 | 0 | 0 | 138 | 0 | 0 |
| Bridger Fly Ash (g) | 0 | 0 | 0 | 0 | 138 | 0 |
| Huntington UFFA (g) | 0 | 0 | 0 | 0 | 0 | 138 |
| Silica Sand (g) | 1925 | 1883 | 1883 | 1883 | 1880 | 1880 |
| Water (g) | 322 | 322 | 322 | 322 | 322 | 322 |
| w/c | 0.35 | 0.41 | 0.41 | 0.41 | 0.41 | 0.41 |
| w/cm | 0.35 | 0.35 | 0.35 | 0.35 | 0.35 | 0.35 |
| 3-day (psi/MPa) | 8358/57.6 | 7135/49.2 | 7560/52.1 | 6630/45.7 | 6327/43.6 | 8045/55.5 |
| 7-day (psi/MPa) | 8770/60.5 | 8300/57.2 | 9687/66.8 | 8167/56.3 | 7690/53.0 | 8827/60.9 |
| 28-day (psi/MPa) | 11425/77.8 | 8895/61.3 | 12337/85.1 | 9192/63.4 | 8677/59.8 | 12920/89.1 |

Mixes 111A and 111E indicate that using unprocessed Gaston fly ash and poorly classified Bridger fly ash yielded mortar having substantially reduced strength compared to Mix 111. Mixes 111D and 111F indicate that Hunter and Huntington UFFA were substantially superior to Gaston and Bridger fly ashes. Huntington UFFA was comparable to silica fume in terms of strength development but required significantly less superplasticizer to yield mortar with proper flow.

TABLE 15

| Components/Compressive Strength | Example (Mix ID) | | | | | |
|---|---|---|---|---|---|---|
| | 111G | 111H | 111I | 111J | 111K | 111L |
| Type I/II OPC (g) | 782 | 782 | 782 | 782 | 782 | 782 |
| Bridger FFA (g) | 138 | 138 | 138 | 138 | 0 | 0 |
| Gaston UFFA (g) | 0 | 0 | 0 | 0 | 138 | 0 |
| Gaston FFA (g) | 0 | 0 | 0 | 0 | 0 | 138 |
| Marble White 80 (g) | 0 | 0 | 138 | 138 | 138 | 138 |

TABLE 15-continued

| Components/Compressive Strength | Example (Mix ID) | | | | | |
|---|---|---|---|---|---|---|
| | 111G | 111H | 111I | 111J | 111K | 111L |
| Quicklime (g) | 13.92 | 0 | 0 | 0 | 0 | 0 |
| Type S Lime (g) | 0 | 18.4 | 0 | 0 | 0 | 0 |
| Silica Sand (g) | 1851 | 1851 | 1622 | 1747 | 1747 | 1747 |
| Water (g) | 332.92 | 328.44 | 322 | 322 | 322 | 322 |
| w/cm | 0.35 | 0.35 | 0.35 | 0.35 | 0.35 | 0.35 |
| 3-day (psi/MPa) | 7202/49.6 | 7785/53.4 | 8067/55.6 | 8442/58.2 | 7712/53.2 | 6760/46.6 |
| 7-day (psi/MPa) | 8595/59.3 | 8165/56.3 | 9000/62.0 | 10075/69.5 | 9362/64.5 | 8375/57.7 |
| 28-day (psi/MPa) | 11035/76.1 | 10755/71.1 | 11387/78.5 | 10960/75.6 | 11477/79.1 | 10542/72.7 |

Mixes 111G and 111H indicate that using lime as an additive to Bridger fly ash substantially improved strength at all ages. Mixes 111I-111L indicate that using coarse limestone powder improved the strength of mortars containing Bridger fly ash, Gaston UFFA or Gaston FFA.

TABLE 16

| Components/Compressive Strength | Example (Mix ID) | | | | | |
|---|---|---|---|---|---|---|
| | 111M | 111N | 111O | 111P | 111Q | 111R |
| Type I/II OPC (g) | 782 | 782 | 782 | 782 | 782 | 782 |
| Bridger FFA (g) | 138 | 0 | 0 | 0 | 0 | 0 |
| Huntington UFFA (g) | 0 | 138 | 138 | 138 | 0 | 0 |
| Calcined Shale Dust (g) | 0 | 0 | 0 | 0 | 138 | 138 |
| Marble White 80 (g) | 138 | 0 | 138 | 138 | 0 | 0 |
| Type S Lime (g) | 9.2 | 18.4 | 0 | 18.4 | 18.4 | 0 |
| Silica Sand (g) | 1722 | 1851 | 1747 | 1722 | 1851 | 1883 |
| Water (g) | 325.22 | 322 | 322 | 322 | 322 | 322 |
| w/cm | 0.35 | 0.35 | 0.35 | 0.35 | 0.35 | 0.35 |
| 3-day (psi/MPa) | 7935/54.7 | 8225/56.7 | 8212/56.6 | 7445/51.3 | 7145/49.3 | 4507/31.1 |
| 7-day (psi/MPa) | 10225/70.5 | 9570/66.0 | 8890/61.3 | 9080/62.6 | 8205/56.6 | 8235/56.8 |
| 28-day (psi/MPa) | 11750/81.0 | 10050/69.3 | 11295/77.9 | 11297/77.9 | 10247/70.6 | 10000/68.9 |

Mixes 111M-111P show the effect on strength of using coarse limestone powder and/or lime on strength when using different types of fly ash. Mixes 111Q and 111R illustrate the effect of using or not using lime when the SCM is calcined shale dust. When lime is used, the mortar containing calcined shale dust exhibited much higher 3-day strength, similar 7-day strength, and slightly higher 28-day strength.

Mixes 111S-111U demonstrate the effect of substituting twice as much OPC (i.e., 30%) with Bridger fly ash and calcined shale dust, optionally with limestone powder. Mixes 111V-111X demonstrate the beneficial effect on strength of using quarry fines instead of coarse limestone powder. Mixes 111W and 111X compare the effect of excluding or including lime when using quarry dust and calcined shale.

TABLE 17

| Components/Compressive Strength | Example (Mix ID) | | | | | |
|---|---|---|---|---|---|---|
| | 111S | 111T | 111U | 111V | 111W | 111X |
| Type I/II OPC (g) | 644 | 644 | 644 | 782 | 782 | 782 |
| Bridger FFA (g) | 138 | 138 | 138 | 138 | 0 | 138 |
| Huntington UFFA (g) | 0 | 0 | 0 | 0 | 0 | 0 |
| Calcined Shale Dust (g) | 138 | 138 | 138 | 0 | 138 | 0 |
| Marble White 80 (g) | 0 | 138 | 138 | 0 | 0 | 0 |
| Quarry Fines (g) | 0 | 0 | 0 | 138 | 138 | 138 |
| Type S Lime (g) | 0 | 0 | 18.4 | 0 | 0 | 9.2 |
| Silica Sand (g) | 1841 | 1698 | 1678 | 1764 | 1764 | 1732 |
| Water (g) | 322 | 322 | 322 | 322 | 322 | 325.22 |
| w/cm | 0.35 | 0.35 | 0.35 | 0.35 | 0.35 | 0.35 |
| 3-day (psi/MPa) | 6020/41.5 | 6175/42.6 | 6670/46.0 | 8647/59.6 | 6877/47.4 | 8882/61.2 |
| 7-day (psi/MPa) | 7390/50.9 | 6922/47.7 | 7575/52.2 | 9695/66.8 | 8735/60.2 | 9535/65.7 |
| 28-day (psi/MPa) | 9120/62.9 | 8985/61.9 | 9985/68.8 | 11492/79.2 | 10455/72.1 | 10925/75.3 |

TABLE 18

| Components/Compressive Strength | Example (Mix ID) | |
| --- | --- | --- |
| | 111Y | 111Z |
| Type I/II OPC (g) | 782 | 782 |
| Huntington UFFA (g) | 138 | 0 |
| UF Steel Slag (g) | 0 | 138 |
| Quarry Fines (g) | 138 | 138 |
| Type S Lime (g) | 9.2 | 9.2 |
| Silica Sand (g) | 1732 | 1776 |
| Water (g) | 325.22 | 325.22 |
| w/cm | 0.35 | 0.35 |
| 3-day (psi/MPa) | 8605/59.3 | 8475/58.4 |
| 7-day (psi/MPa) | 9755/67.2 | 9742/67.2 |
| 28-day (psi/MPa) | 11990/82.7 | 11415/78.7 |

Mixes 111Y and 111Z show the effect of using quarry fines and lime to assist the strength development of mortar made using either UFFA or ultrafine steel slag, which is an industrial waste product having few uses and that is not used effectively in mortar and concrete by the industry. Mix 111Z shows that even very inexpensive steel slag, when blended with quarry fines and lime, can produce mortar comparable in strength to mortars made using UFFA and silica fume.

Working Examples—Cast Stone

Cast stone mixes were made based on a commercial mix design that used Portland White Cement, three differently sized limestone aggregates (Specialty Minerals #9 coarse limestone sand, Vical 1600 medium limestone sand, and Marble White 80 fine limestone aggregate/coarse limestone powder), latex adhesive to bond to polystyrene foam, polyvinyl acetate (PVA) fibers to increase toughness, superplasticizer to maintain low water to cement ratio (e.g., w/c=0.36), and viscosity modifying agent (cellulosic either) to prevent segregation and assist fiber dispersion. Mix 104 was a mortar mix derived from a commercial cast stone mix, used white cement as sole cementitious binder, and is the control mix. Mixes 104A-104D were designed by the inventor to provide a similarly commercially acceptable cast stone mix but with substantially reduced cement clinker content and lower cost (i.e., about 10-20% less expensive in material cost compared to the commercial mix design).

White cement, aggregates, fiber, adhesive, superplasticizer, and viscosity modifying agent were provided by Tuscan Stoneworx, Lindon, Utah. GGBFS was white or off-white and purchased from Lehigh Cement, Stockton, Calif. Fine recycled glass was baghouse glass provided by Momentum Recycling in Salt Lake City, Utah. Type S lime was purchased from Home Depot, Salt Lake City, Utah. Fine limestone powder is an agricultural limestone purchased from Oldcastle.

TABLE 19

| Components/Compressive Strength | Example (Mix ID) | | | | |
| --- | --- | --- | --- | --- | --- |
| | 104 | 104A | 104B | 104C | 104D |
| White Cement (g) | 1180.00 | 472.00 | 472.00 | 472.00 | 531.00 |
| Clinker Reduction (%) | 0% | 60% | 60% | 60% | 55% |
| GGBFS (g) | 0 | 472.00 | 472.00 | 472.00 | 531.00 |
| Fine limestone powder (g) | 0 | 236.00 | 118.00 | 0 | 0 |
| Fine recycled glass (g) | 0 | 0 | 118.00 | 0 | 0 |
| Type S lime (g) | 0 | 0 | 0 | 23.60 | 11.80 |
| Coarse limestone sand (g) | 590.00 | 554.60 | 554.60 | 666.70 | 601.80 |
| Medium limestone sand (g) | 497.81 | 467.94 | 467.94 | 562.53 | 507.77 |
| Marble White 80 (g) | 313.44 | 294.63 | 294.63 | 460.38 | 415.29 |
| PVA fiber (g) | 6.50 | 6.50 | 6.50 | 0 | 0 |
| Latex adhesive (g) | 36.88 | 36.88 | 36.88 | 30.24 | 23.63 |
| Superplasticizer (ml) | 2.2 | 2.2 | 2.2 | 2.2 | 4.0 |
| Viscosity modifying agent (g) | 0.2 | 0.2 | 0.2 | 0.2 | 0.2 |
| Water (g) | 424.06 | 424.06 | 424.06 | 354.73 | 385.90 |
| 3-day (psi/MPa) | 6415/44.2 | 4883/33.7 | 4240/29.2 | 5132/35.4 | 6685/46.1 |
| 7-day (psi/MPa) | 7488/51.6 | 6030/41.6 | 5910/40.7 | 7255/50.0 | 7793/53.7 |
| 28-day (psi/MPa) | 8660/59.7 | 7410/51.1 | 8145/56.2 | 7925/54.6 | 10230/70.5 |

As is readily apparent, by using GGBFS, limestone powder and/or Type S lime, all of which cost substantially less than white cement, cast stone mixes with clinker reductions of 55-60% were made having adequate strength. Mixes 104A-104C had 60% clinker reduction and were comparable in strength (only slightly lower) compared to control Mix 104. Mix 104D had 55% clinker reduction and substantially higher strength at each of 3 days, 7 days and 28 days compared to control Mix 104.

TABLE 20

| Components/Compressive Strength | Example (Mix ID) | | | | |
| --- | --- | --- | --- | --- | --- |
| | 104E | 104F | 104G | 104H | 104I |
| White Cement (g) | 525.69 | 534.22 | 525.69 | 460.48 | 477.94 |
| Clinker Reduction (%) | 55.5% | 54.7% | 55.5% | 61% | 59.5% |
| GGBFS (g) | 525.69 | 534.22 | 525.69 | 460.48 | 477.94 |

TABLE 20-continued

| Components/Compressive Strength | Example (Mix ID) | | | | |
|---|---|---|---|---|---|
| | 104E | 104F | 104G | 104H | 104I |
| Type S lime (g) | 10.62 | 5.37 | 10.62 | 25.79 | 18.38 |
| Coarse limestone sand (g) | 613.60 | 637.20 | 637.20 | 552.57 | 459.55 |
| Medium limestone sand (g) | 562.53 | 537.64 | 537.64 | 552.57 | 461.39 |
| Marble White 80 (g) | 354.18 | 313.44 | 338.51 | 515.73 | 683.82 |
| PVA fiber (g) | 6.50 | 6.50 | 6.50 | 0 | 0 |
| Latex adhesive (g) | 23.20 | 30.54 | 29.87 | 29.47 | 31.25 |
| Superplasticizer (ml) | 2.7 | 2.6 | 2.6 | 3.0 | 2.6 |
| Viscosity modifying agent (g) | 0.1 | 0.1 | 0.0 | 0.05 | 0.05 |
| Water (g) | 383.66 | 385.90 | 381.66 | 338.38 | 365.44 |
| 3-day (psi/MPa) | 6750/46.5 | 5875/40.5 | 3910/27.0 | 5695/39.3 | 7247/50.0 |
| 7-day (psi/MPa) | 7465/51.5 | 8383/57.8 | 6757/46.6 | 8360/57.6 | 8475/58.4 |
| 28-day (psi/MPa) | 8727/60.2 | 8935/61.6 | 10135/69.9 | 9700/66.9 | 9677/66.7 |

Mixes 104E-104I demonstrate that substituting between 54.7% and 61% of the white cement with GGBFS, an additional portion of Marble White 80, and Type S lime, all of which cost substantially less than white cement, yielded cast stone mixes with comparable to significantly higher strength, particularly at 7 and 28 days, compared to control Mix 104.

Working Examples—GFRC

Glass fiber reinforced concrete (GFRC) mixes were made based on a commercial GFRC mix design that used Portland White cement, aggregates, fiber, adhesive, superplasticizer, and viscosity modifying agent were provided by Tuscan Stoneworx, Lindon, Utah. GGBFS was white or off-white and purchased from Lehigh Cement, Stockton, Calif. A sample of fine pumice was provided by Hess Pumice, Malad, Id. Type S lime was purchased from Home Depot, Salt Lake City, Utah. Interground volcanic ash and limestone was prepared by intergrinding at Gebr. Pfieffer GmbH, Kaiserslautern, Germany a volcanic ash from a deposit in Stockton, Utah provided by Staker Parson, Ogden, Utah, with limestone granules provided by Pfeiffer.

TABLE 21

| Components/Compressive Strength | Example (Mix ID) | | | | |
|---|---|---|---|---|---|
| | 110 | 110A | 110B | 110C | 110D |
| White Cement (g) | 1344.58 | 615.42 | 553.56 | 553.56 | 553.56 |
| Clinker Reduction (%) | 0% | 54.2% | 58.8% | 58.8% | 58.8% |
| GGBFS (g) | 0 | 615.42 | 553.56 | 553.56 | 553.56 |
| Fine pumice (g) | 0 | 0 | 123.70 | 0 | 0 |
| Interground VA + LS (g) | 0 | 0 | 0 | 123.70 | 0 |
| Fly ash (g) | 0 | 0 | 0 | 0 | 123.70 |
| Type S lime (g) | 0 | 6.19 | 6.19 | 6.19 | 6.19 |
| Medium silica sand (g) | 426.33 | 447.65 | 447.65 | 447.65 | 447.65 |
| Fine silica sand (g) | 623.10 | 654.25 | 654.25 | 654.25 | 654.25 |
| Marble White 80 (g) | 196.77 | 267.60 | 240.06 | 242.02 | 267.60 |
| Glass fiber (g) | 98.38 | 98.38 | 98.38 | 98.38 | 98.38 |
| Latex adhesive (g) | 32.79 | 30.17 | 30.17 | 30.17 | 30.17 |
| Superplasticizer (ml) | 23 | 23 | 23 | 23 | 23 |
| Viscosity modifying agent (g) | 1.05 | 1.05 | 1.05 | 1.05 | 1.05 |
| Water (g) | 366.32 | 337.01 | 337.01 | 337.01 | 337.01 |
| 3-day (psi/MPa) | 7385/50.9 | 7337/50.6 | 8540/58.9 | 6937/47.8 | 6285/43.3 |
| 7-day (psi/MPa) | 8235/56.8 | 9665/66.6 | 11565/79.7 | 11230/77.4 | 8225/56.7 |
| 28-day (psi/MPa) | 9705/66.9 | 11755/81.2 | 12250/84.5 | 12862/88.7 | 10960/75.6 |

White Cement, three differently sized silica sand or coarse limestone powder aggregates (Wedron #530 medium silica sand, Scott #730 fine silica sand, and Marble White 80 fine limestone aggregate/coarse limestone powder), latex adhesive to bond to polystyrene foam, glass fibers to increase toughness, superplasticizer to maintain low water to cement ratio (i.e., w/c=0.27), and viscosity modifying agent (cellulosic either) to prevent segregation and clogging of a GFRC nozzle. Mix 110 was a mortar mix derived from the commercial GFRC mix, used white cement as sole cementitious binder, and is the control mix. Mixes 110A-110D were designed by the inventor to provide a similarly commercially acceptable GFRC mix but with substantially reduced cement clinker content and lower cost (i.e., about 10-20% less expensive in material cost compared to the commercial mix design).

Mixes 110A-110D show that clinker reductions of about 54-58% were possible by substituting part of the white cement with GGBFS and increasing the amount of Marble White 80 fine aggregate, which is a coarse limestone powder. Each of Mixes 110A-110D had comparable or greater strength compared to control Mix 110. At 28 days, Mixes 110A-110D all had significantly to substantially higher strength than Mix 110, but with less than half of the original amount of white cement. When initially cast, Mixes 110A-110D were less white than Mix 110. However, after curing and drying, they were almost indistinguishable in whiteness. If a pigment were used, the final color of Mixes 110A-110D would likely be virtually, if not entirely, indistinguishable from Mix 110.

TABLE 22

| Components/Compressive Strength | Example (Mix ID) | | | |
|---|---|---|---|---|
| | 110E | 110F | 110G | 110H |
| White Cement (g) | 865.91 | 865.91 | 0 | 0 |
| Type I/II OPC (g) | 0 | 0 | 786.58 | 786.58 |
| Clinker Reduction (%) | 35.6% | 35.6% | 41.5% | 41.5% |
| Calcined shale dust (g) | 358.73 | 0 | 417.49 | 417.49 |
| Fine pumice (g) | 0 | 358.73 | 0 | 0 |
| Type S lime (g) | 12.37 | 12.37 | 6.05 | 6.05 |
| Medium silica sand (g) | 447.65 | 447.65 | 447.65 | 447.65 |
| Fine silica sand (g) | 654.25 | 654.25 | 654.25 | 654.25 |
| Quarry fines (g) | 238.09 | 238.09 | 265.25 | 265.25 |
| Glass fiber (g) | 49.00 | 49.00 | 49.00 | 49.00 |
| Latex adhesive (g) | 30.17 | 30.17 | 30.17 | 30.17 |
| Superplasticizer (ml) | 23 | 23 | 23 | 23 |
| Viscosity modifying agent (g) | 0.75 | 0.75 | 0.5 | 0.5 |
| Water (g) | 337.01 | 337.01 | 329.69 | 363.04 |
| 3-day (psi/MPa) | 7042/48.5 | 6200/42.7 | 6630/45.7 | 4932/34.0 |
| 7-day (psi/MPa) | 8005/55.2 | 8817/60.8 | 8405/57.9 | 6085/41.9 |
| 28-day (psi/MPa) | 11557/79.7 | 10345/71.3 | 10212/70.4 | 7680/52.9 |

Mixes 110E and 110F show that clinker reductions of about 35.6% were possible when using much less expensive calcined shale dust and quarry fines instead of GGBFS and Marble White 80. Color was more of a natural limestone color when using calcined shale dust and quarry fines. The molded cubes had a nice, natural look in the absence of added pigments. They also had strengths that were superior to those of Mix 110 and comparable to those of Mixes 110A-11D.

Mixes 110G-110H were made using Type I/II OPC, which costs about half as much as white cement, and also very inexpensive calcined shale dust and quarry fines. Cost savings were greater than 25% compared to Mix 110, although cement binder costs were reduced by more than 65%. Mixes 110G-110H had strengths comparable or superior to those of Mix 110.

Prophetic Examples 1

Any of the foregoing Examples is modified so that one more of the components is altered by ±20%, ±18%, ±16%, ±14%, ±12%, ±10%, ±8%, ±6%, ±5%, ±4%, ±3%, ±2%, ±1.5%, ±1%, or ±0.5%. The compositions have strengths and other properties comparable to the corresponding Examples modified.

Prophetic Examples 2

Any of the foregoing Examples is modified so that one more of the ratios (w/c, w/cm, or w/p) is altered by ±20%, ±18%, ±16%, ±14%, ±12%, ±10%, ±8%, ±6%, ±5%, ±4%, ±3%, ±2%, ±1.5%, ±1%, or ±0.5%. The compositions have strengths and other properties comparable to the corresponding Examples modified.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A concrete mix comprising mixture products of:
   ordinary Portland cement (OPC) having a d10 below about 3 μm and a d90 between about 35 μm and about 45 μm;
   fine ground granulated blast furnace slag (GGBFS) having a d90 between about 15 μm and about 25 μm;
   coarse limestone powder (LP) having a d90 between about 50 μm and about 200 μm;
   coarse aggregate;
   fine aggregate; and
   water.

2. The concrete mix of claim 1, wherein the OPC is a Type II/V or Type V cement as defined by ASTM C-150.

3. The concrete mix of claim 1, wherein the OPC has a d90 between about 38 μm and about 43 μm.

4. The concrete mix of claim 1, wherein the fine GGBFS has a d90 between about 17 μm and about 23 μm.

5. The concrete mix of claim 1, wherein the coarse LP has a d90 between about 60 μm and about 150 μm.

6. The concrete mix of claim 1, further comprising fly ash.

7. The concrete mix of claim 1, further comprising a natural pozzolan.

8. The concrete mix of claim 1, further comprising at least one of added calcium oxide, calcium hydroxide, or Type S Lime (dolomitic lime).

9. The concrete mix of claim 1, further comprising at least one of added calcium sulfate anhydrite, calcium sulfate hemihydrate, lithium sulfate, or calcium sulfate dihydrate.

10. The concrete mix of claim 1, further comprising at least one of a polycarboxylate ether superplasticizer, an amine activator, or a calcium nitrate activator.

11. The concrete mix of claim 1, wherein the concrete mix has the following characteristics:
   OPC: 185-245 lb/yd$^3$;
   GGBFS: 120-235 lb/yd$^3$;
   Fly Ash: 0-120 lb/yd$^3$;
   Limestone powder: 110-200 lb/yd$^3$;
   (Water-to-cementitious binder ratio (w/cm): 0.50-0.58;
   (Water-to-cement ratio (w/c): 1.0-1.50; and
   (Water-to-powder ratio (w/p): 0.38-0.44.

12. The concrete mix of claim 11, wherein the concrete mix has the following characteristics:
   OPC: 197.4-225.5 lb/yd$^3$;
   GGBFS: 183-225.5 lb/yd$^3$;
   Fly Ash: 70-105 lb/yd$^3$;
   Limestone powder: 132.5-183 lb/yd$^3$
   w/cm: 0.52-0.56;

w/c: 1.10-1.38; and
w/p: 0.38-0.44.

13. The concrete mix of claim 1, wherein the concrete mix has the following characteristics:
OPC: 250-335 lb/yd³;
GGBFS: 230-315 lb/yd³;
Fly Ash: 0-140 lb/yd³;
Limestone powder: 150-225 lb/yd³;
Lime: 0-10 lb/yd³;
CaSO₄ (hemihydrate): 0-10 lb/yd³;
w/cm: 0.37-0.44;
w/c: 0.70-1.20; and
w/p: 0.29-0.35.

14. The concrete mix of claim 13, wherein the concrete mix has the following characteristics:
OPC: 270-297.5 lb/yd³;
GGBFS: 259-297.5 lb/yd³;
Fly Ash: or 50-140 lb/yd³;
Limestone powder: 150-225 lb/yd³;
Lime: 3-9 lb/yd³;
CaSO₄ (hemihydrate): 2-5 lb/yd³ lb/yd³;
w/cm: 0.39-0.42;
w/c: 0.83-1.00; and
w/p: 0.30-0.33.

15. The concrete mix of claim 1, wherein the concrete mix has the following characteristics:
OPC: 240-500 lb/yd³;
GGBFS: 230-315 lb/yd³;
Limestone powder: 100-220 lb/yd³;
Lime: 0-10 lb/yd³;
CaSO₄ (hemihydrate): 0-6 lb/yd³;
w/cm: 0.42-0.52;
w/c: 0.65-1.05; and
w/p: 0.34-0.42.

16. The concrete mix of claim 15, wherein the concrete mix has the following characteristics:
OPC: 250.98-343.5 lb/yd³;
GGBFS: 259-297.5 lb/yd³;
Limestone powder: 109.98-206.1 lb/yd³;
Lime: 4-8 lb/yd³;
CaSO₄ (hemihydrate): 1.5-5 lb/yd³;
w/cm: 0.44-0.50;
w/c: 0.80-0.97; and
w/p: 0.36-0.41.

17. The concrete mix of claim 1, wherein the concrete mix has the following characteristics:
OPC: 250-335 lb/yd³;
GGBFS: 230-315 lb/yd³;
Fly Ash: 0-140 lb/yd³;
Limestone powder: 150-225 lb/yd³;
w/cm: 0.52-0.63;
w/c: 0.90-1.50; and
w/p: 0.43-0.47.

18. The concrete mix of claim 17, wherein the concrete mix has the following characteristics:
OPC: 198.275.5 lb/yd³;
GGBFS: 156-198.3 lb/yd³;
Fly Ash: 50-140 lb/yd³;
Limestone powder: 125-159.8 lb/yd³;
w/cm: 0.54-0.62;
w/c: 0.99-1.42; and
w/p: 0.43-0.47.

19. A concrete mix comprising mixture products of:
ordinary Portland cement (OPC) having a d10 below about 3 μm and a d90 between about 35 μm and about 45 μm;
class F fly ash;
coarse limestone powder (LP) having a d90 between about 50 μm and about 200 μm;
coarse aggregate;
fine aggregate;
0.5% to 4.0% calcium oxide, calcium hydroxide, or Type S Lime (dolomitic lime); and
water.

20. A concrete mix comprising mixture products of:
ordinary Portland cement (OPC) having a d10 below about 3 μm and a d90 between about 35 μm and about 45 μm;
fine ground granulated blast furnace slag (GGBFS) having a d90 between about 15 μm and about 25 μm;
fly ash or natural pozzolan;
coarse limestone powder (LP) having a d90 between about 50 μm and about 500 μm and a d10 between about 2.5 μm and about 50 μm;
coarse aggregate;
fine aggregate; and
water.

* * * * *